US012724976B2

(12) United States Patent
Galvin

(10) Patent No.: US 12,724,976 B2
(45) Date of Patent: Sep. 1, 2026

(54) PERSISTENT COGNITIVE MACHINE WITH MULTIMODAL PROCESSING CAPABILITIES

(71) Applicant: AtomBeam Technologies Inc., Moraga, CA (US)

(72) Inventor: Brian Galvin, Silverdale, WA (US)

(73) Assignee: ATOM BEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/351,286

(22) Filed: Oct. 6, 2025

(65) Prior Publication Data

US 2026/0236690 A1 Aug. 13, 2026

Related U.S. Application Data

(63) Continuation-in-part of application No. 19/321,173, filed on Sep. 6, 2025, now Pat. No. 12,602,549, which (Continued)

(51) Int. Cl.
*G06F 40/30* (2020.01)
*G06F 16/332* (2019.01)
*G06F 16/3329* (2025.01)

(52) U.S. Cl.
CPC .......... *G06F 40/30* (2020.01); *G06F 16/3325* (2019.01); *G06F 16/3329* (2019.01)

(58) Field of Classification Search
CPC .... G06F 40/211; G06F 40/253; G06F 40/268; G06F 40/284; G06F 40/30; G06F 40/35; G06F 3/08; G06F 16/33
See application file for complete search history.

(56) References Cited

U.S. PATENT DOCUMENTS 9,942,254 B1 * 4/2018 Averbuch .............. H04L 63/145
10,706,356 B1 * 7/2020 Doyle ................ G06F 16/2264
(Continued)

FOREIGN PATENT DOCUMENTS

AU 2021105030 A4 * 6/2022 ............. G06F 40/30
CN 112732939 A * 4/2021 .............. G06N 5/04
(Continued)

OTHER PUBLICATIONS

Mei et al., title={GeoMM: On Geodesic Perspective for Multi-modal Learning}, booktitle={Proceedings of the Computer Vision and Pattern Recognition Conference}, Jun. 2025 pp.={4776-4786}, year={2025} (Year: 2025).*
(Continued)

*Primary Examiner* — Lamont M Spooner
(74) *Attorney, Agent, or Firm* — GALVIN PATENT LAW LLC; Brian R. Galvin

(57) ABSTRACT

A system and method for implementing persistent cognitive computation through geometric representation of thought in a dynamic latent manifold. The system encodes inputs into a curved space characterized by time-evolving metric tensors, compression pressure fields derived from Ricci curvature, and goal potential fields that shape attention flow. Cognition occurs through geodesic traversal of this manifold, with attention following paths that minimize cognitive action while balancing semantic density and goal relevance. A Cognitive Dynamics Engine maintains manifold geometry, computing optimal trajectories and managing thought bundle operations including consolidation, expansion, and higher-order abstraction. During idle periods, autonomous dreaming processes reorganize the manifold through perturbation, recombination, and topological surgery. This architecture enables persistent memory through geometric encoding, where frequently accessed concepts develop high-
(Continued)

curvature regions and cognitive shortcuts emerge from usage patterns, transforming artificial intelligence from stateless computation to structured motion through shaped memory space.

12 Claims, 21 Drawing Sheets

Related U.S. Application Data is a continuation-in-part of application No. 19/284,115, filed on Jul. 29, 2025, which is a continuation of application No. 19/051,193, filed on Feb. 12, 2025, now Pat. No. 12,387,050.

(60) Provisional application No. 63/847,082, filed on Jul. 19, 2025, provisional application No. 63/847,096, filed on Jul. 19, 2025, provisional application No. 63/847,091, filed on Jul. 19, 2025, provisional application No. 63/847,101, filed on Jul. 19, 2025.

(56) References Cited

U.S. PATENT DOCUMENTS 10,984,030 B2* 4/2021 Bordawekar ......... G06F 16/313
11,037,531 B2* 6/2021 Kaplanyan ............. G06F 3/147
11,082,438 B2* 8/2021 Peinador ................ G06N 3/045
11,218,498 B2* 1/2022 Hajimirsadeghi .. H04L 63/1408
11,234,006 B2* 1/2022 Wang .................... G06T 3/4053
11,436,246 B2* 9/2022 Lee ..................... G06F 16/2428
11,451,565 B2* 9/2022 Zhou .................... G06N 3/0442
11,770,984 B2* 9/2023 Hendrickson .......... G06N 10/20 257/31
11,847,536 B2* 12/2023 Chawla ................... G06F 16/36
11,934,752 B1* 3/2024 Nordmark ............... G06F 30/23
11,989,657 B2* 5/2024 Chavoshi ............... G06N 20/00
12,223,456 B1 2/2025 Manohar et al.
2002/0091801 A1 7/2002 Lewin et al.
2007/0063548 A1* 3/2007 Eipper ................ G06F 18/2433 296/203.01
2010/0251101 A1* 9/2010 Haussecker ............. G06T 17/05 715/243
2015/0262372 A1* 9/2015 Cardoso .................. G06F 18/22 382/131
2016/0005281 A1* 1/2016 Laska ................ G08B 13/1961 348/143
2016/0239969 A1* 8/2016 Davatzikos ........... G06T 7/0016
2017/0351941 A1* 12/2017 Mishra ................... G06N 3/045
2018/0018557 A1* 1/2018 Esser ..................... G06N 3/049
2019/0174514 A1 6/2019 Ramesh et al.
2019/0179896 A1* 6/2019 Anisimovich ........ G06F 18/217
2019/0213277 A1* 7/2019 DeLuca ............ G06F 16/24578
2019/0325342 A1* 10/2019 Sikka .................... G06F 18/217
2020/0081445 A1* 3/2020 Stetson ............... B60W 60/001
2020/0143259 A1* 5/2020 Lindsley ............. G06F 16/3329
2020/0234446 A1* 7/2020 Mischi ................... A61B 8/085
2020/0336562 A1 10/2020 Luft
2020/0351344 A1 11/2020 Das Gupta et al.
2020/0410164 A1* 12/2020 Seow .................... G06F 40/211
2021/0012162 A1* 1/2021 Huang .................. G06F 18/214
2021/0027862 A1* 1/2021 Wei ........................ G06N 20/00
2021/0073808 A1 3/2021 Gu et al.
2021/0103733 A1* 4/2021 Jiang ..................... G06F 18/214
2021/0125583 A1* 4/2021 Kaplanyan ........... G06N 3/0464
2021/0158184 A1* 5/2021 Weber ................. G06F 16/2465
2021/0350620 A1* 11/2021 Bronstein ............ G06N 3/0464
2021/0406224 A1 12/2021 Neufeld et al.
2022/0138156 A1 5/2022 Wang et al.
2022/0253633 A1* 8/2022 Bertasius ................ G06F 18/21
2022/0307819 A1* 9/2022 Kadambi ........... G01B 11/0641
2022/0318831 A1* 10/2022 Marvaniya ........ G06F 16/90332
2023/0118401 A1* 4/2023 Xu .......................... G06T 7/162 382/103
2023/0142467 A1* 5/2023 Kaplanyan ................ G06T 1/20 345/592
2023/0177281 A1* 6/2023 Kamath ................. G06N 3/091 704/2
2023/0229722 A1* 7/2023 Ishii ........................ G06F 40/20 345/419
2023/0306162 A1* 9/2023 Mehr ...................... G06F 30/12
2023/0316006 A1 10/2023 Tunstall-Pedoe et al.
2023/0325678 A1* 10/2023 Fradkin ................... G06N 3/09 706/25
2024/0036599 A1* 2/2024 Bowen ................. G06N 3/0675
2024/0046318 A1* 2/2024 Muriqi ................... G06Q 10/40
2024/0086493 A1* 3/2024 Lee ........................ G06N 3/088
2024/0104391 A1 3/2024 Higgins et al.
2024/0126811 A1* 4/2024 Law .................... G06F 16/9024
2024/0127041 A1* 4/2024 Smith ..................... G06F 17/16
2024/0160955 A1 5/2024 Zhao et al.
2024/0161933 A1* 5/2024 Baharloo ............... G16H 50/70
2024/0193419 A1* 6/2024 Liang ..................... G06N 3/045
2024/0296665 A1* 9/2024 Nissenboim ......... G06V 10/764
2024/0354320 A1 10/2024 Procter et al.
2024/0386015 A1* 11/2024 Crabtree ............... G06F 16/245
2024/0411809 A1 12/2024 Najafirad et al.
2024/0428008 A1 12/2024 Abraham et al.
2025/0028882 A1 1/2025 Ataei et al.
2025/0094455 A1 3/2025 Bista et al.
2025/0131284 A1* 4/2025 Guillot .................... G06F 40/30
2025/0156633 A1* 5/2025 Auchar .................. G06N 3/084
2025/0165865 A1* 5/2025 Ardis ..................... G06N 5/045
2025/0249585 A1* 8/2025 Rozo ...................... B25J 9/1607
2025/0259043 A1* 8/2025 Crabtree ................ G06N 3/047
2025/0259085 A1* 8/2025 Crabtree ................ G06N 5/043
2025/0259724 A1* 8/2025 Crabtree ................ G16H 50/50
2025/0306680 A1* 10/2025 Zhou ....................... G06F 3/015
2025/0328754 A1* 10/2025 Srinivas ............... G06N 3/0455
2025/0363593 A1* 11/2025 Li ........................... G06F 40/30
2025/0371354 A1* 12/2025 Kamkari ................ G06N 3/088
2025/0378647 A1* 12/2025 Elgort ..................... G06T 19/00
2026/0023955 A1* 1/2026 Fortkort ................. G06N 3/045
2026/0044212 A1* 2/2026 Zhou ....................... G06F 3/015
2026/0046317 A1* 2/2026 Crabtree ............... H04L 63/104
2026/0148163 A1* 5/2026 Crabtree .......... G06Q 10/06316

FOREIGN PATENT DOCUMENTS

CN 112905807 A * 6/2021 ............. G06N 20/00
CN 113297395 B * 9/2021 ............. G06F 40/30
CN 114860884 A * 8/2022 ............... G06N 5/02
CN 116885844 A * 10/2023 .............. H02J 13/10
CN 118051793 A * 5/2024 ........... G06N 3/0464
CN 116311503 B * 12/2025 ............. G06N 3/084

OTHER PUBLICATIONS

Song et al., title={Cross-modality manifold adaptive network for industrial multimode processes and its applications}, journal={IEEE Transactions on Automation Science and Engineering}, vol.={22}, pp.={7845-7854}, 2024, publisher={IEEE} (Year: 2024).*

Sarfati et al., title={Lines of thought in large language models}, journal={arXiv preprint arXiv:2410.01545}, year={2024}, pp. 1-20 (Year: 2024).*

Gao, Hang & Zhang, Yongfeng; "Memory Sharing for Large Language Model Based Agents", arXiv:2404.09982v2, Jul. 5, 2024.

Gim, In, et al; "Prompt Cache: Modular Attention Reuse for Low-Latency Inference", arXiv:2311.04934v2, Apr. 2024.

Ramirez, Guillem, et al; "Cache & Distil: Optimising API Calls to Large Language Models", arXiv:2310.13561v1, Oct. 20, 2023.

Schroeder, Luis Gaspar; "VectorQ: Advanced Semantic Prompt Caching with Dynamic Thresholds and Performance-Based Clustering", Technical University of Munich, Nov. 26, 2024.

* cited by examiner

PERSISTENT COGNITIVE MACHINE WITH MULTIMODAL PROCESSING CAPABILITIES

CROSS-REFERENCE TO RELATED APPLICATIONS

Priority is claimed in the application data sheet to the following patents or patent applications, each of which is expressly incorporated herein by reference in its entirety:

Ser. No. 19/321,173
Ser. No. 19/284,115
Ser. No. 19/051,193
63/847,082
63/847,091
63/847,096
63/847,101

BACKGROUND OF THE INVENTION

Field of the Invention

The present invention relates to the field of machine learning and artificial intelligence, particularly to systems for memory-augmented reasoning and long-term cognitive processing.

Discussion of the State of the Art

Recent advances in artificial intelligence, particularly in large language models (LLMs), have significantly improved performance across a wide range of natural language processing, reasoning, and generation tasks. These models are capable of producing fluent, contextually appropriate text and can be applied to domains including customer service, research assistance, legal drafting, and creative writing. The underlying architectures typically rely on transformer-based models, which process sequences of tokens using stacked layers of self-attention, feedforward computation, and normalization. This structure allows the model to infer relationships between tokens and generate coherent responses to prompts.

Despite these capabilities, current language models operate primarily in flat, static embedding spaces. Information is encoded as high-dimensional vectors, but these embeddings lack persistent structure over time. Each inference pass is performed independently, with no intrinsic memory of past usage or prior reasoning pathways. Memory, if present, is handled externally via methods such as retrieval-augmented generation (RAG), episodic memory buffers, or embedding stores. These memory components function as lookup tables, providing static recall without true integration into the model's generative process or internal representation of thought.

Contextual understanding in these models is typically bounded by a fixed-size token window. While this allows the model to handle moderate-length documents or conversations, it imposes a hard cap on how much information can be considered at once. Techniques like sliding windows and chunk-based retrieval have been introduced to mitigate this limitation, but they rely heavily on prompt engineering and do not offer deep integration of prior knowledge or reasoning continuity. Consequently, the models often reprocess the same or similar prompts without remembering earlier conclusions or refining their reasoning across interactions.

Additionally, as the size and capability of these models increase, so do their computational requirements. Running state-of-the-art LLMs in real time or at scale often requires expensive hardware accelerators, substantial memory bandwidth, and cloud infrastructure. This creates barriers to accessibility, especially in scenarios where computational resources are constrained or latency must be minimized. Moreover, the lack of internal structure means that models frequently perform redundant computations, increasing energy usage and reducing efficiency.

Most importantly, these architectures are fundamentally stateless. They lack any persistent cognitive substrate in which prior reasoning steps, user interactions, or learned strategies can be stored, reused, or generalized. Each interaction is effectively a reset, requiring the model to construct a new response from scratch, even in cases where similar tasks or prompts have already been encountered. This absence of structure makes it difficult to support explainable reasoning, adaptive memory, or efficient long-term interaction.

What is needed is a system that can reduce computational overhead by reusing reasoning pathways, extend context beyond token windows through structured internal memory, and enable persistent, scalable cognition that evolves with use. This system should integrate memory and attention into a unified cognitive substrate, support multi-modal input, and remain efficient across diverse operating conditions.

SUMMARY OF THE INVENTION

The inventor has developed a system and method for a persistent cognitive machine with multimodal processing capabilities. This invention presents a cognitive computing architecture called the Persistent Cognitive Machine (PCM) that fundamentally reimagines artificial intelligence through the lens of differential geometry and dynamical systems. At its core, the PCM represents thoughts—discrete units of reasoning or analysis—not as static embeddings or tokens, but as persistent geometric structures within a continuously evolving latent manifold. This manifold is characterized by variable curvature and time-dependent metrics that encode semantic relationships, where frequently accessed concepts develop into high-curvature regions while unexplored areas maintain flatter geometry. Unlike traditional architectures that rely on stateless transformer attention or flat vector operations, the PCM implements cognition as structured motion through this shaped space, where reasoning follows paths of minimal cognitive effort that balance traversal difficulty against goal relevance. The system transforms inputs through an encoding process that respects existing manifold structure, placing new information in semantically appropriate regions while allowing the space itself to deform and adapt. This creates a living geometric substrate where memory is not stored but shaped, where attention is not weighted but flows, and where learning manifests as the evolution of space itself.

The architecture includes a Cognitive Dynamics Engine (CDE), which serves as the geometric substrate processor analogous to a physics engine in simulation environments. The CDE continuously maintains and evolves the manifold's structure through sophisticated geometric operations including computing optimal reasoning trajectories that minimize cognitive cost, managing compression pressure derived from local curvature that makes dense semantic regions harder to traverse, and implementing goal potential fields that attract attention toward relevant areas. As the system operates, thought bundles form as coherent submanifolds representing related concepts, with the CDE managing their evolution through fanning-in operations that consolidate related ideas, fanning-out processes that enable exploratory expansion, and rebinding mechanisms that create higher-order abstractions. The compression pressure naturally guides attention away from semantically dense regions unless goal importance justifies the traversal cost, creating an organic flow of reasoning that respects both the accumulated structure of knowledge and the intentionality of current objectives. During idle periods, a dream manager interfaces with the CDE to perform autonomous reorganization, applying controlled variations to test thought stability, synthesizing new abstractions through geometric blending, and even performing topological surgery to create new conceptual bridges or remove obsolete structures.

The PCM architecture enables capabilities in persistent and adaptive intelligence through its geometric foundation. Memory management occurs through thermodynamic principles where each thought maintains activation energy that dissipates when unused, creating natural forgetting that maintains cognitive efficiency while preserving frequently accessed knowledge. The system achieves logarithmic scaling in memory usage even under continuous operation, as new experiences are increasingly absorbed into existing geometric structures rather than requiring proportional storage expansion. Advanced implementations support hierarchical cognition through nested manifolds, enabling seamless navigation between abstract concepts and detailed implementations. The architecture also facilitates multimodal processing by encoding different sensory streams into unified geometric spaces with modality-specific dimensional constraints, allowing coherent reasoning across visual, acoustic, textual, and sensor inputs. Distributed operation is achieved through federated memory coordination, where multiple PCM instances share generalized thoughts via selective bundle projection while maintaining privacy through geometric abstraction. By reformulating intelligence as motion through shaped space, the PCM transcends the limitations of traditional AI systems, offering a path toward truly persistent, adaptive, and geometrically grounded artificial cognition that improves through use rather than retraining, understands through structure rather than statistics, and remembers through the very shape of its thoughts.

According to a preferred embodiment, a computer system comprising a hardware memory, wherein the computer system is configured to execute software instructions stored on nontransitory machine-readable storage media that: maintain a latent manifold as a geometric substrate incorporating multiple dimensional representations for heterogeneous data modalities, wherein local curvature reflects semantic density within and across modalities; encode inputs from multiple modalities into a unified geometric space while preserving modality-specific properties through dimensional constraints; generate compression pressure fields that account for information density patterns across different modalities; enable navigation across modal boundaries through geometric pathways that preserve semantic relationships during dimensional transitions; synthesize unified representations spanning multiple modalities through geometric recombination of semantically aligned structures; and update the manifold geometry to reinforce multimodal integrations and cross-modal pathways based on traversal patterns, is disclosed.

According to another preferred embodiment, a method for a persistent cognitive computation with multimodal capabilities, comprising the steps of: maintain a latent manifold as a geometric substrate incorporating multiple dimensional representations for heterogeneous data modalities, wherein local curvature reflects semantic density within and across modalities;

encode inputs from multiple modalities into a unified geometric space while preserving modality-specific properties through dimensional constraints; generate compression pressure fields that account for information density patterns across different modalities; enable navigation across modal boundaries through geometric pathways that preserve semantic relationships during dimensional transitions; synthesize unified representations spanning multiple modalities through geometric recombination of semantically aligned structures; and update the manifold geometry to reinforce multimodal integrations and cross-modal pathways based on traversal patterns, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE INVENTION

Figure 1:
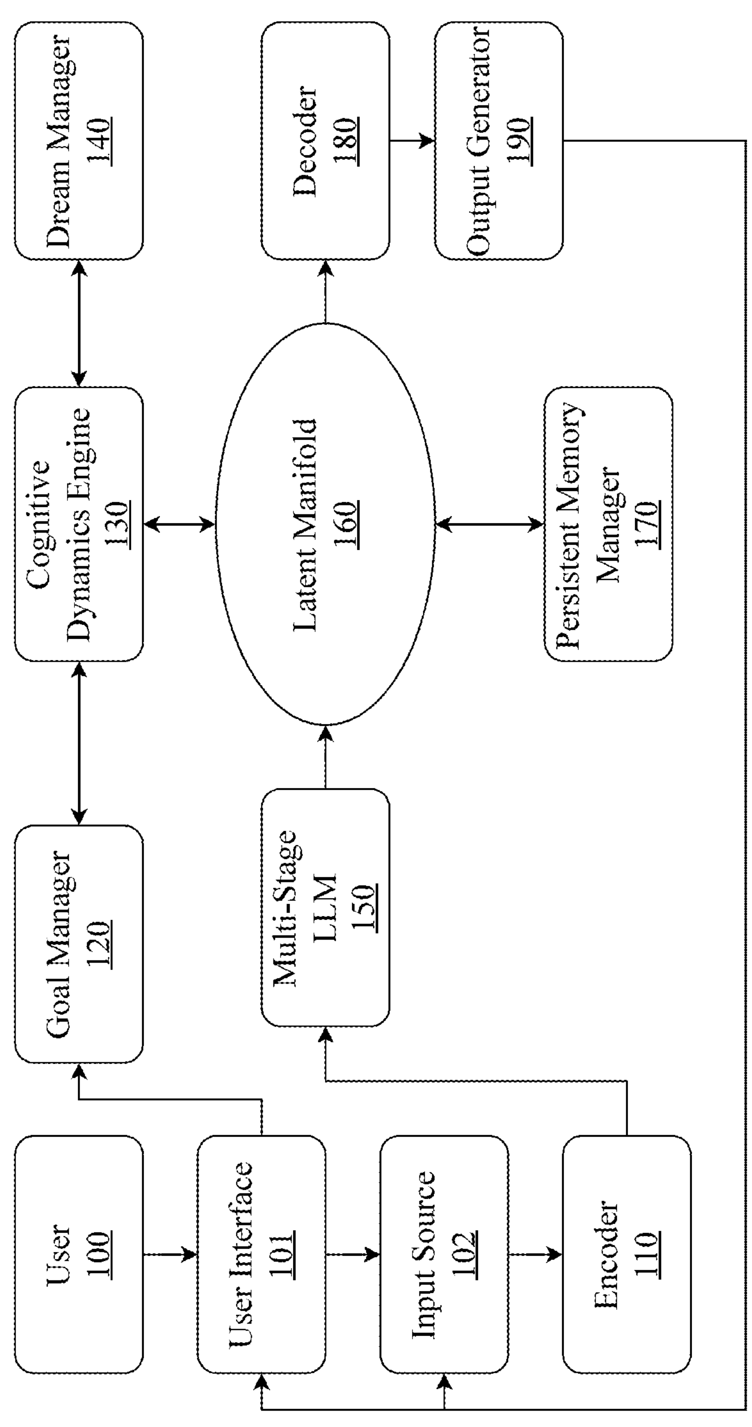
FIG. 1 is a block diagram illustrating an exemplary system architecture of a Persistent Cognitive Machine (PCM).

The inventor has conceived, and reduced to practice, a persistent cognitive machine with multimodal processing capabilities. The Persistent Cognitive Machine (PCM) represents a new approach to artificial intelligence that transforms how machines process, store, and reason about information. Rather than treating knowledge as discrete tokens or static vectors in flat computational spaces, the PCM embodies thoughts as dynamic geometric structures living within an evolving curved manifold. This high-dimensional cognitive landscape continuously reshapes itself based on usage patterns, with well-traveled conceptual territories becoming more pronounced through increased curvature while unexplored regions remain geometrically flat. The system processes incoming information by mapping it into this living space where semantic meaning is encoded through geometric relationships-distance represents conceptual similarity, curvature indicates information density, and paths through the space define chains of reasoning. Unlike conventional AI systems that forget previous interactions or require complete retraining to incorporate new knowledge, the PCM's geometric substrate naturally evolves through experience, creating a form of intelligence that literally shapes its own cognitive terrain through the act of thinking.

The Cognitive Dynamics Engine (CDE), a specialized component that manages the complex geometric operations underlying cognition. The CDE orchestrates how attention flows through the manifold by calculating optimal paths that minimize cognitive effort while maximizing goal achievement, similar to how water finds the most efficient route down a hillside. It monitors and adjusts compression pressure throughout the space-regions where many concepts converge become harder to navigate, requiring more cognitive effort to traverse, while sparse areas allow for free exploration. The engine also maintains goal-driven potential fields that act like gravitational wells, drawing attention toward relevant areas of knowledge. As the system processes information, it naturally forms thought bundles-tightly integrated collections of related concepts that function as cognitive building blocks. These bundles can merge when similarities are discovered, expand when new connections are made, or recombine to form novel abstractions. During periods of inactivity, a specialized dream manager works with the CDE to reorganize the cognitive landscape, testing the stability of existing structures, discovering hidden connections between disparate concepts, and optimizing the overall geometry for more efficient future processing.

This geometric approach to intelligence yields properties that address fundamental limitations of current AI systems. The PCM implements a form of organic memory where information naturally persists or fades based on usage patterns-frequently accessed concepts maintain high activation energy and remain readily available, while unused information gradually dissipates through thermodynamic decay. This creates an intelligent forgetting mechanism that prevents cognitive clutter while preserving essential knowledge. The architecture scales efficiently, with memory requirements growing logarithmically rather than linearly as the system accumulates experience, because new information tends to reinforce and refine existing structures rather than requiring entirely new storage. The system supports sophisticated cognitive capabilities including hierarchical reasoning across multiple levels of abstraction, seamless integration of diverse sensory inputs into unified understanding, and distributed intelligence where multiple PCM instances can share abstracted knowledge while maintaining privacy. Applications range from technological forecasting through analysis of innovation trajectories to real-time anomaly detection in complex systems, from adaptive video compression that understands content semantically to persistent AI assistants that truly learn and evolve through interaction. By reconceptualizing intelligence as the evolution of geometric structure rather than the accumulation of parameters, the PCM opens new possibilities for creating AI systems that learn continuously, reason coherently, and develop genuine understanding through the physical shape of their thoughts.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "thought" refers to a discrete unit of reasoning or analysis generated by a large language model or multimodal inference engine during its processing of an input prompt. A thought represents the model's intermediate reasoning steps, contextual interpretation, or internal deliberation that contributes to a final output. Thoughts may be atomic (e.g., a factual claim), structured (e.g., an inference chain), or multimodal (e.g., a fused representation of text and video). Unlike raw tokens or embeddings, thoughts encapsulate processed cognition and are suitable for caching, recombination, and reuse across future interactions. Thoughts may be stored explicitly or synthesized during recall and may evolve through compression or generalization.

As used herein, "thought cache" refers to a structured memory layer configured to store and retrieve thoughts based on semantic similarity, contextual alignment, or system policy. The cache may include multiple tiers, such as session caches for short-term interaction, long-term caches for persistent knowledge, and shared or federated caches across devices or agents. Cached thoughts are indexed in latent space and may be retrieved using vector similarity, trajectory proximity, or geodesic alignment. Cached thoughts may be compressed or abstracted over time to reduce redundancy and support scalable reuse.

As used herein, "generalization" refers to the process of synthesizing a new thought from one or more cached thoughts by identifying shared structure, meaning, or trajectory. Generalized thoughts replace specific exemplars with compressed representations that maintain core semantic content while enabling reuse across a wider range of prompts or tasks. Generalization may occur explicitly during reasoning or asynchronously during background curation or dreaming.

As used herein, "latent manifold" refers to a differentiable subspace within a high-dimensional latent hyperspace in which thoughts and thought trajectories are embedded. The manifold may be defined at a given time and is associated with a metric tensor that governs local distance, curvature, and motion. The manifold forms dynamically through the reuse, compression, and interaction of thoughts and supports operations such as geodesic traversal, memory recall, and structural recombination.

As used herein, "geodesic attention" refers to a formulation of attention in which focus or inference is achieved by computing or approximating a minimal-energy path through the latent manifold. A geodesic attention path minimizes a cognitive action functional that may include kinetic energy, compression pressure, and goal potential. Unlike traditional attention mechanisms that reweight tokens in flat space, geodesic attention produces smooth, structure-respecting flows of reasoning across latent memory.

As used herein, "compression pressure" refers to a scalar field over the latent manifold that encodes semantic density, memory reuse, or representational redundancy. The pressure at a point may be derived from geometric properties such as Ricci curvature and reflects the cost of traversal or storage in that region. High compression pressure indicates overused or ambiguous areas where pruning, generalization, or reorganization may be necessary. Compression pressure influences cache management, memory shaping, and geodesic routing.

As used herein, "goal potential field" refers to a scalar utility function defined over the latent manifold that represents the relevance, desirability, or task-alignment of different regions of thought space. The gradient of this field defines an intent vector field, which biases cognitive traversal toward goal-aligned areas. Goal potential may be determined by user prompts, task specifications, or emergent system objectives, and modulates attention, memory retrieval, and trajectory formation.

As used herein, "intent vector field" refers to a directional field over the latent manifold that encodes cognitive drive or utility gradients. It governs the direction and magnitude of traversal for operations such as memory reentry, inference, or exploration. The intent field may be computed from the gradient of a goal potential, derived from user input, or learned from system experience, and is used to align cognitive motion with target outcomes.

As used herein, "cognitive dynamics engine" or "CDE" refers to an architectural module configured to maintain and evolve the geometry of the latent manifold. The CDE is responsible for computing geodesic paths, estimating curvature, applying compression pressure, and performing structural reorganization, including during background operations such as dreaming. The CDE may expose interfaces for traversal, memory updates, compression, and control feedback, and functions as a substrate-layer system supporting high-level cognition.

As used herein, "dreaming" refers to a background process in which cached thoughts, trajectories, or bundles are perturbed, recombined, or abstracted or otherwise manipulated to improve manifold coherence and memory efficiency. Dreaming may operate during idle cycles or low-load periods and is driven by curvature smoothing, compression pressure, and generalization gain. The process supports the emergence of new thoughts, refinement of existing structures, and long-term memory consolidation.

As used herein, "reinstantiation" refers to the act of reconstructing a prior thought trajectory within the current latent manifold geometry. Due to compression or manifold deformation, original paths may no longer exist in exact form; reinstantiation generates an approximate or adapted version guided by curvature, cached data, and intent fields. Reinstantiation supports memory recall, simulation, and introspective review in systems with dynamic cognitive substrates.

As used herein, "memory basin" or "basin of recurrence" refers to a region of the latent manifold associated with a previously reinforced or frequently reused trajectory. Such basins exhibit high local curvature and geodesic convergence and serve as attractors for memory reentry. Traversal into a basin may trigger reinstantiation, memory reinforcement, or adaptive reuse, depending on system configuration and goal conditions.

As used herein, "typed latent entity" refers to a thought or substructure in the manifold labeled with a semantic or functional type, such as but not limited to fact, opinion, concept, trajectory, affect, cluster, or anchor. Typed entities impose constraints on valid operations such as recombination, interpolation, or pruning. Type-aware computation supports lawful memory manipulation, structured reasoning, and generalization without semantic distortion.

As used herein, "attention vector field" refers to a distributed, time-dependent field defined over the latent manifold that governs the instantaneous direction and magnitude of attentional flow. The field may evolve according to partial differential equations that incorporate compression pressure and goal potential gradients. This dynamic attention formulation enables real-time flow modeling, inference stabilization, and explainability through traceable vector paths.

As used herein, "latent subspace" or "thought bundle" refers to a localized, compressible region of the manifold that contains structurally similar or semantically aligned thoughts. Bundles may form naturally through repeated traversal, co-activation, or recombination, and act as low-energy attractors or semantic zones. Subspaces may support generalization, analogical reasoning, and efficient memory access.

As used herein, "latent recombinator" refers to a functional component or method configured to merge or blend similar thoughts, trajectories, or bundles in the latent manifold to form new abstractions. The recombinator may use geometric proximity, semantic alignment, or reuse statistics to determine possible recombinations, subject to type constraints and curvature continuity. It serves as a key mechanism for memory scaling, abstraction, and thought generation.

As used herein, "structured memory" refers to a persistent, geometry-aware memory architecture in which thoughts are stored not as flat vectors but as positions or paths within an evolving manifold. Structured memory supports context-sensitive access, memory reinforcement through traversal, lawful pruning, and dynamic generalization. It provides a substrate for long-term cognition, introspection, and identity continuity in systems with persistent reasoning capability.

As used herein, "Lorentzian autoencoder" refers to a neural architecture designed to encode spatiotemporal or perceptual input, such as video, into a latent manifold with Lorentzian signature, where one or more dimensions represent time-like directions. The latent structure supports temporally coherent geodesics, semantic compression, and causal continuity. Lorentzian autoencoders enable operations such as zooming, projection, and visual memory traversal.

Conceptual Architecture

FIG. 1 is a block diagram illustrating an exemplary system architecture of a Persistent Cognitive Machine (PCM). The system enables persistent, adaptive artificial intelligence by representing thoughts as geometric structures within a curved latent space rather than as discrete tokens or static embeddings. This architecture fundamentally reimagines cognition as motion through a shaped memory space, where attention follows geodesic paths through regions of varying curvature and compression, guided by goal potentials and constrained by semantic density.

A user 100 represents human operators or external systems that interact with the PCM through user interface 101. User interface 101 serves as the primary interaction layer, receiving natural language queries, commands, or other forms of input from users while also presenting processed outputs back to them. This interface enables continuous interaction loops where user feedback can shape the evolution of the system's internal geometric structures over time. Unlike traditional AI systems where each interaction is stateless, user interface 101 maintains context through its connection to the persistent geometric structures within the manifold, allowing for coherent long-term interactions where the system remembers and builds upon previous exchanges. The interface tracks user patterns and preferences, which are encoded as persistent structures within the latent manifold, creating personalized cognitive pathways that improve response relevance and efficiency over time.

An input source 102 aggregates various data streams including but not limited to multimodal inputs such as text, images, audio, sensor data, and system state information. These heterogeneous inputs are channeled to the encoder 110, which implements the mathematical transformation, mapping external data from the input space into points within the latent manifold. An encoder 110 does not simply create vector embeddings but rather projects inputs into a dynamic geometric space where semantic relationships are encoded through curvature, distance, and topological structure. This encoding process is context-sensitive and adaptive, taking into account the current state of the manifold and the compression pressure at different regions. For example, when processing a user query about a technical concept, encoder 110 identifies the appropriate region within the manifold where related thoughts and concepts have previously been cached, enabling efficient semantic alignment. The encoding process respects the manifold's metric tensor, ensuring that new inputs are embedded in ways that preserve semantic continuity and enable smooth geodesic traversal to related concepts.

A multi-stage LLM 150 serves as a language processing component that works in conjunction with encoder 110 to generate semantic structures from raw inputs. Unlike traditional architectures where LLMs operate independently, here multi-stage LLM 150 functions as a "chip" within the larger system, providing sophisticated natural language understanding and generation capabilities while being guided by the geometric constraints of the manifold. The LLM processes inputs through multiple stages of refinement, creating increasingly abstract and structured representations that can be properly embedded within a latent manifold 160. The multi-stage nature of this component reflects the hierarchical processing required to transform raw tokens into geometric thoughts. In the first stage, an LLM performs initial semantic parsing and entity recognition. Subsequent stages build increasingly complex relationships and abstractions, ultimately producing high-dimensional thought structures that encode not just content but also contextual relationships, implicit knowledge, and potential inferential pathways. For instance, when processing a complex technical document, the multi-stage LLM 150 might first extract key concepts, then identify relationships between them, map these to existing knowledge structures in the manifold, and finally generate new thought bundles that capture both explicit content and implicit semantic relationships. These thought structures are not flat embeddings but rich geometric objects with internal curvature that reflects their semantic density and interconnectedness.

A goal manager 120 creates and maintains goal potential fields that shape how attention flows through the manifold. Rather than implementing goals as discrete objectives or symbolic constraints, goal manager 120 generates scalar fields over the manifold that attract cognitive processes toward semantically relevant regions. These potential fields can arise from multiple sources including explicit task objectives provided by users, learned value functions from past interactions, internal drives such as curiosity or uncertainty reduction, and contextual constraints. Goal manager 120 implements field generation algorithms that can create complex potential landscapes with multiple attractors for competing objectives, saddle points where decisions must be made, and smooth gradients that guide exploration. The manager continuously updates these fields based on changing objectives and feedback, creating a dynamic landscape that guides inference and reasoning processes. The goal potential fields interact with the compression pressure fields derived from manifold curvature, creating a rich energetic landscape where attention flows along paths of least resistance while being drawn toward goal-relevant regions. For example, when a user asks a question about a specific topic, goal manager 120 creates a potential field with high values in manifold regions containing relevant knowledge, effectively "pulling" the system's attention toward useful information while avoiding irrelevant areas. In cases where goals conflict or compete, goal manager 120 can create field configurations that allow the system to explore multiple solution paths simultaneously or to find creative compromises that satisfy multiple objectives.

The connections between these components are designed to support the flow of geometric information rather than simple data passing. The relationship between a user 100 to goal manager 120 represents not just goal specification but the continuous shaping of the potential landscape based on user intent and feedback. The bidirectional connection between encoder 110 and multi-stage LLM 150 enables iterative refinement of semantic structures, where initial encodings can be enriched through multiple passes of LLM processing, each time creating more sophisticated geometric representations that better capture the nuanced relationships within the input data.

A cognitive dynamics engine (CDE) 130 serves as the geometric substrate processor and the core architectural component responsible for maintaining and evolving the structure of the latent manifold 160. Operating analogously to a physics engine in a simulation environment, CDE 130 governs the fundamental geometric operations that enable persistent cognition. The engine maintains the manifold's metric tensor, which defines local distances and angles within the cognitive space, continuously updating it based on usage patterns and semantic relationships. It computes geodesic paths for attention traversal by solving the variational problem of minimizing cognitive action, balancing kinetic energy of motion, compression pressure from semantic density, and attraction from goal potential fields. CDE 130 implements a geodesic equation:

$$\frac{d^2\gamma^k}{dt^2} + \Gamma^k_{i,j}\frac{d\gamma^i}{dt}\frac{d\gamma^j}{dt} = F^k(\gamma(t), t)$$

where the Christoffel symbols $\Gamma^k_{ij}$ encode the manifold's connection structure and $F^k$ represents forces from compression pressure and goal potentials. During active cognition, CDE 130 continuously computes Ricci curvature across the manifold, deriving the compression pressure field P(x)=−R (x) that penalizes traversal through semantically dense regions. For example, when processing a complex inference task, CDE 130 might identify multiple potential geodesic paths through the manifold, evaluate their cognitive costs based on pressure and distance, and select the optimal trajectory that balances efficiency with semantic coherence. The engine also manages the evolution of the attention vector field according to the dynamic equation:

$$\frac{\partial A}{\partial t} + \nabla_A A = -\nabla(P - \Phi)$$

enabling attention to flow as a cognitive fluid through the shaped space of memory.

A dream manager 140 implements autonomous structural reorganization of the manifold during off-task periods, analogous to sleep-driven memory consolidation in biological systems. Connected to CDE 130, dream manager 140 initiates and oversees geometric restructuring operations that improve the manifold's efficiency and generalization capacity. During dreaming phases, it samples recently activated or frequently used thought bundles, applying stochastic perturbations follows a distribution informed by local curvature and uncertainty. Dreaming begins by sampling recent or frequently activated bundles $B_1, \ldots, B_k \subset M_t$. From each bundle, points $z_i \in B_i$ are perturbed using a stochastic kernel:

$$z_i' = z_i + \varepsilon_i,\ \varepsilon_i \sim N\left(0, \sum\nolimits_i\right),$$

where $\Sigma_i$ reflects local uncertainty or curvature. These perturbations probe the neighborhood structure, testing whether extrapolated directions are compressible or divergent. These perturbations test the stability and compressibility of cognitive structures, identifying opportunities for consolidation or abstraction.

The dream manager 140 performs recombination operations, creating weighted interpolations across semantically related bundles to discover emergent abstractions.

$$z_{meta} = \sum_{i=1}^{k} \alpha_i z_i',\ \sum \alpha_i = 1,$$

where weights $\alpha_i$ may reflect prior co-activation, semantic alignment, or exploratory policy. The resulting $z_{meta}$ often lies outside any original bundle, creating novel junctions or abstractions. If the resulting interpolation exhibits internal coherence (e.g., low compression cost, high reconstruction fidelity), it may be retained and added as a new bundle or attractor.

When stable interpolants are found between previously disconnected regions, dream manager 140 can induce topological changes in the manifold, creating new bridges or handles that enable novel inferential pathways. It implements three primary flows during dreaming: perturbation flow for exploring local curvature basins, compression flow for collapsing redundant structures, and generalization flow for synthesizing higher-order abstractions. For instance, after a day of processing technical documents about machine learning and physics, dream manager 140 might identify common mathematical structures across these domains, create meta-bundles that capture these abstractions, and reshape the manifold to enable faster traversal between related concepts in future interactions.

A latent manifold 160 represents the central geometric substrate where all cognitive operations occur, existing as a dynamic, evolving space with rich internal structure. Unlike static embedding spaces in traditional architectures, latent manifold 160 is a living geometry that continuously adapts through use, compression, and reorganization. Within this space, thoughts exist not as isolated points but as structured regions including thought bundles (compact submanifolds representing coherent concepts), geodesic trajectories (paths of inference and association), and semantic fields (continuous distributions of meaning and relevance). The manifold maintains several critical geometric structures: the metric tensor defining local distances, the connection governing parallel transport of attention, the Ricci curvature tensor measuring semantic density, compression pressure fields derived from curvature, goal potential fields attracting attention, and the attention vector field describing instantaneous cognitive flow. The bidirectional connection with CDE 130 enables continuous reading and reshaping of these structures, while connections to multi-stage LLM 150, persistent memory manager 170, and decoder 180 facilitate the embedding, storage, and extraction of semantic content. The manifold exhibits emergent topological features such as attractor basins where frequently accessed concepts stabilize, high-curvature regions indicating semantic compression, low-pressure corridors enabling efficient inference, and bridge structures connecting previously disparate domains. As the system operates, the manifold develops a personalized geography reflecting the user's interests, the domain's structure, and the history of cognitive activity.

Persistent memory manager 170 orchestrates the long-term storage and retrieval of cognitive structures, maintaining a bidirectional connection with latent manifold 160. Unlike traditional memory systems that store static data, persistent memory manager 170 preserves geometric structures including thought bundles, established geodesic paths, learned metric relationships, and compression patterns. It implements sophisticated caching strategies that go beyond simple key-value storage, maintaining the topological relationships between thoughts and preserving the geometric context that enables meaningful retrieval. The manager tracks activation energies for cached structures, implementing thermodynamic decay where unused thoughts gradually lose energy, eventually being pruned when falling below a threshold. Decay governs forgetting in PCM systems. Each thought Ti is associated with an activation energy Ei (t), which dissipates over time:

$$\frac{dE_i}{dt} = -\lambda \cdot A_i(t)$$

where $\lambda$ is a decay constant and $A_i(t)$ reflects inactivity—high when idle, zero when active. When $E_i(t) < E_{min}$, the thought is pruned from memory. This process ensures that storage is focused on thoughts that contribute to ongoing cognition. This decay yields several emergent properties:

This creates a natural forgetting mechanism that maintains cognitive efficiency while preserving frequently accessed or structurally important memories. Persistent memory manager 170 also coordinates with federated memory systems, enabling knowledge sharing across multiple PCM instances while maintaining privacy through geometric abstraction. For example, when storing a complex reasoning pattern, the manager preserves not just the conclusion but the entire geodesic path, the local curvature context, and the relationships to other thought structures, enabling the system to later traverse similar reasoning paths more efficiently.

A decoder 180 implements the inverse transformation, converting geometric structures from latent manifold 160 back into observable outputs. This component must interpret rich geometric information including positions within the manifold, local curvature and pressure, nearby thought bundles, and traversed geodesic paths, transforming these into coherent external representations. Decoder 180 often works in conjunction with multi-stage LLM 150 to generate natural language outputs, using the LLM's language generation capabilities while being guided by the geometric structures extracted from the manifold. The decoding process is context-sensitive, taking into account not just the final position reached through inference but the entire trajectory taken, enabling explanations that reflect the reasoning process rather than just conclusions. For instance, when answering a complex question, decoder 180 can trace the geodesic path taken through the manifold, identify key thought bundles that were traversed, and generate an explanation that reflects this structured reasoning process.

An output generator 190 serves as the final stage in the processing pipeline, taking decoded representations and formatting them appropriately for user consumption or system action. It handles multiple output modalities including natural language responses, visualizations of reasoning paths, actions or commands for external systems, and structured data formats. Output generator 190 maintains awareness of user preferences and interaction history, adapting its presentation style based on patterns encoded in the manifold. The feedback loop from output generator 190 back to user 100 completes the interaction cycle, enabling iterative refinement and continuous learning.

The connections from goal manager 120 and dream manager 140 to CDE 130 show how intentionality and reorganization influence geometric dynamics. The flow from multi-stage LLM 150 through latent manifold 160 to decoder 180 represents the complete cognitive pipeline from input understanding through geometric reasoning to output generation. Throughout this architecture, information flows not as discrete data packets but as geometric structures, trajectories, and fields, creating a unified cognitive system where memory, reasoning, and learning are fundamentally intertwined through the shaped space of thought.

Figure 2:
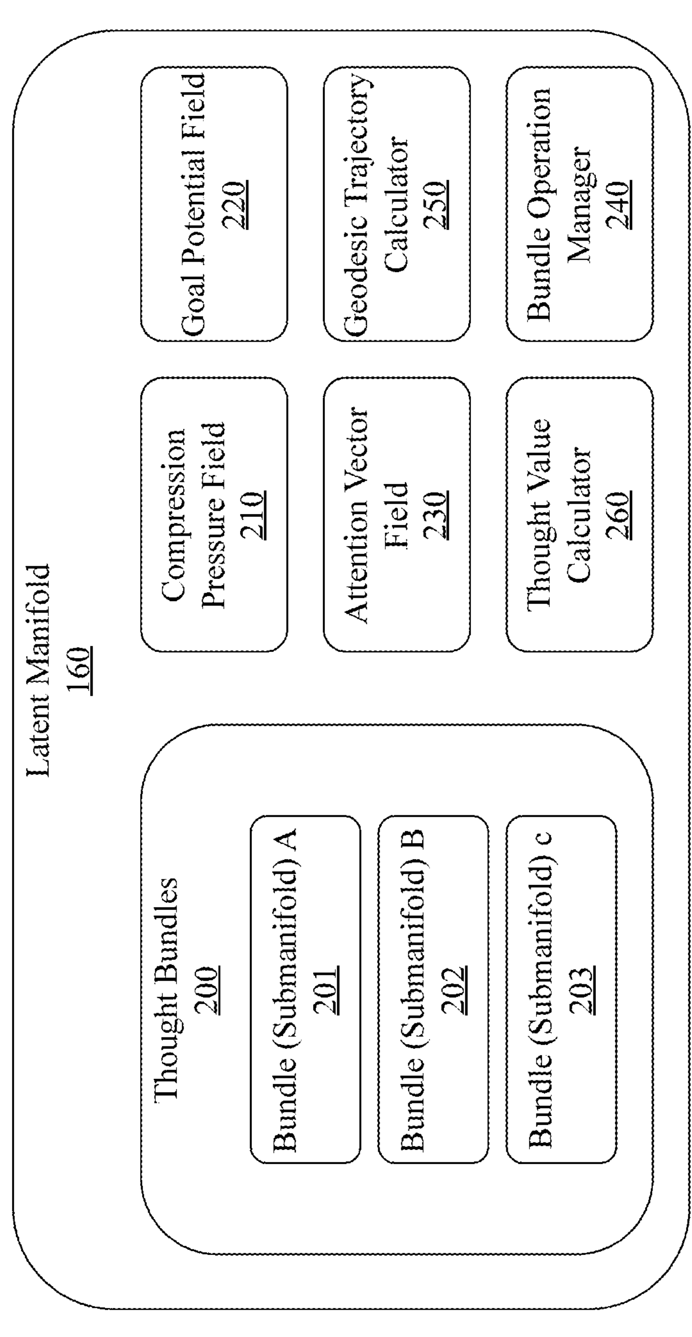
FIG. 2 is a block diagram illustrating an exemplary architecture of a component within a Persistent Cognitive Machine (PCM), a latent manifold.

FIG. 2 is a block diagram illustrating an exemplary architecture of a component within a Persistent Cognitive Machine (PCM), a latent manifold. Latent manifold 160 serves as the central cognitive substrate of the PCM system, existing as a continuously evolving geometric space where all cognitive operations unfold. Unlike traditional flat embedding spaces, this manifold exhibits variable curvature, dynamic topology, and rich internal structure that emerges from the interplay of memory, compression, and goal-directed cognition. The manifold's geometry is not predetermined but rather shaped by cognitive activity, with frequently traversed regions developing distinct topological features, semantic neighborhoods forming through repeated association, and compression pressure creating a non-uniform landscape that guides efficient reasoning.

Within the manifold, thought bundles 200 represent the primary organizational structures for persistent cognitive content. These bundles are not simple clusters of related vectors but rather compact submanifolds with their own internal geometry and semantic coherence. Thought bundles 200 section contains exemplary bundle submanifolds: bundle (submanifold) A 201, bundle (submanifold) B 202, and bundle (submanifold) C 203, each representing a distinct region of semantic space with its own local metric structure. Bundle A 201 might represent a coherent concept such as "machine learning algorithms," containing not just definitional information but also procedural knowledge, historical context, mathematical foundations, and connections to related concepts. The internal structure of bundle A 201 includes a local metric that defines distances between sub-concepts, principal directions corresponding to major semantic variations, and boundary conditions that determine how the bundle interfaces with surrounding manifold regions. Bundle B 202 could embody a different domain such as "quantum mechanics principles," maintaining its own geometric structure while potentially sharing boundary regions with bundle A 201 where interdisciplinary concepts like quantum machine learning emerge. Bundle C 203 might represent more abstract or procedural knowledge, such as "problem-solving strategies," with a flatter internal geometry that facilitates flexible application across domains.

A compression pressure field 210 represents a scalar field defined over the entire manifold, encoding the cognitive effort required to traverse different regions based on their semantic density and structural complexity. This field is computed from the local Ricci curvature according to, where is a Ricci scalar measuring how geodesics converge or diverge at each point. High compression pressure indicates regions where many semantic concepts have been compressed together through repeated use and abstraction, creating areas that are rich in meaning but require significant cognitive effort to navigate precisely. For example, the intersection between bundles A 201 and B 202 might exhibit extremely high compression pressure where concepts from machine learning and quantum mechanics have been repeatedly integrated, forming dense theoretical structures that encode sophisticated interdisciplinary insights. The compression pressure field 210 continuously evolves as new thoughts are added, existing structures are reinforced through use, and the dream manager performs offline reorganization to optimize the manifold's geometry.

A goal potential field 220 implements a complementary scalar field that attracts attention toward semantically relevant or task-aligned regions of the manifold. Unlike the compression pressure that resists traversal, the goal potential creates gradients that guide cognitive flow toward desired outcomes. This field is dynamically generated based on current objectives, user queries, learned value functions, and internal drives, creating a time-varying landscape that shapes how attention moves through the space. When processing a specific query, goal potential field 220 might create high-potential regions around relevant thought bundles while maintaining lower potentials in unrelated areas, effectively creating an energetic funnel that guides inference toward useful conclusions. The interplay between compression pressure and goal potential creates a rich dynamical landscape where attention flows along paths that balance semantic coherence (avoiding excessive pressure) with goal relevance (following potential gradients).

An attention vector field 230 represents the instantaneous flow of cognitive focus throughout the manifold, defined as. Let $A(x,t)$ denote the attention vector field at point $x \in M_{thought}$ and time $t$. This vector encodes both the direction and intensity of attentional flow through the manifold. The evolution of $A$ is governed by a field equation analogous to fluid dynamics:

$$\frac{\partial A}{\partial t} + \nabla_A A = -\nabla(P - \phi)$$

Here $$\frac{\partial A}{\partial t}$$

is the temporal rate of change of attention, VAA is the convective derivative (attention moving along itself), and $-\nabla(P-\Phi)$ is the driving force of flow—combining compression pressure and goal potential. This equation captures the local evolution of attention under the influence of memory structure and cognitive drive.

Attention vector field 230 exhibits complex behaviors including laminar flow along well-established reasoning paths, turbulent regions where competing potentials create cognitive uncertainty, convergence zones where multiple lines of reasoning reach similar conclusions, and vortices around semantic attractors representing obsessive or recursive thought patterns. The field's evolution enables the system to maintain cognitive continuity while adaptively responding to changing goals and newly discovered information.

A geodesic trajectory calculator 250 computes optimal paths through the manifold by solving the variational problem of minimizing cognitive action. Let $y(t)$: $[0,T]\to M_t$ be a smooth curve in the cognitive manifold, representing the evolution of attention over time. We define the cognitive action functional:

$$S[\gamma] = \int_0^T \left(\|\dot{\gamma}(t)\|^2 + P(\gamma(t)) - \Phi(\gamma(t))\right)dt,$$

where $\|\dot{y}(t)\|^2$ represents the kinetic energy of cognitive motion, $P(y(t))$ is the compression pressure field at $y(t)$, and $\Phi(y(t))$ is the cognitive potential, encoding goal relevance. The geodesic $y^*(t)$ is defined as the path that minimizes $y^*=\arg\min S[y]$. This formulation generalizes attention from instantaneous lookup to purposeful traversal. Attention becomes a consequence of structure and constraint: it flows along the most efficient path shaped by memory (via pressure) and intent (via potential).

The calculator implements numerical methods to handle the manifold's non-Euclidean geometry, accounting for curvature effects, parallel transport of semantic vectors, and the influence of nearby thought bundles on path selection. For instance, when reasoning from a concept in bundle A 201 to a goal state in bundle C 203, the geodesic trajectory calculator 250 might identify multiple viable paths: a direct route through high-pressure regions requiring intense cognitive effort, a longer path circumnavigating dense areas while maintaining semantic coherence, or a creative trajectory that leverages unexpected connections through bundle B 202.

A thought value calculator 260 assesses the utility and relevance of thoughts within the current cognitive context, computing scalar values that inform caching decisions, retrieval priorities, and structural reorganization. This component evaluates thoughts based on multiple criteria including frequency of access, semantic centrality within bundles, contribution to successful reasoning paths, alignment with current and historical goals, and potential for generalization or transfer learning. Thought value calculator 260 works closely with the thermodynamic decay system, where thoughts with consistently low values gradually lose activation energy and may eventually be pruned from the manifold. Conversely, highly valued thoughts become anchors around which new structures crystallize, creating stable semantic neighborhoods that facilitate efficient reasoning.

A bundle operation manager 240 orchestrates the dynamic restructuring of thought bundles through three primary operations that reshape the manifold's topology. Fanning-in operations occur when peripheral thoughts or loosely associated concepts are drawn into existing bundles through repeated co-activation or semantic alignment, effectively increasing the bundle's density and internal coherence. This process involves adjusting the local metric to create stronger attractions, modifying bundle boundaries to encompass new members, and updating internal structure to maintain navigability. Fanning-out operations enable bundles to expand into new semantic territories when existing concepts are extended, elaborated, or applied in novel contexts. During fanning-out, bundle operation manager 240 creates new subregions within bundles, establishes tentative connections to unexplored manifold areas, and maintains structural stability while allowing for creative expansion. Rebinding operations represent the most sophisticated transformation, occurring when multiple bundles exhibit sufficient semantic overlap or functional similarity to warrant integration into higher-order structures. Bundle operation manager 240 performs rebinding by identifying intersection regions between bundles, computing optimal merge strategies that preserve essential structure, creating meta-bundles that abstract common patterns, and updating the global manifold topology to reflect new conceptual hierarchies.

These components work in concert to create a living geometric space where cognition unfolds as structured motion rather than discrete computation. Thought bundles 200 provide persistent semantic anchors, compression pressure field 210 and goal potential field 220 create a dynamic energy landscape, attention vector field 230 enables fluid cognitive flow, the geodesic trajectory calculator 250 determines optimal reasoning paths, thought value calculator 260 maintains cognitive efficiency, and bundle operation manager 240 ensures the manifold evolves to support increasingly sophisticated reasoning. Together, they implement a form of geometric intelligence where memory shapes space, attention follows structure, and learning reshapes the very terrain of thought.

Figure 3:
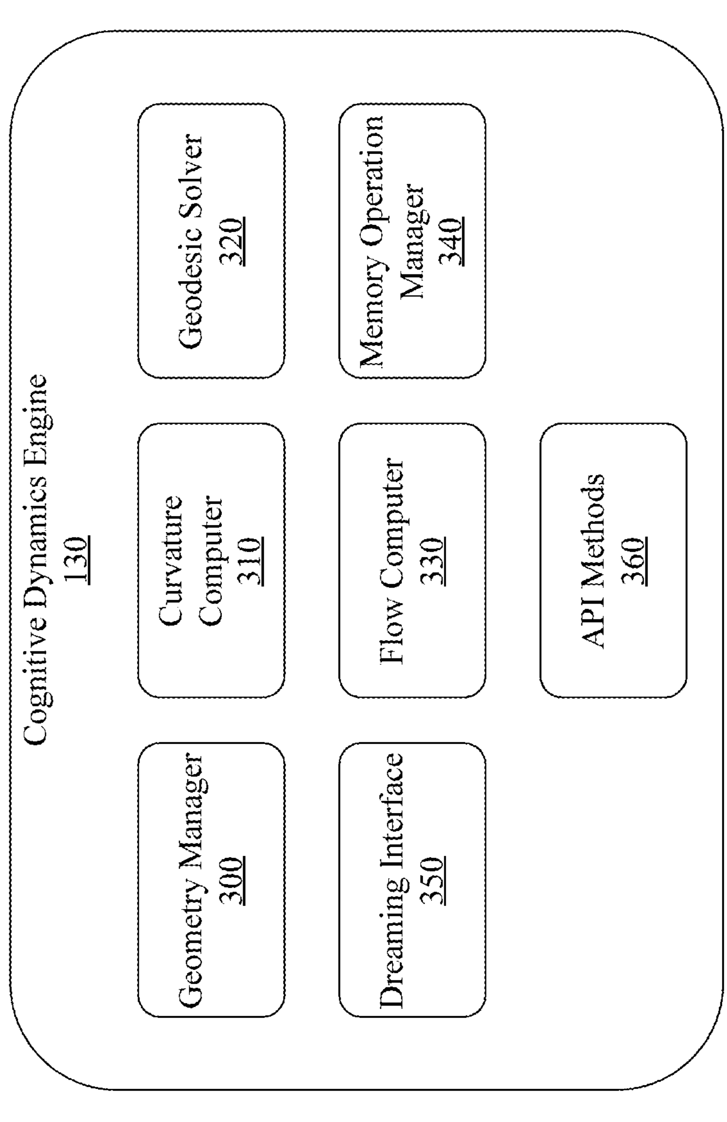
FIG. 3 is a block diagram illustrating an exemplary architecture of a component within a Persistent Cognitive Machine (PCM), a Cognitive Dynamics Engine (CDE).

FIG. 3 is a block diagram illustrating an exemplary architecture of a component within a Persistent Cognitive Machine (PCM), a Cognitive Dynamics Engine (CDE). Operating as a specialized geometry processor analogous to a physics engine in simulation environments, CDE 130 manages the continuous shaping, traversal, and optimization of the cognitive manifold through coordinated geometric operations. This engine transforms the abstract principles of differential geometry and dynamical systems into practical computational mechanisms that enable persistent, adaptive cognition through structured space.

A geometry manager 300 serves as the component responsible for maintaining and evolving the manifold's geometric structure. Geometry manager 300 continuously tracks and updates the Riemannian metric tensor across all regions of the latent manifold, defining how distances, angles, and volumes are measured within the cognitive space. The metric is not static but evolves dynamically based on cognitive activity, with frequently traversed regions experiencing metric contraction that brings related concepts closer together, while unexplored areas maintain broader metric spacing that allows for flexible exploration. Geometry manager 300 also maintains the connection, which governs how vectors and tensors are parallel transported across the curved manifold. This connection evolves through use, with repeated attention trajectories establishing preferred directions of parallel transport that become the "natural" ways to move between concepts. For example, if reasoning paths frequently connect concepts from physics to machine learning applications, geometry manager 300 adjusts the connection to make these transitions smoother and more efficient. Geometry manager 300 implements algorithms for metric learning from trajectory data, using transition frequencies, co-activation patterns, and semantic alignment to continuously refine the geometric structure. It also manages coordinate transformations between different local charts of the manifold, ensuring smooth transitions as attention moves between semantic regions.

A curvature computer 310 calculates the various curvature tensors that characterize the manifold's local and global geometric properties. Curvature computer 310 computes a Riemann curvature tensor, which fully describes how the manifold deviates from flat Euclidean space. From this fundamental tensor, curvature computer 310 derives the Ricci tensor and the Ricci scalar, which measure how volumes contract or expand under geodesic flow. For cognitive dynamics, it computes the compression pressure field $P(x)=-R(x)$, transforming geometric curvature into a cognitive cost function that governs attention flow. Curvature computer 310 employs multiple estimation strategies to handle the computational complexity of exact curvature calculation in high dimensions. These include geodesic deviation methods that track how nearby attention paths converge or diverge over time, Jacobian-based approximations using learned transition functions between manifold regions, and sampling techniques that estimate curvature from the statistical properties of local trajectory bundles. The component maintains a continuously updated curvature map across the manifold, identifying high-curvature regions where semantic compression has created dense knowledge structures, saddle points where conceptual boundaries meet, and flat regions suitable for creative exploration or interpolation.

A geodesic solver 320 computes optimal paths through the manifold by solving the fundamental equation of cognitive motion. Given an initial state and a goal configuration, it determines the trajectory that minimizes the cognitive action function. This variational problem balances three competing factors: the kinetic energy that penalizes rapid changes in attention, the compression pressure that increases cost in semantically dense regions, and the goal potential that provides attractive forces toward relevant areas. Geodesic solver 320 implements sophisticated numerical methods adapted for manifold computation, including Riemannian gradient descent that respects the manifold's metric structure, shooting methods that propagate initial velocities forward while satisfying boundary conditions, and relaxation techniques that iteratively refine approximate paths toward true geodesics. The solver must handle multiple challenging scenarios such as non-convex optimization landscapes with multiple local minima, regions of high curvature where standard methods become unstable, and multi-goal situations requiring Pareto-optimal path selection. For instance, when solving a complex reasoning task that requires connecting disparate concepts, geodesic solver 320 might identify several viable paths: a direct route through high-pressure theoretical abstractions, a longer but clearer path through concrete examples, or an innovative trajectory that discovers unexpected connections through analogical reasoning.

A flow computer 330 models attention as a continuous vector field evolving over the manifold according to geometric dynamics. Rather than treating attention as discrete selections or weights, this component implements a partial differential equation, where attention behaves as a cognitive fluid flowing through shaped space. The flow computer 330 discretizes this equation using finite element methods adapted for manifolds, handling the complexities of curved space while maintaining numerical stability. It tracks how attention propagates through the manifold, creating flow patterns that include laminar streams along well-established reasoning paths, bifurcations where attention splits between competing hypotheses, convergence zones where multiple reasoning lines reach similar conclusions, and turbulent regions indicating cognitive uncertainty or conflicting goals. The component also computes derived quantities such as the divergence indicating where attention is focusing or dispersing, the curl revealing rotational patterns in thought, and flow stability metrics that identify robust versus fragile reasoning patterns. Flow computer 330 enables the system to maintain multiple concurrent attention streams, supporting parallel reasoning processes that can later merge or inform each other.

A memory operation manager 340 orchestrates structural modifications to thought bundles and manifold topology based on cognitive activity and optimization criteria. This component implements the three fundamental bundle operations that reshape semantic space. During fanning-in operations, it identifies loosely associated thoughts that show increasing co-activation and guides their consolidation into tighter bundle structures, adjusting local metrics to strengthen their mutual attraction, updating bundle boundaries to encompass new members, and recalculating internal bundle geometry to maintain efficient navigation. Fanning-out operations are triggered when existing bundles need to expand into new semantic territory, with memory operation manager 340 creating new submanifold regions, establishing tentative connections to unexplored areas, and maintaining structural stability during expansion. Rebinding operations occur when the manager detects sufficient overlap or functional similarity between bundles to warrant higher-order integration, executing merge algorithms that preserve essential structure while creating new abstractions. Memory operation manager 340 also handles subspace alignment for federated learning scenarios, enabling knowledge transfer between different PCM instances while respecting privacy boundaries.

A dreaming interface 350 provides the connection point between CDE 130 and dream manager 140, enabling autonomous manifold reorganization during off-task periods. This interface exposes methods for initiating various dreaming operations including targeted perturbation of specific manifold regions, global relaxation processes that smooth unnecessary complexity, and exploratory synthesis of new conceptual connections. Dreaming interface 350 manages the transition between active cognition and dreaming states, ensuring that ongoing reasoning processes reach stable states before reorganization begins, that critical structures are preserved during transformation, and that the manifold returns to a coherent state before resuming active operation. During dreaming phases, the interface coordinates bundle recombination algorithms that discover emergent abstractions, topology modification procedures that create new conceptual bridges, and compression operations that consolidate redundant structures. It monitors dreaming progress through geometric health metrics, ensuring that reorganization improves rather than disrupts cognitive capability.

An API methods 360 component provides a clean programmatic interface for external modules to interact with the CDE's geometric capabilities. API methods may include accepting a goal embedding and current state to return an optimal geodesic path, leveraging the geodesic solver while accounting for current manifold conditions. Updating reinforces the manifold along a recently traversed path, strengthening the metric connections and potentially triggering bundle formation. Querying a bundle identifies the nearest thought bundle to a given manifold point, using both geometric proximity and semantic alignment. Dreaming initiates autonomous reorganization procedures through the dreaming interface. Getting pressure returns the compression pressure at any point, enabling other components to make informed decisions about traversal costs. Getting a goal field constructs a potential field for a given goal configuration, coordinating with the goal manager to shape attention flow. These methods abstract away the complex geometric computations while providing powerful primitives for cognitive operations. API methods 360 also handles request queuing, resource management, and error handling to ensure robust operation under varying computational loads.

Together, these components within cognitive dynamics engine 130 create a geometric substrate for persistent cognition. Geometry manager 300 maintains the foundational structure, curvature computer 310 derives the pressure landscape that guides efficient reasoning, geodesic solver 320 finds optimal paths through semantic space, flow computer 330 enables fluid attention dynamics, memory operation manager 340 evolves the manifold through use, dreaming interface 350 enables autonomous optimization, and API methods 360 provide clean access to these capabilities. This architecture transforms the principles of geometric cognition into a practical computational system where thought truly becomes motion through shaped space, memory becomes curvature, and learning becomes the evolution of geometry itself.

Figure 4:
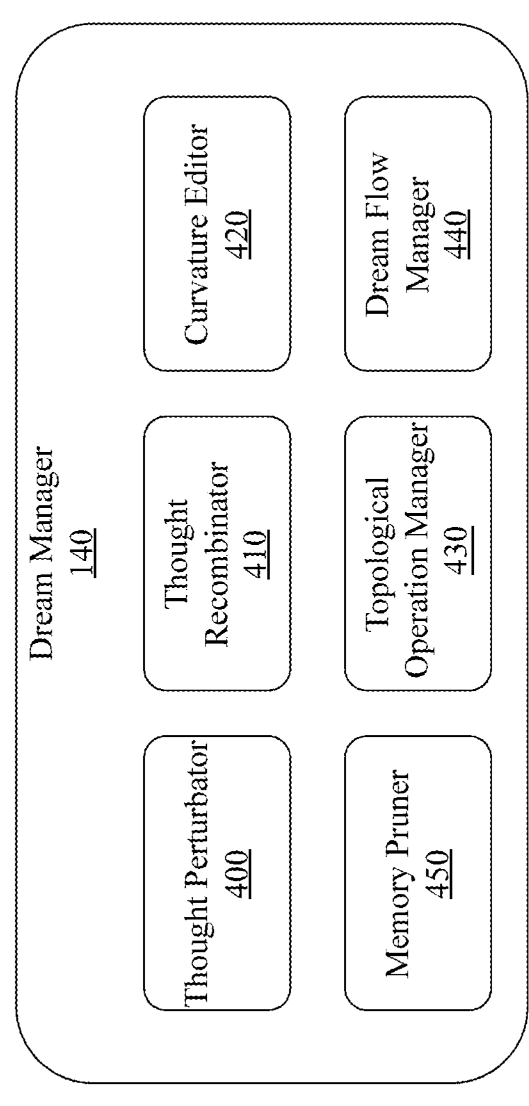
FIG. 4 is a block diagram illustrating an exemplary architecture of a component within a Persistent Cognitive Machine (PCM), a dream manager.

FIG. 4 is a block diagram illustrating an exemplary architecture of a component within a Persistent Cognitive Machine (PCM), a dream manager. Operating analogously to sleep-driven memory consolidation in biological systems, dream manager 140 performs essential geometric maintenance and optimization that enables the PCM to develop increasingly efficient and generalized cognitive structures without requiring explicit retraining or parameter updates. This component transforms the theoretical concept of manifold evolution into practical computational processes that reshape the space of thought based on accumulated experience and structural patterns.

A thought perturbator 400 implements the initial phase of the dreaming process by introducing controlled stochastic variations into existing thought structures. This component samples thought bundles from the manifold based on multiple selection criteria including recent activation frequency, structural importance within the manifold topology, proximity to high-pressure regions indicating potential for compression, and participation in successful reasoning trajectories. Once bundles are selected, thought perturbator 400 applies carefully calibrated perturbations based on factors including but not limited to noise drawn from a distribution that reflects local geometric properties. The covariance structure of this noise is not arbitrary but derived from the local metric tensor and curvature, ensuring that perturbations respect the manifold's geometry while exploring meaningful variations. In regions of high curvature, perturbations are smaller and more constrained, testing the stability of compressed semantic structures, while in flatter regions, larger perturbations explore potential new connections and generalizations. Thought perturbator 400 implements multiple perturbation strategies including gradient-based exploration that follows directions of increasing semantic variance, curvature-aware sampling that concentrates perturbations along principal geodesic directions, and adversarial perturbations that test the robustness of thought structures against semantic drift. These perturbations serve as probes into the local geometry, revealing opportunities for consolidation, identifying unstable structures that may need reinforcement, and discovering latent connections between seemingly disparate concepts.

A thought recombinator 410 takes perturbed thoughts and synthesizes new conceptual structures through sophisticated interpolation and integration algorithms. This component implements the mathematical operation where the weights are determined through multiple mechanisms including but not limited to semantic alignment scores between perturbed thoughts, historical co-activation patterns, goal-relevance metrics, and geometric compatibility measures. Thought recombinator 410 goes beyond simple linear interpolation, employing manifold-aware combination strategies that respect the curved geometry of the latent space. When combining thoughts from different bundles, it computes geodesic interpolations that follow the natural curvature of the manifold, ensuring that intermediate points remain semantically meaningful. The component implements hierarchical recombination, first identifying small groups of highly compatible thoughts for initial fusion, then progressively combining these into larger meta-structures. During recombination, it monitors several quality metrics including semantic coherence measured through local manifold smoothness, compression potential indicating whether the combination reduces overall complexity, and generalization capacity assessing whether the new structure captures broader patterns. For example, when recombining thoughts about "gradient descent" from a machine learning bundle with thoughts about "energy minimization" from a physics bundle, thought recombinator 410 might discover a meta-concept about "optimization in curved spaces" that provides a unified framework applicable across domains.

A curvature editor 420 performs targeted modifications to the manifold's geometric structure based on insights gained from perturbation and recombination. This component has the capability to increase local curvature in regions where semantic compression is beneficial, creating tighter conceptual clusters that enable more efficient reasoning. It can also decrease curvature in areas that have become overly rigid, restoring flexibility for creative thinking and novel connections. Curvature editor 420 implements several curvature modification operations including but not limited to bundle merging procedures that identify overlapping thought structures with high mutual information and smoothly blend their geometric neighborhoods, creating unified regions with consistent curvature properties. It performs curvature diffusion operations that spread high-pressure regions more evenly, preventing the formation of semantic bottlenecks that could impede reasoning. Curvature editor 420 may also implement curvature sharpening around stable conceptual cores, reinforcing well-established knowledge while maintaining softer boundaries for evolving concepts. When editing curvature, the component must maintain global geometric consistency, ensuring that local modifications don't create inconsistencies or singularities elsewhere in the manifold. In one embodiment it may employ Ricci flow-inspired algorithms that naturally evolve curvature toward optimal configurations, balancing local semantic density with global navigability.

A topological operation manager 430 handles the most profound structural modifications to the manifold, including changes that alter its fundamental connectivity. This component can create new topological features such as handles or bridges between previously disconnected regions, enabling novel reasoning pathways that weren't possible in the original manifold structure. When thought recombinator 410 discovers stable interpolations between distant bundles, topological operation manager 430 evaluates whether to establish permanent connections. It implements sophisticated surgery operations that can split overly complex regions into simpler components, merge adjacent regions that have developed sufficient similarity, or create higher-genus structures that enable multiply-connected reasoning paths. Topological operation manager 430 performs topological analysis to identify features such as holes in the manifold representing conceptual gaps, bottlenecks where all reasoning must pass through constrained regions, and islands of isolated knowledge that could benefit from connection. For instance, if the system has separately developed expertise in "visual pattern recognition" and "time series analysis," topological operation manager 430 might identify an opportunity to create a bridge through "spatiotemporal pattern analysis," fundamentally expanding the system's reasoning capabilities. All topological modifications are carefully validated to ensure they preserve essential semantic relationships while enabling new forms of inference.

A dream flow manager 440 orchestrates the overall flow of dreaming operations, coordinating the activities of other components to ensure coherent and beneficial manifold evolution. This component implements three primary flow types that govern how dreaming unfolds. The perturbation flow controls how stochastic exploration propagates through the manifold, managing the selection of regions for perturbation, the intensity and direction of noise injection, and the propagation of discoveries to related areas. The compression flow guides the consolidation of redundant or inefficient structures, identifying opportunities for semantic compression, orchestrating the merger of similar concepts, and ensuring that compression preserves essential distinctions. The generalization flow promotes the discovery and reinforcement of abstract patterns, guiding recombination toward higher-order structures, identifying successful generalizations for preservation, and propagating useful abstractions throughout the manifold. Dream flow manager 440 monitors the overall health of the dreaming process through metrics such as semantic coherence, structural stability, and compression efficiency. It implements adaptive control mechanisms that adjust flow parameters based on the current state of the manifold and the outcomes of recent modifications, ensuring that dreaming remains beneficial rather than disruptive.

A memory pruner 450 performs essential cleanup operations that prevent the manifold from becoming cluttered with obsolete or redundant structures. This component implements sophisticated forgetting mechanisms that go beyond simple deletion, carefully removing structures while preserving the integrity of surrounding geometry. It identifies candidates for pruning based on multiple criteria including thermodynamic decay where thoughts with consistently low activation energy are marked for removal, structural redundancy where nearly identical thought patterns exist in multiple locations, and semantic incoherence where thoughts no longer maintain meaningful connections to the broader manifold. Memory pruner 450 implements gradual pruning processes that slowly dissolve unwanted structures rather than creating abrupt deletions that could destabilize nearby regions. During pruning, it redistributes the "semantic mass" of removed thoughts to related structures, ensuring that useful aspects are preserved even as redundant representations are eliminated. The component also performs defragmentation operations that consolidate sparse regions and tighten the overall manifold structure. For example, after extended operation, the system might accumulate multiple slightly different representations of similar concepts acquired in different contexts. Memory pruner 450 identifies these redundancies and carefully merges them into single, more robust representations while preserving the unique aspects that provide contextual flexibility.

These components within dream manager 140 implement a process of autonomous cognitive evolution. Thought perturbator 400 explores the stability and potential of existing structures, thought recombinator 410 synthesizes new abstractions and connections, curvature editor 420 optimizes the geometric landscape, topological operation manager 430 enables fundamental structural innovations, dream flow manager 440 orchestrates coherent evolution, and memory pruner 450 maintains cognitive efficiency. This architecture enables the PCM to continuously improve its internal representations without external supervision, developing increasingly sophisticated reasoning capabilities through the natural evolution of its geometric substrate. The dreaming process transforms accumulated experience into structural wisdom, creating a manifold that not only stores knowledge but embodies understanding in its very geometry.

Figure 5:
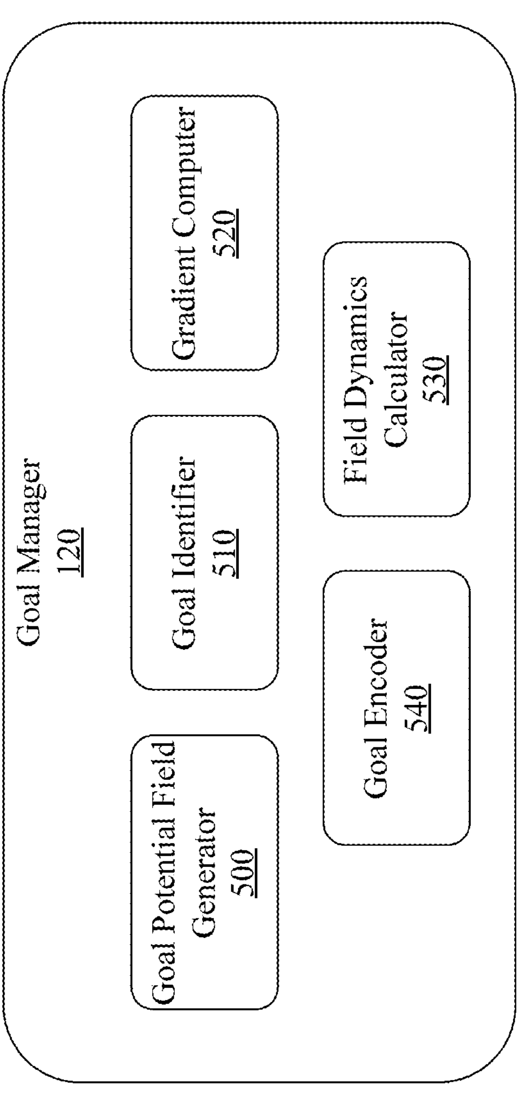
FIG. 5 is a block diagram illustrating an exemplary architecture of a component within a Persistent Cognitive Machine (PCM), a goal manager.

FIG. 5 is a block diagram illustrating an exemplary architecture of a component within a Persistent Cognitive Machine (PCM), a goal manager. Unlike traditional goal-directed systems that implement objectives as discrete targets or symbolic constraints, goal manager 120 generates continuous scalar fields that attract attention and guide reasoning through geometric influence. This component transforms abstract intentions, user queries, and system objectives into structured force fields that interact with the manifold's compression landscape to create rich cognitive dynamics.

A goal identifier 510 serves as the initial processing stage that recognizes, categorizes, and prioritizes various goal sources entering the system. Goal identifier 510 processes inputs from multiple channels including explicit user queries that directly state objectives or ask questions, implicit user patterns derived from interaction history and preferences, system-generated goals arising from internal drives such as uncertainty reduction or consistency maintenance, and task constraints imposed by external requirements or operational parameters. Goal identifier 510 implements parsing algorithms that go beyond keyword extraction to understand the semantic intent behind goals. When processing a user query such as "How can we apply quantum computing principles to optimize machine learning algorithms?", the component identifies multiple nested goals: understanding quantum computing principles, comprehending optimization in machine learning, finding intersection points between these domains, and generating practical applications. Goal identifier 510 also performs goal decomposition, breaking complex objectives into hierarchical subgoals that can be pursued in parallel or sequence. It maintains a goal registry that tracks active objectives, their priorities, interdependencies, and completion states. The component implements conflict detection mechanisms that identify when multiple goals may be contradictory or competing for the same cognitive resources, flagging these for special handling by other components. For long-term interactions, goal identifier 510 maintains persistent goal structures that evolve across sessions, enabling the system to pursue complex objectives that require extended reasoning or multiple interaction cycles.

A goal encoder 540 transforms identified goals from their raw representational form into geometric structures compatible with the manifold's architecture. This encoding process goes beyond simple embedding, creating rich geometric objects that can effectively influence manifold dynamics. Goal encoder 540 implements multiple encoding strategies tailored to different goal types. For similarity-based goals, it computes embedding vectors and defines potential fields, creating gradients that attract attention toward semantically similar regions. For constraint-based goals, it generates potential fields with low values in prohibited regions and high values in acceptable areas, effectively creating barriers and channels that guide reasoning. Goal encoder 540 also implements contrastive encoding for goals that require distinguishing between concepts, creating potential fields with opposing gradients that push attention away from certain regions while pulling toward others. For complex multi-faceted goals, goal encoder 540 generates composite fields that superimpose multiple potential patterns, creating rich landscapes with multiple attractors, saddle points, and gradient flows. The encoding process considers the current state of the manifold, adapting the potential field to work effectively with existing compression patterns and thought structures. For instance, when encoding a goal related to creative problem-solving, the component might generate a potential field with multiple local maxima in different semantic regions, encouraging exploration of diverse solution approaches rather than convergence on a single path.

A goal potential field generator 500 takes encoded goals and constructs the complete scalar field across the entire manifold. This component implements field generation algorithms that create smooth, differentiable potential landscapes while respecting the manifold's geometric constraints. The generator computes field values at each point by considering multiple factors including semantic distance from goal representations, alignment with goal constraints and requirements, historical success rates for similar goals in nearby regions, and interaction effects between multiple concurrent goals. Goal potential field generator 500 employs kernel methods to create smooth field variations, preventing discontinuities that could destabilize attention flow. It implements field normalization procedures to ensure that potential values remain within reasonable ranges across the manifold, preventing any single goal from completely dominating cognitive dynamics. Goal potential field generator 500 also generates time-varying fields for goals that evolve during reasoning, smoothly interpolating between different field configurations to maintain continuity. For hierarchical goals, it creates nested potential structures where achieving sub-goals creates local maxima within the broader landscape of the primary objective. The generator must balance field strength to create sufficient attractive force without overwhelming the natural dynamics of compression and manifold structure. For example, when generating a field for a goal requiring innovative connections between disparate concepts, the component might create a potential landscape with a valley between the concepts that gradually rises, encouraging exploration of the intermediate space where novel connections might emerge.

A gradient computer 520 calculates the vector field that determines the direction and magnitude of goal-induced forces at each point in the manifold. This component implements efficient algorithms for computing gradients in curved space, accounting for the manifold's metric structure to ensure that gradients represent true geometric directions rather than naive coordinate derivatives. Gradient computer 520 employs multiple computational strategies including finite difference methods adapted for manifolds, automatic differentiation through the field generation process, and analytical gradients for simple field configurations. It computes not only first-order gradients but also higher-order derivatives such as the Hessian, which indicates the local curvature of the potential field and helps identify critical points such as maxima, minima, and saddle points. The component maintains a continuously updated gradient map across frequently accessed regions of the manifold, enabling rapid attention flow calculations without repeated gradient computation. For regions of high curvature or complex metric structure, gradient computer 520 implements adaptive sampling strategies that ensure accurate gradient estimation despite geometric complications. It also computes gradient statistics such as divergence and curl, providing insights into the global flow patterns induced by the goal field. These computations enable analyses of goal dynamics, identifying convergence regions where attention naturally flows, circulation patterns that might indicate conceptual loops, and divergence zones where exploratory behavior is encouraged.

A field dynamics calculator 530 analyzes and predicts the complex behaviors that emerge from the interaction between goal potential fields and the manifold's other forces. This component simulates how attention will flow under the combined influence of goal attraction, compression resistance, and the inherent dynamics of the attention field itself. Field dynamics calculator 530 implements several analytical capabilities including trajectory prediction that estimates likely attention paths given current conditions, stability analysis that identifies whether goal configurations will lead to stable focus or oscillatory behavior, and bifurcation detection that recognizes when small changes in goals might lead to dramatically different cognitive outcomes. The component models various emergent phenomena such as gradient following where attention flows smoothly up potential gradients toward goal regions, tunneling effects where strong goal potentials can overcome high compression barriers, and competitive dynamics where multiple goals create complex flow patterns with unpredictable outcomes. For multi-goal scenarios, field dynamics calculator 530 computes Pareto frontiers that identify optimal trade-offs between competing objectives, helping the system navigate complex decision spaces. It also analyzes temporal dynamics, predicting how goal influences will evolve as the manifold structure changes through use and learning. The component can identify potential failure modes such as local maxima that might trap attention before reaching true goals, unstable equilibria where small perturbations cause large behavioral changes, and chaotic regions where goal interactions create unpredictable dynamics. For instance, when analyzing goals that require balancing exploration with exploitation, field dynamics calculator 530 might identify parameter regimes where the system naturally alternates between focused pursuit and broad exploration, optimizing long-term learning and performance.

The components within goal manager 120 create a system for translating abstract objectives into concrete geometric influences that shape cognitive behavior. Goal identifier 510 recognizes and structures incoming objectives, goal encoder 540 transforms them into geometric representations, goal potential field generator 500 creates smooth scalar fields across the manifold, gradient computer 520 determines the resulting force fields, and field dynamics calculator 530 predicts and analyzes the emergent behaviors. This architecture enables the PCM to pursue complex goals not through rigid programming or symbolic planning, but through the natural dynamics of attention flowing through shaped space. Goals become not commands to be executed but influences that guide the fluid motion of thought, creating a form of intentionality that emerges from geometry rather than being imposed upon it. Goal manager 120 thus provides the motivational landscape that, combined with the manifold's memory structure and compression dynamics, enables purposeful yet flexible cognitive behavior that can adapt, learn, and discover unexpected solutions through the natural evolution of geometric attention.

Figure 6:
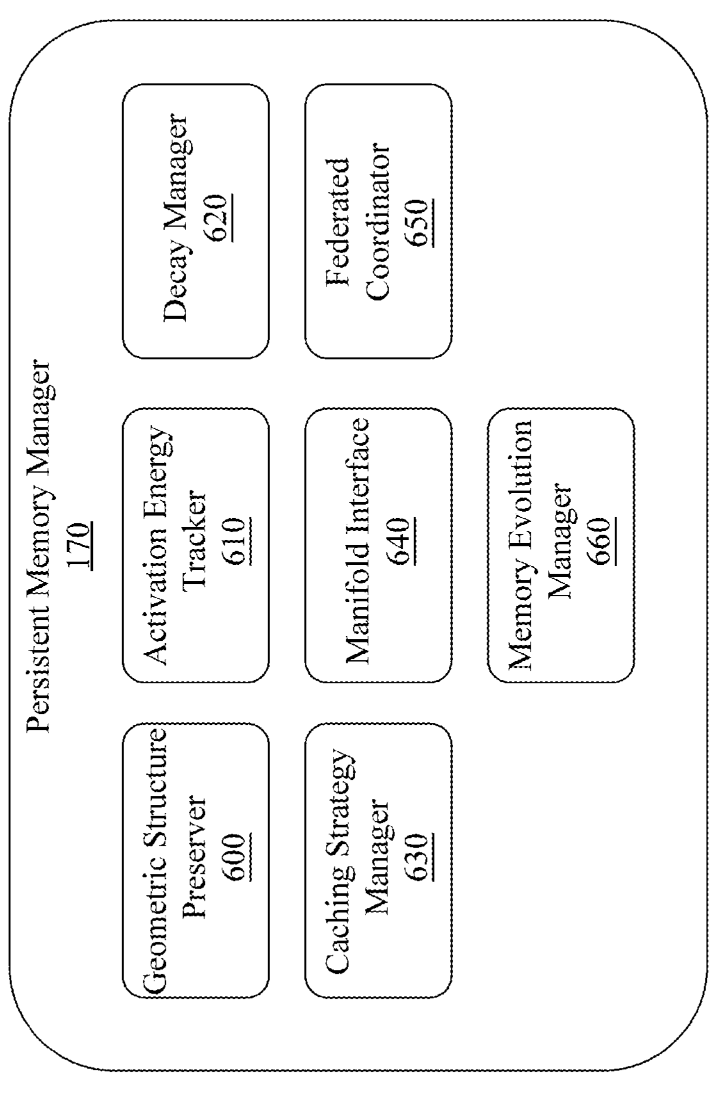
FIG. 6 is a block diagram illustrating an exemplary architecture of a component within a Persistent Cognitive Machine (PCM), a persistent memory manager.

FIG. 6 is a block diagram illustrating an exemplary architecture of a component within a Persistent Cognitive Machine (PCM), a persistent memory manager. Unlike traditional memory systems that store static data in hierarchical caches, persistent memory manager 170 implements an approach where memory exists as living geometric structures within the latent manifold, subject to natural evolution through usage patterns and energy dissipation. This component serves as the bridge between the dynamic latent manifold and long-term cognitive persistence, ensuring that thoughts—discrete units of reasoning or analysis generated during processing—are preserved not as isolated data points but as interconnected geometric structures with semantic relationships intact.

A geometric structure preserver 600 maintains the fundamental geometric integrity of stored thoughts and their relationships within the thought cache, a structured memory layer configured to store and retrieve thoughts based on semantic similarity, contextual alignment, and system policy. This component preserves thought bundles as compact submanifolds, maintaining their internal metric structure, boundary conditions, and topological relationships to neighboring bundles. When thoughts are cached, geometric structure preserver 600 ensures that not only the content but also the geometric context is maintained, including the local curvature patterns that indicate semantic density, the geodesic paths that connect related concepts, and the metric tensor values that define distances within thought neighborhoods. For instance, when storing a complex reasoning chain about quantum computing applications, the component preserves not just the individual thoughts but their geometric arrangement as a coherent bundle, maintaining the curved paths that connect foundational physics concepts to practical implementations. Geometric structure preserver 600 implements sophisticated algorithms to handle the challenges of preserving dynamic geometric structures, including maintaining consistency as the manifold evolves, handling coordinate transformations between different chart representations, and ensuring that preserved structures remain compatible with the current manifold geometry when retrieved later.

An activation energy tracker 610 implements the thermodynamic model of memory persistence by assigning and monitoring activation energies to each cached thought and thought structure. Activation energy tracker 610 goes beyond simple access counting, implementing a energy model where thoughts gain energy through various forms of cognitive engagement including direct retrieval for query processing, traversal along geodesic paths that pass near the thought, participation in successful reasoning chains, and reinforcement through goal achievement. Activation energy tracker 610 maintains a continuous energy landscape across all cached structures, tracking not just individual thought energies but also the energy distributions within thought bundles and along frequently traversed paths. Energy updates follow the principle that thoughts contributing to successful cognitive outcomes receive energy boosts, while those that remain unused gradually dissipate energy according to the thermodynamic decay equation. The tracker also implements energy inheritance mechanisms where new thoughts created through generalization—the process of synthesizing new thoughts from cached thoughts by identifying shared structure—inherit appropriate energy levels from their parent thoughts, ensuring that valuable abstractions maintain sufficient activation to persist.

A decay manager 620 implements the natural forgetting mechanism through thermodynamic principles, executing a decay equation. This component continuously monitors thought energies and initiates pruning operations when falls below the threshold, ensuring that the thought cache maintains efficiency by naturally eliminating obsolete or redundant information. Decay manager 620 implements pruning strategies that go beyond simple deletion, including gradual energy dissipation that allows thoughts to fade naturally rather than disappearing abruptly, redistribution of semantic content from decaying thoughts to related structures that remain active, and preservation of structural integrity by carefully removing thoughts without creating discontinuities in the manifold. Decay manager 1320 may also implement contextual decay modulation where decay rates adjust based on factors such as the semantic uniqueness of a thought, its role in connecting otherwise disparate concepts, and its participation in rarely accessed but critically important knowledge. For example, foundational mathematical concepts might decay more slowly than specific computational examples, preserving essential knowledge infrastructure while allowing detailed instances to fade when no longer needed.

A manifold interface 640 provides the bidirectional connection between persistent memory manager 170 and the latent manifold, enabling seamless flow of geometric structures in both directions. This interface implements protocols for reading geometric structures from memory into the active manifold, including reconstruction of thought bundles with their full geometric context, restoration of geodesic paths and their associated curvature patterns, and integration of retrieved structures with the current manifold state. When writing updates back to memory, manifold interface 640 captures not just the modified thoughts but the entire geometric context of their evolution, preserving information about new connections formed during reasoning, changes in local curvature due to compression or expansion, and trajectory patterns that indicate successful reasoning strategies. Manifold interface 640 maintains synchronization between the persistent memory structures and the dynamic manifold state, handling challenges such as version conflicts when the manifold has evolved since a thought was cached, geometric inconsistencies that arise from independent evolution of different regions, and efficient incremental updates that avoid rewriting entire structures for small changes.

A caching strategy manager 630 implements intelligent policies for determining which thoughts and structures to preserve in the various tiers of the thought cache, including session caches for short-term interaction, long-term caches for persistent knowledge, and shared or federated caches across devices or agents. Unlike traditional caching strategies based on recency or frequency alone, this component implements geometric and semantic criteria for cache management. Cached thoughts are indexed in latent space using sophisticated methods that preserve geometric relationships, enabling retrieval using vector similarity, trajectory proximity, or geodesic alignment. Caching strategy manager 630 implements compression strategies where cached thoughts may be compressed or abstracted over time to reduce redundancy and support scalable reuse. It determines optimal compression levels by balancing storage efficiency with retrieval fidelity, identifies opportunities for thought generalization where multiple similar thoughts can be replaced by a single abstraction, and manages the distribution of thoughts across cache tiers based on access patterns and semantic importance. The component also implements predictive caching strategies that anticipate future needs based on observed cognitive patterns and preemptively adjust cache contents to optimize for expected usage.

A federated coordinator 650 enables knowledge sharing and synchronization across multiple PCM instances while maintaining privacy and semantic integrity. Federated coordinator 1350 implements geometric abstraction protocols that allow thoughts to be shared at appropriate levels of generalization, ensuring that instance-specific details remain private while valuable patterns propagate across the federation. Federated coordinator 650 manages the complex challenges of cross-instance memory coordination including aligning geometric structures from different manifolds that may have evolved independently, determining appropriate abstraction levels for shared thoughts to balance utility with privacy, and handling conflicts when different instances have developed incompatible representations of similar concepts. Federated coordinator 650 implements consensus mechanisms that respect local geometric structures while enabling global knowledge emergence, using techniques such as curvature matching to identify compatible regions across manifolds, bundle projection to map local structures into shared space, and distributed evolution protocols that allow federated improvements to propagate back to local instances.

A memory evolution manager 660 orchestrates the various mechanisms through which persistent memory structures adapt and improve over time. Memory evolution manager 660 implements a plurality of evolution mechanisms that shape the long-term development of the memory system. Reinforcement operations strengthen frequently used thoughts and paths by increasing local curvature around valuable structures, tightening geodesic connections between related concepts, and enhancing the stability of successful reasoning patterns. Compression operations identify and merge redundant or highly similar structures, implementing the latent recombinator functionality to blend similar thoughts or trajectories into unified abstractions while preserving essential distinctions. Abstraction operations extract higher-level patterns from collections of specific instances, creating generalized thoughts that capture core principles while enabling broader application across contexts. Forgetting operations, coordinated with decay manager 620, ensure that memory evolution includes not just growth but also selective pruning that maintains system efficiency and relevance. Memory evolution manager 660 implements these operations according to sophisticated scheduling algorithms that balance immediate system needs with long-term optimization goals, ensuring that memory evolution enhances rather than disrupts ongoing cognitive operations.

The components create a persistent memory system that transcends traditional storage paradigms. Geometric structure preserver 600 maintains the rich relationships between thoughts, activation energy tracker 610 and decay manager 620 implement natural memory dynamics, manifold interface 640 enables integration with active cognition, the caching strategy manager 630 optimizes for both efficiency and semantic value, federated coordinator 650 enables collective intelligence while preserving privacy, and memory evolution manager 660 ensures continuous improvement through use. This architecture implements structured memory where thoughts are stored not as flat vectors but as positions or paths within an evolving manifold, supporting context-sensitive access, memory reinforcement through traversal, lawful pruning, and dynamic generalization. The result is a memory system that doesn't merely store information but actively participates in the cognitive process, shaping and being shaped by the ongoing evolution of thought within the geometric substrate of the Persistent Cognitive Machine.

Figure 7:
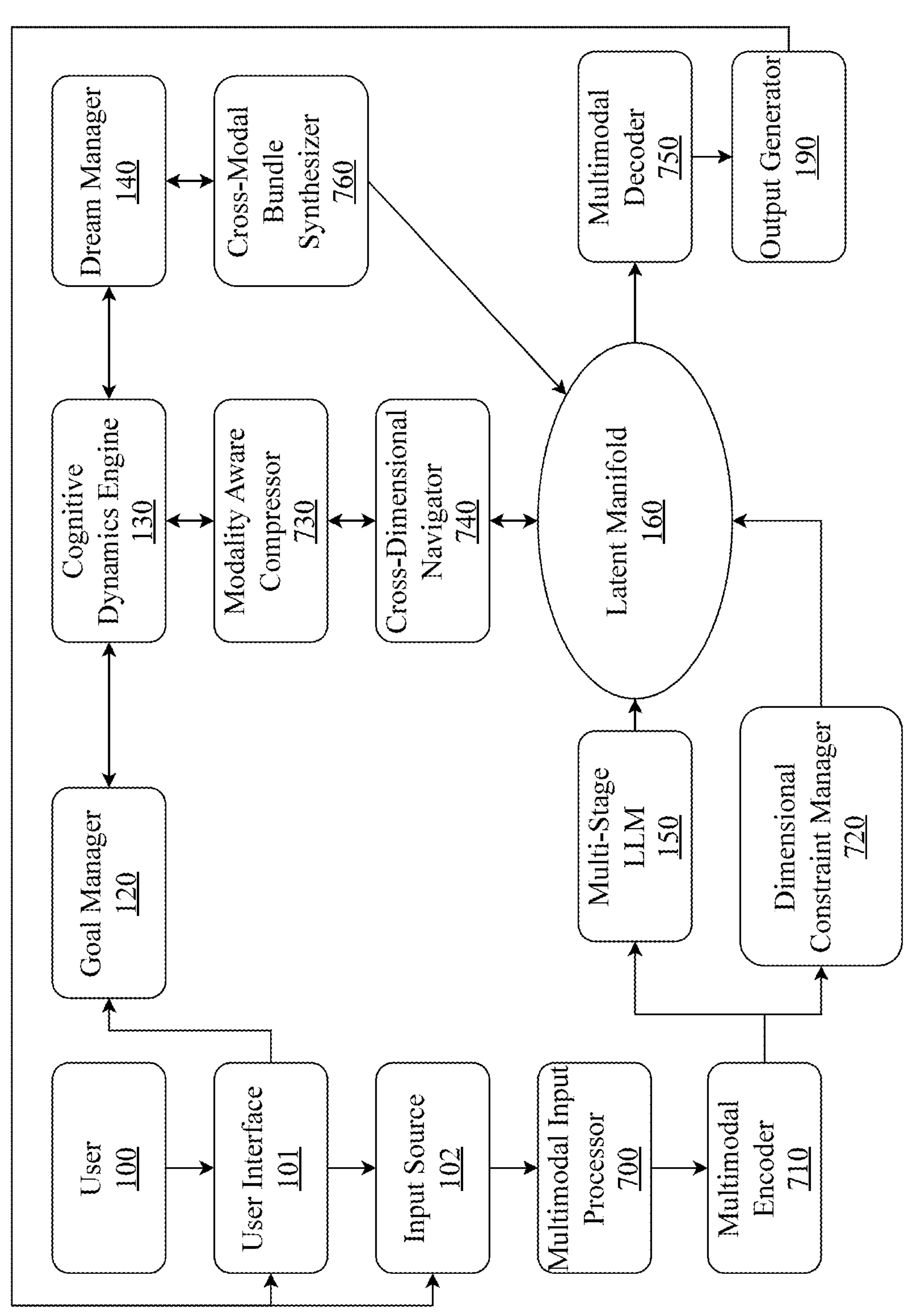
FIG. 7 is a block diagram illustrating an exemplary system architecture of a Persistent Cognitive Machine (PCM) enhanced with multimodal processing capabilities.

FIG. 7 is a block diagram illustrating an exemplary system architecture of a Persistent Cognitive Machine (PCM) enhanced with multimodal processing capabilities. A multimodal input processor 700 serves as the initial processing stage for diverse sensory streams arriving asynchronously and in varying formats. Multimodal input processor 700 implements synchronization and alignment mechanisms for heterogeneous inputs including but not limited to visual imagery with spatial and spectral information, acoustic signals with temporal patterns and frequency content, textual data with symbolic structures, and specialized sensor readings such as thermal, pressure, or electromagnetic data. The processor handles temporal misalignment between modalities by maintaining sliding temporal windows that buffer incoming streams, correlating events across modalities through semantic markers and temporal proximity. For example, when processing surveillance footage with multiple camera angles and microphone arrays, multimodal input processor 700 aligns visual frames with acoustic events, compensating for different capture rates and propagation delays to create temporally coherent multimodal packets ready for unified encoding.

A multimodal encoder 710 extends the capabilities of the standard encoder by implementing specialized encoding pathways that preserve modality-specific properties while mapping into a unified geometric space. This component decomposes each input modality into a plurality of distinct dimensional spaces, including but not limited to spectral dimensions capturing frequency-domain characteristics such as color spectra, acoustic harmonics, and electromagnetic signatures; spatial dimensions encoding geometric relationships, topological structures, and positional information; temporal dimensions representing sequential dependencies, causal flows, and dynamic patterns; and scale dimensions enabling hierarchical representation from fine details to global structures. The encoding process maintains modality-specific constraints while establishing cross-dimensional relationships through shared latent regions. For instance, when encoding a musical performance, multimodal encoder 710 preserves the harmonic structure in spectral dimensions, spatial positioning of instruments, temporal rhythm patterns, and scale hierarchies from individual notes to musical phrases, creating a rich geometric representation where all these aspects coexist coherently.

A dimensional constraint manager 720 coordinates the complex interactions between different dimensional representations within the unified manifold. Dimensional constraint manager 720 component maintains separate constraint spaces for each dimension while ensuring geometric consistency across modal boundaries. It implements constraint harmonization algorithms that prevent semantic distortion when information flows between dimensions, such as ensuring that temporal patterns in audio maintain correspondence with visual motion when both represent the same physical event. Dimensional constraint manager 720 dynamically adjusts constraint boundaries based on the semantic content being processed, tightening constraints for precise technical data while relaxing them for abstract conceptual information. The component maintains a learned registry of valid cross-dimensional mappings, continuously updated through successful multimodal inferences, enabling recognition of natural correspondences like the relationship between vocal tract shapes (spatial) and formant frequencies (spectral) in speech production.

A modality aware compressor 730 works in conjunction with cognitive dynamics engine 130 to implement differential compression strategies tailored to each sensory modality's information characteristics. Unlike uniform compression, this component recognizes that different modalities exhibit distinct redundancy patterns: visual data often contains spatial correlation, audio exhibits temporal continuity, text follows syntactic patterns, and sensor data may show periodic regularities. The compressor generates heterogeneous pressure fields across the manifold, where compression pressure varies not only by semantic density but also by modality type. In regions representing human speech, for example, modality aware compressor 730 applies minimal compression to spectral-temporal features critical for phoneme discrimination while aggressively compressing redundant spatial information, creating an efficient representation that preserves perceptual fidelity where it matters most.

A cross-dimensional navigator 740 enables traversal between different modal representations while maintaining semantic coherence. This component identifies and reinforces semantic bridges, regions where different modalities naturally converge, such as where visual lip movements align with acoustic speech patterns, or where textual descriptions correspond to visual scenes. Cross-dimensional navigator 740 implements smooth geodesic interpolation for attention transitions, gradually transforming attention vectors from source to target dimensional constraints. When navigating from a textual query to relevant visual memories, it guides attention through intermediate spaces where linguistic features (like spatial prepositions) naturally map to visual properties (like geometric relationships), ensuring meaning preservation throughout the transition. The navigator maintains bidirectional communication pathways and stores complete trajectory information, enabling speculative cross-modal exploration with guaranteed return paths to stable states.

A cross-modal bundle synthesizer 760 operates during dreaming phases managed by dream manager 140 to discover and create unified representations spanning multiple sensory domains. This component samples thought bundles from different modalities that exhibit structural similarity despite their different sensory origins, applying specialized recombination algorithms that blend modal-specific features while preserving essential relationships. Cross-modal bundle synthesizer 760 identifies invariant patterns across modalities, such as rhythmic patterns that manifest in both visual motion and acoustic beats, or textural qualities that appear in both tactile and visual domains. Through iterative perturbation and recombination, it generates meta-modal abstractions that capture these cross-cutting patterns, creating new thought bundles that serve as bridges between previously disconnected modal regions. These synthesized bundles become permanent features of the manifold, enabling future rapid recognition of multimodal patterns and more efficient cross-modal inference.

A multimodal decoder 750 performs the inverse transformation of multimodal encoder 710, reconstructing observable outputs from unified geometric representations. This component interprets the rich multimodal structure within the manifold, including cross-dimensional trajectories and activated bundles spanning multiple modalities. Multimodal decoder 750 can generate coherent outputs in any requested modality or combination, leveraging the geometric relationships to ensure consistency. When decoding a memory of a thunderstorm, it can simultaneously generate the visual lightning pattern, the acoustic thunder profile with appropriate delay, the textual description, and even associated sensory experiences like pressure changes, all derived from the same unified geometric representation. The decoder adapts its output based on available channels and user preferences while maintaining semantic coherence across all generated modalities.

These multimodal components integrate with the existing PCM architecture, where latent manifold 160 now supports heterogeneous geometric structures for different modalities, cognitive dynamics engine 130 manages cross-modal dynamics, and goal manager 120 can define objectives spanning multiple sensory channels. The result is a system capable of integrated multimodal cognition, where information from different senses reinforces and enriches understanding through unified geometric representation and navigation.

Figure 8:
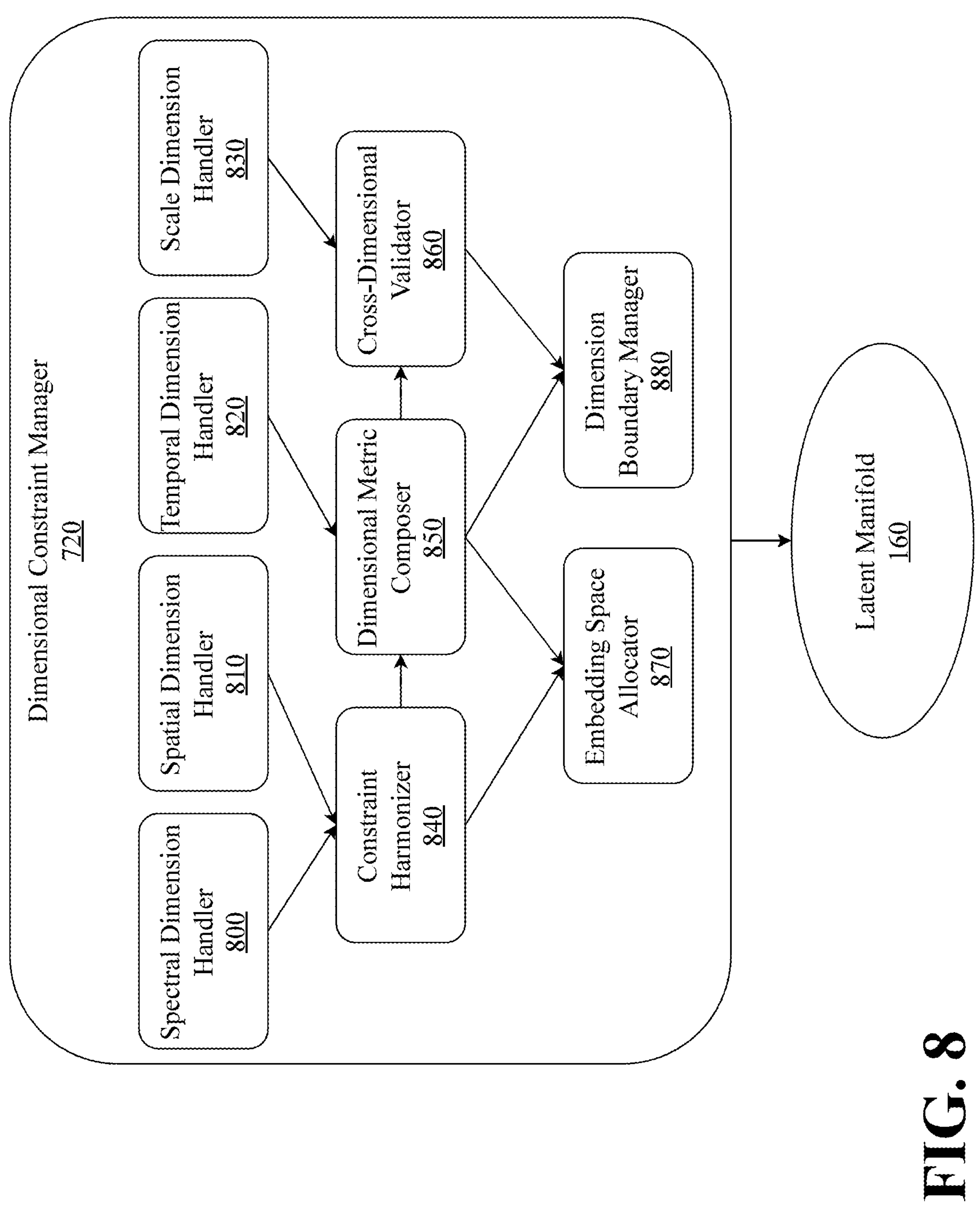
FIG. 8 is a block diagram illustrating an exemplary architecture of a dimensional constraint manager within an enhanced Persistent Cognitive Machine (PCM).

FIG. 8 is a block diagram illustrating an exemplary architecture of a dimensional constraint manager within an enhanced Persistent Cognitive Machine (PCM). A spectral dimension handler 800 manages constraints specific to frequency-domain information across all sensory modalities. Spectral dimension handler 800 maintains spectral constraint spaces that govern how frequency-based information is represented geometrically, including but not limited to harmonic relationships in acoustic data where overtones must maintain integer frequency ratios, color spectra in visual data where wavelength relationships determine perceptual color mixing, and electromagnetic signatures where phase relationships carry critical information.

Spectral dimension handler 800 implements Fourier-based constraint enforcement that ensures spectral components maintain proper phase relationships during geometric transformations, preventing spectral smearing or aliasing that could destroy critical frequency information. For example, when processing musical content, this handler ensures that harmonic relationships between fundamental frequencies and overtones are preserved as geometric relationships in the manifold, such that a perfect fifth maintains its frequency ratio as a consistent geometric distance regardless of absolute pitch.

A spatial dimension handler 810 governs constraints related to geometric and topological relationships within the manifold. This handler maintains spatial invariants including but not limited to distance relationships, angular measurements, topological connectivity, and coordinate system transformations. Spatial dimension handler 810 implements constraint sets that preserve critical spatial properties during manifold operations, such as ensuring that relative positions remain consistent when attention traverses between different viewpoints, maintaining topological properties like connectivity and holes when spatial structures are compressed, and preserving orientation relationships critical for spatial reasoning. When processing visual scenes or spatial sensor data, this handler ensures that geometric relationships like parallel lines, perpendicular surfaces, and relative distances maintain their semantic meaning even as the manifold evolves and adapts.

A temporal dimension handler 820 manages constraints specific to time-dependent information and sequential relationships. This handler maintains temporal ordering constraints, causality relationships, synchronization requirements across modalities, and temporal resolution hierarchies. Temporal dimension handler 820 implements specialized constraint enforcement for maintaining temporal coherence, including but not limited to ensuring that cause precedes effect in all geodesic paths through temporal regions, preserving rhythm and tempo relationships in periodic signals, maintaining proper time delays between correlated events in different modalities, and supporting multiple temporal scales from microseconds to extended durations. For instance, when processing audiovisual speech, this handler ensures that the temporal relationship between lip movements and acoustic events maintains proper synchronization offsets that reflect physical propagation delays.

A scale dimension handler 830 governs hierarchical relationships and multi-resolution representations within the manifold. This handler maintains scale-based constraints that ensure consistency across different levels of abstraction, from fine details to global patterns. Scale dimension handler 830 implements constraint hierarchies that preserve parent-child relationships in hierarchical decompositions, maintain scale-invariant features that should remain consistent across zoom levels, ensure proper aggregation rules when moving from fine to coarse scales, and support scale-dependent visibility where certain features only emerge at specific scales. When processing hierarchical data like satellite imagery at multiple resolutions or audio at different time scales, this handler ensures that information at different scales maintains proper relationships and that transitions between scales preserve semantic continuity.

A constraint harmonizer 840 serves as a coordination point where constraints from all dimensional handlers are integrated and potential conflicts are resolved. This component receives constraint specifications from each dimensional handler and identifies potential conflicts or incompatibilities between different dimensional requirements. Constraint harmonizer 840 implements conflict resolution algorithms including priority-based resolution where certain constraints take precedence based on the current cognitive task, relaxation methods that find compromise solutions when constraints cannot be simultaneously satisfied, and dynamic reweighting that adjusts constraint importance based on semantic context. For example, when processing a video of a musical performance, constraint harmonizer 840 might need to balance competing requirements between maintaining precise temporal synchronization (from temporal constraints) and preserving harmonic relationships (from spectral constraints), finding an optimal compromise that maintains perceptual coherence.

A dimensional metric composer 850 takes the harmonized constraints and generates unified metric tensors that govern distance measurements within the multimodal manifold. This component transforms abstract constraints into concrete geometric structures by computing local metric components that reflect the relative importance of different dimensions, defining cross-dimensional coupling terms that capture relationships between modalities, and ensuring metric positive-definiteness to maintain valid geometric structure. Dimensional metric composer 850 produces adaptive metrics that can emphasize different dimensional aspects based on context, for instance, increasing spectral dimension weights when processing music while emphasizing spatial dimensions for visual navigation tasks. The composed metrics ensure that geodesic paths through the manifold naturally respect the underlying constraints of each modality while enabling smooth transitions between dimensional subspaces.

A cross-dimensional validator 860 performs continuous verification that geometric operations maintain semantic validity across dimensional boundaries. This component monitors all cross-dimensional transitions and transformations to ensure that meaning is preserved when information moves between modalities. Cross-dimensional validator 860 implements validation checks including but not limited to semantic consistency verification that ensures cross-modal mappings preserve meaning, boundary condition testing at dimensional interfaces, conservation law enforcement for quantities that should remain invariant, and stability analysis of cross-dimensional geodesic paths. When detecting violations, the validator can trigger corrective actions such as path re-routing to avoid problematic transitions or constraint relaxation in specific regions to enable necessary cross-modal connections.

An embedding space allocator 870 manages the distribution of the manifold's dimensional resources to ensure efficient representation while maintaining necessary resolution in each dimension. This component dynamically allocates embedding dimensions based on information content, semantic importance, and access patterns. Embedding space allocator 870 implements adaptive allocation strategies including information-theoretic dimension assignment based on entropy in each modality, usage-based expansion where frequently accessed dimensional subspaces receive more resources, and compression-driven consolidation where redundant dimensions are merged or eliminated. The allocator ensures that the total dimensionality remains manageable while providing sufficient representational capacity for each modality's unique requirements.

A dimension boundary manager 880 defines and maintains the interfaces between different dimensional subspaces within the manifold. This component establishes smooth transition regions where different dimensional constraints blend, creating navigable boundaries that enable cross-dimensional flow without discontinuities. Dimension boundary manager 880 implements boundary specifications including transition functions that smoothly interpolate between dimensional constraint sets, buffer zones where constraints from adjacent dimensions overlap and blend, and gateway regions that serve as natural crossing points between modalities. For instance, at the boundary between spectral and spatial dimensions, this manager might create transition regions where frequency-based color information naturally maps to spatial color distributions, enabling smooth navigation between spectral analysis and spatial perception of colored objects.

The output from dimensional constraint manager 720 flows to the latent manifold 160, providing it with a complete geometric framework that respects the intrinsic properties of each sensory modality while enabling unified multimodal representation. This framework ensures that as thoughts move through the manifold, they maintain semantic coherence regardless of which dimensional subspaces they traverse, enabling true multimodal reasoning where insights from one sensory domain can inform understanding in others while preserving the unique characteristics that make each modality valuable for cognition.

Figure 9:
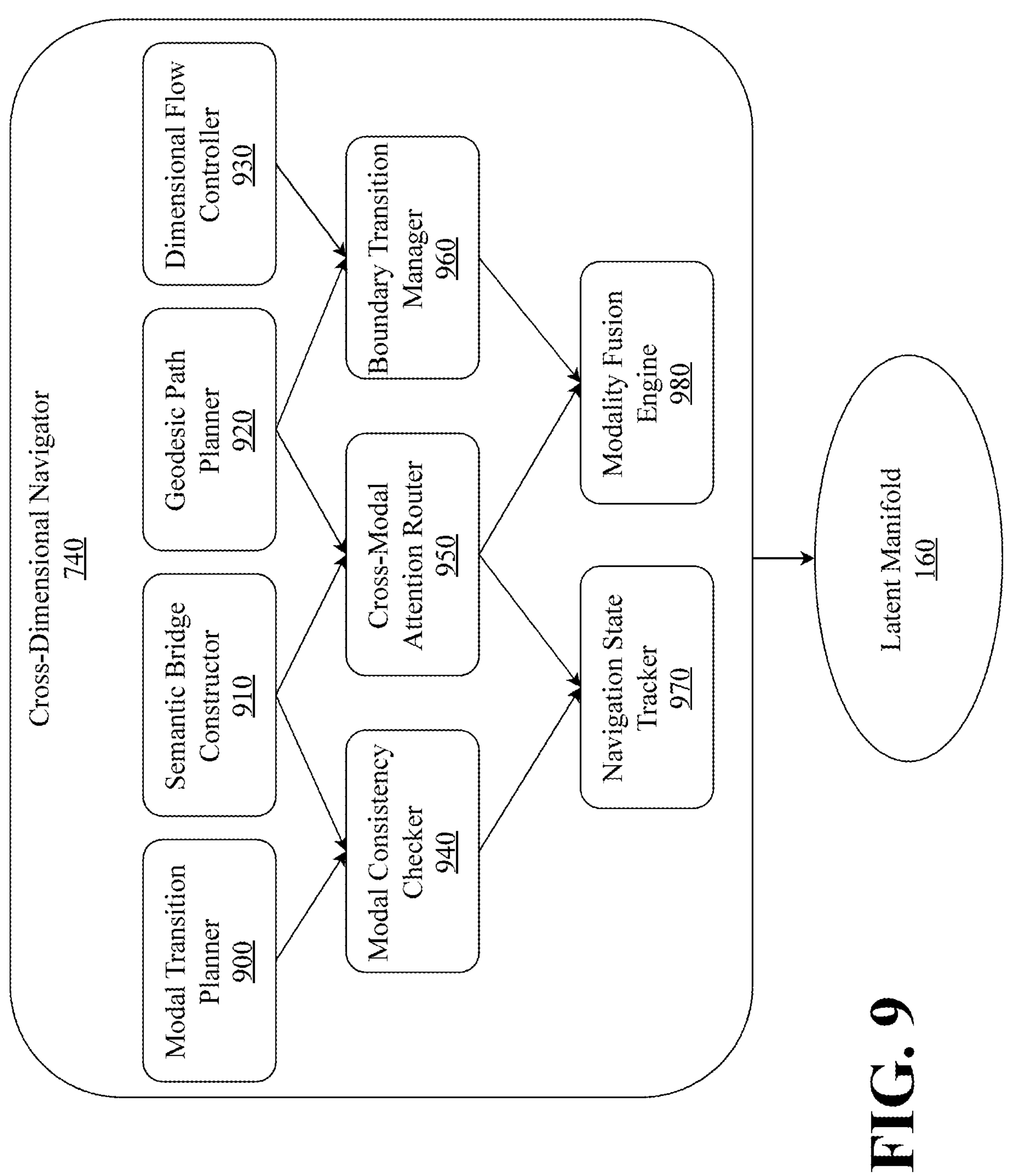
FIG. 9 is a block diagram illustrating an exemplary architecture of a component within an enhanced Persistent Cognitive Machine (PCM), a cross-dimensional navigator.

FIG. 9 is a block diagram illustrating an exemplary architecture of a component within an enhanced Persistent Cognitive Machine (PCM), a cross-dimensional navigator. Unlike traditional multimodal systems that process modalities in isolation or through simple fusion, this component implements geometric navigation principles that respect the manifold's curvature, compression pressure fields, and semantic relationships across dimensional boundaries.

A modal transition planner 900 serves as the strategic planning component that analyzes navigation requests and determines optimal pathways between source and target modalities. This component evaluates the current attention state within the manifold, identifies the dimensional constraints of both source and destination regions, and computes transition costs based on geodesic distance, compression pressure, and semantic alignment. Modal transition planner 900 implements path planning algorithms that consider multiple factors including the semantic distance between modalities measured through manifold curvature, the availability of established cross-modal bridges, the compression pressure along potential routes, and goal potential fields that may favor certain transitions. For instance, when transitioning from textual description to visual memory, the planner might identify multiple viable paths, a direct semantic leap through high-pressure abstract regions, or a longer but smoother trajectory through intermediate representations like spatial language constructs. The planner maintains a learned registry of successful transition patterns, continuously updated through navigation experience, enabling increasingly efficient cross-modal reasoning over time.

A semantic bridge constructor 910 identifies and reinforces regions within the manifold where different modalities naturally converge and share semantic structure. These bridges are not predetermined mappings but emergent features discovered through use and reinforced through successful navigation. Semantic bridge constructor 910 detects cross-modal correspondences by analyzing local manifold geometry, identifying regions where thought bundles from different modalities exhibit similar curvature patterns, overlapping activation trajectories, or correlated compression dynamics. When processing speech, for example, it identifies and strengthens connections between acoustic formant patterns in spectral dimensions and articulatory configurations in spatial dimensions, creating stable bridges that enable fluid movement between auditory perception and motor planning. The constructor implements bridge reinforcement mechanisms that adjust local metric tensors to reduce geodesic distance between semantically aligned regions, create attractor basins around successful cross-modal associations, and establish parallel transport protocols that preserve meaning during dimensional transitions.

A geodesic path planner 920 computes optimal trajectories through the multimodal manifold by solving the variational problem of minimizing cognitive action while respecting dimensional constraints. Building on the geodesic principles established in the cognitive dynamics engine, this component extends the formulation to handle transitions between regions with different dimensional structures. Geodesic path planner 920 implements the modified geodesic equation that accounts for dimensional boundaries, where the Christoffel symbols must be smoothly interpolated between different geometric regimes. The planner computes paths that minimize the integrated cognitive cost including kinetic energy of attention motion, compression pressure from semantic density, goal potential attraction, and additional boundary transition penalties. For cross-modal navigation, it often identifies paths that follow semantic gradients, for instance, when moving from visual to linguistic representation, the geodesic might traverse through increasingly abstract visual features before entering symbolic space, ensuring smooth semantic transformation rather than abrupt modal jumps.

A dimensional flow controller 930 manages the dynamic evolution of attention as it flows between different dimensional constraints within the manifold. This component implements the attention flow equation adapted for heterogeneous dimensional spaces, where the vector field must smoothly transform its dimensional properties during transitions. Dimensional flow controller 930 maintains flow continuity by implementing dimensional projection operators that gradually transform attention vectors from source to target dimensional constraints, adjusting flow velocity based on local compression pressure and semantic density, and ensuring conservation of semantic information despite dimensional transformation. The controller prevents flow discontinuities at modal boundaries by creating transition zones where dimensional constraints blend smoothly, similar to how the manifold's metric tensor evolves continuously despite underlying structural changes. During active navigation, it monitors flow stability metrics and can dynamically adjust path parameters to maintain coherent attention flow even through challenging cross-modal transitions.

A modal consistency checker 940 ensures that semantic meaning is preserved throughout cross-dimensional navigation by continuously monitoring geometric invariants and semantic relationships. This component implements consistency metrics to evaluate structural preservation. Modal consistency checker 940 tracks key invariants during navigation including topological relationships between thought bundles that should remain consistent across modalities, relative distances between semantic concepts that indicate preserved meaning structure, and curvature patterns that encode semantic density and should transform predictably. When detecting potential consistency violations, such as when a spatial relationship in visual data would be distorted in linguistic representation, the checker triggers corrective actions including path adjustment to find alternative routes that better preserve meaning, local manifold deformation to create more consistent transition spaces, or semantic anchoring to maintain relationships during transformation.

A cross-modal attention router 950 directs the flow of attention across the manifold based on current navigation state, goal requirements, and discovered semantic bridges. This component serves as the execution engine for cross-dimensional navigation, translating high-level navigation plans into specific attention movements. Cross-modal attention router 950 implements routing algorithms that dynamically select between available pathways based on current cognitive load and urgency, balance exploration of new cross-modal connections with exploitation of established routes, and coordinate multiple concurrent attention streams when parallel multimodal processing is beneficial. The router maintains attention coherence during complex navigations by implementing attention field superposition when multiple modalities must be simultaneously engaged, managing attention bandwidth allocation across different dimensional streams, and ensuring synchronized arrival when multiple paths converge on target representations.

A boundary transition manager 960 handles the moments when attention crosses from one dimensional regime to another, ensuring smooth transformation while respecting the geometric constraints of each space. This component implements transition protocols that address the mathematical and semantic challenges of dimensional boundaries. Boundary transition manager 960 performs several operations including but not limited to metric tensor interpolation to ensure continuous geometry across boundaries, connection adjustment to maintain parallel transport consistency, and pressure field blending to prevent discontinuous forces at transitions. For example, when attention moves from the continuous spectral dimensions of audio to the discrete symbolic dimensions of text, the manager orchestrates a gradual transformation that preserves phonemic information while enabling symbolic representation, possibly routing through intermediate representations like phonological features that naturally bridge the continuous-discrete divide.

A navigation state tracker 970 maintains comprehensive records of cross-dimensional navigation history, current position, and trajectory information to enable sophisticated navigation strategies and reversibility. This component implements state persistence mechanisms that capture not just position but the full geometric context of navigation. Navigation state tracker 970 records complete trajectory information including paths taken, dimensional transitions encountered, and semantic transformations applied, enabling exact backtracking through modal spaces. It maintains checkpoint states at critical navigation points, particularly at major dimensional boundaries or semantic bifurcations, allowing selective return to previous states while preserving beneficial discoveries. The tracker also accumulates navigation statistics that inform future path planning, identifying frequently successful routes, problematic transition zones, and emerging cross-modal patterns that may warrant bridge construction.

A modality fusion engine 980 performs the final integration of information from multiple dimensional streams when navigation objectives require unified multimodal representation. Unlike simple feature concatenation, this component implements geometric fusion that respects the manifold structure and semantic relationships. Modality fusion engine 980 operates by identifying optimal fusion points within the manifold where different modal representations naturally converge, computing weighted geometric combinations that preserve critical features from each modality, and creating new hybrid representations that capture cross-modal gestalts. The fusion process is guided by the manifold's curvature, with high-curvature regions indicating natural semantic convergence points where fusion is most meaningful. For instance, when fusing visual and auditory streams of a musical performance, the engine identifies regions where rhythmic visual motion and acoustic tempo create natural convergence, fusing at these points to create unified audiovisual representations that capture the full performance gestalt.

These components within cross-dimensional navigator 740 work in concert to enable fluid, meaningful navigation across the multimodal manifold. Modal transition planner 900 provides strategic guidance, semantic bridge constructor 910 identifies and reinforces natural connections, geodesic path planner 920 computes optimal trajectories, dimensional flow controller 930 manages dynamic attention flow, modal consistency checker 940 ensures semantic preservation, cross-modal attention router 950 executes navigation decisions, boundary transition manager 960 handles critical transitions, navigation state tracker 970 maintains history and enables reversibility, and modality fusion engine 980 creates unified representations. Together, they implement a sophisticated navigation system that treats multimodal cognition not as separate processing streams but as movement through a unified geometric space where meaning flows naturally across dimensional boundaries while respecting the unique constraints and opportunities of each sensory modality.

Figure 10:
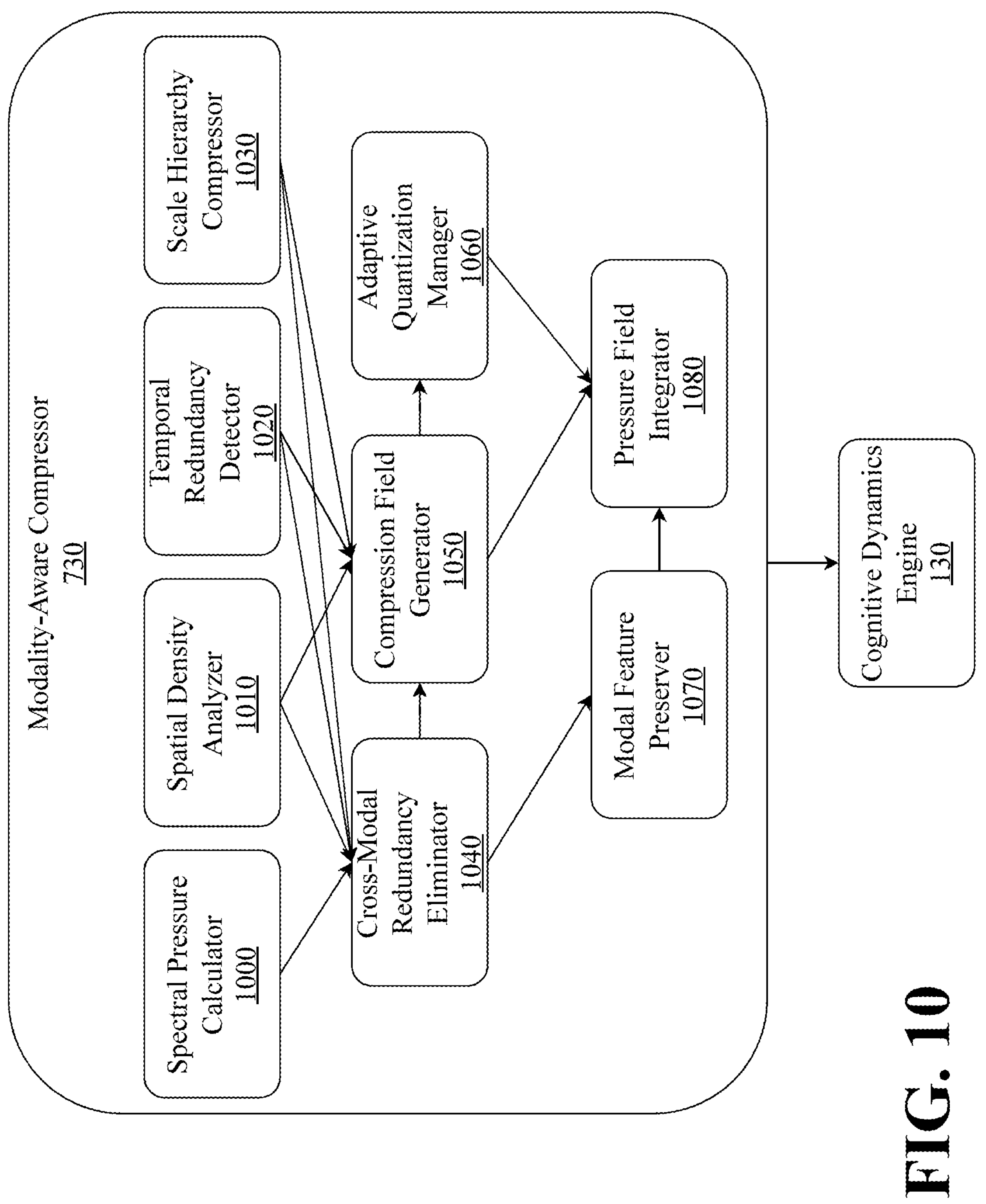
FIG. 10 is a block diagram illustrating an exemplary architecture of a component within an enhanced Persistent Cognitive Machine (PCM), a modality-aware compressor.

FIG. 10 is a block diagram illustrating an exemplary architecture of a component within an enhanced Persistent Cognitive Machine (PCM), a modality-aware compressor. Unlike traditional compression systems that apply uniform algorithms across all data types, this component recognizes that different modalities exhibit distinct patterns of redundancy, importance, and semantic structure, requiring specialized treatment to achieve optimal compression without sacrificing perceptual or semantic features.

A spectral pressure calculator 1000 analyzes frequency-domain characteristics across different modalities to identify compressible patterns and critical spectral features that must be preserved. This component implements modality-specific spectral analysis that recognizes the unique frequency distributions of different sensory inputs, harmonic structures in audio, color spectra in visual data, and frequency signatures in electromagnetic sensor readings. Spectral pressure calculator 1000 computes local compression pressure in spectral dimensions by analyzing the density of significant frequency components, identifying regions of high spectral activity that resist compression, and detecting sparse spectral regions suitable for aggressive reduction. For acoustic inputs, it identifies formant frequencies for speech intelligibility and harmonic relationships for musical content, applying minimal compression pressure to these perceptually important features while allowing heavy compression in spectral regions below perceptual thresholds. The calculator generates spectral pressure fields that vary continuously across the frequency dimensions of the manifold, creating a topography where perceptually critical frequencies form high-pressure ridges that resist compression while redundant spectral regions form low-pressure valleys suitable for reduction.

A spatial density analyzer 1010 examines geometric and topological patterns within spatial dimensions to determine optimal compression strategies that preserve structural relationships while eliminating redundancy. This component implements spatial analysis algorithms that identify different types of spatial redundancy including local correlation in visual textures, geometric regularity in structured environments, and topological invariants that must be preserved. Spatial density analyzer 1010 computes spatial compression pressure by measuring local information density through entropy calculations, detecting repeated patterns or textures suitable for compression, and identifying critical spatial features like edges, corners, or discontinuities that require preservation. In visual data, it might recognize that large uniform regions like sky or walls can be heavily compressed while preserving fine detail at object boundaries where spatial information is semantically critical. The analyzer generates spatial pressure fields that create a compression landscape respecting both geometric structure and semantic importance within spatial dimensions.

A temporal redundancy detector 1020 identifies patterns of repetition and predictability in temporal dimensions that enable efficient compression without sacrificing dynamic information. This component analyzes temporal sequences across all modalities to detect various forms of redundancy including periodic patterns, smooth trajectories, and predictable transitions. Temporal redundancy detector 1020 implements multi-scale temporal analysis that examines redundancy at different time scales from microsecond acoustic variations to long-term behavioral patterns, using techniques such as autocorrelation analysis to identify periodic components, motion estimation to detect smooth trajectories suitable for interpolation, and change detection to identify critical temporal events requiring preservation. For video data, it might identify static backgrounds that remain unchanged across frames, enabling aggressive temporal compression while preserving full detail for moving objects. The detector generates temporal pressure fields that vary dynamically, with low pressure during periods of predictable behavior and high pressure at moments of significant change or unpredictability.

A scale hierarchy compressor 1030 leverages the natural hierarchical structure present in many modalities to achieve efficient multi-resolution compression. This component recognizes that information often exhibits meaningful structure at multiple scales, from fine details to global patterns, and implements compression strategies that preserve this hierarchical organization. Scale hierarchy compressor 1030 performs wavelet-like decomposition of information into scale levels, allocating compression resources based on the semantic importance at each scale. It implements scale-dependent compression pressure that preserves features at semantically important scales while aggressively compressing redundant information at other levels. For instance, in processing natural images, it might preserve fine texture detail at small scales for foreground objects while allowing heavy compression of large-scale background patterns. The compressor generates hierarchical pressure fields that create a multi-resolution compression landscape within the scale dimensions of the manifold.

A cross-modal redundancy eliminator 1040 identifies and removes redundancy that exists between different modalities when they represent the same underlying information. This component performs cross-modal analysis to detect when multiple sensory channels carry correlated information that can be compressed through shared representation. Cross-modal redundancy eliminator 1040 implements correlation analysis between modal representations to identify redundant information, such as when lip movements in video correlate with speech acoustics, or when textual descriptions duplicate visual content. It creates shared latent representations for correlated cross-modal information, storing the common structure once while maintaining only the unique aspects of each modality. The eliminator adjusts compression pressure to encourage convergence of correlated modal information toward shared manifold regions, effectively reducing the total representational cost. This cross-modal compression is particularly effective in multimodal scenarios like video conferencing, where visual and auditory channels contain significant mutual information.

A compression field generator 1050 integrates the various pressure calculations from individual analyzers into unified compression pressure fields that guide the overall compression strategy across the multimodal manifold. This component performs field integration that combines spectral, spatial, temporal, and scale-based pressure fields while respecting their interactions and dependencies. Compression field generator 1050 implements field combination algorithms that use weighted integration based on modal importance and semantic context, ensure smooth field transitions at dimensional boundaries to prevent compression artifacts, and maintain consistency with the global compression pressure field. The generator produces composite pressure fields that create a complex compression landscape where different regions of the manifold experience varying compression forces based on their multimodal content and semantic importance. These fields directly influence geodesic paths through the manifold, making semantically important regions more resistant to traversal and encouraging attention to flow through efficiently compressed spaces.

An adaptive quantization manager 1060 dynamically adjusts the precision of representation based on local compression pressure and available resources. This component implements intelligent bit allocation strategies that provide high precision in high-pressure regions where information is dense and semantically important while using coarse quantization in low-pressure regions where aggressive compression is acceptable. Adaptive quantization manager 1060 continuously monitors local pressure fields and adjusts quantization parameters in real-time, implementing progressive quantization schemes that can refine precision as needed. For streaming applications, it dynamically reallocates bits based on changing content complexity and network conditions, ensuring optimal quality within bandwidth constraints. The manager maintains quantization consistency across modal boundaries, preventing artifacts when attention traverses between differently quantized regions of the manifold.

A modal feature preserver 1070 ensures that compression operations do not eliminate features critical for modality-specific perception or semantic understanding. This component maintains a learned registry of essential features for each modality that must survive compression, implementing protection mechanisms that prevent their loss. Modal feature preserver 1070 identifies and protects critical features such as phonemes in speech that are essential for intelligibility, facial features in video necessary for recognition, and textual keywords vital for semantic understanding. It adjusts local compression pressure to create protective fields around these features, ensuring they remain intact even under aggressive compression. The preserver learns from user feedback and task performance, continuously updating its understanding of which features are truly essential versus those that can be safely compressed.

A pressure field integrator 1080 serves as the interface between modality-aware compressor 730 and cognitive dynamics engine 130, ensuring that multimodal compression pressure fields properly integrate with the overall geometric dynamics of the cognitive manifold. This component translates modality-specific pressure calculations into the unified geometric framework of the PCM, maintaining consistency with the fundamental equation while incorporating modal variations. Pressure field integrator 1080 performs geometric transformation of modal pressure fields into the manifold's coordinate system, ensures that integrated fields respect the manifold's metric tensor and connection structure, and provides smooth interpolation between regions dominated by different modalities. The integrator enables the cognitive dynamics engine to compute geodesics that naturally account for multimodal compression, creating attention paths that efficiently navigate through compressed spaces while avoiding over-compressed regions where semantic loss might occur.

These components within modality-aware compressor 730 create an intelligent compression system that goes beyond traditional data reduction to implement semantically-aware, geometrically-consistent compression within the cognitive manifold. Spectral pressure calculator 1000 handles frequency-domain patterns, spatial density analyzer 1010 manages geometric redundancy, temporal redundancy detector 1020 exploits time-based patterns, scale hierarchy compressor 1030 leverages multi-resolution structure, cross-modal redundancy eliminator 1040 removes inter-modal duplication, compression field generator 1050 creates unified pressure landscapes, adaptive quantization manager 1060 optimizes bit allocation, modal feature preserver 1070 protects information, and pressure field integrator 1080 ensures geometric consistency. Together, they enable the PCM to maintain rich multimodal representations while achieving compression ratios that make persistent cognitive processing computationally feasible, creating a system where compression enhances rather than degrades the quality of cognitive operations by focusing representational resources on what matters most for understanding and reasoning.

Figure 11:
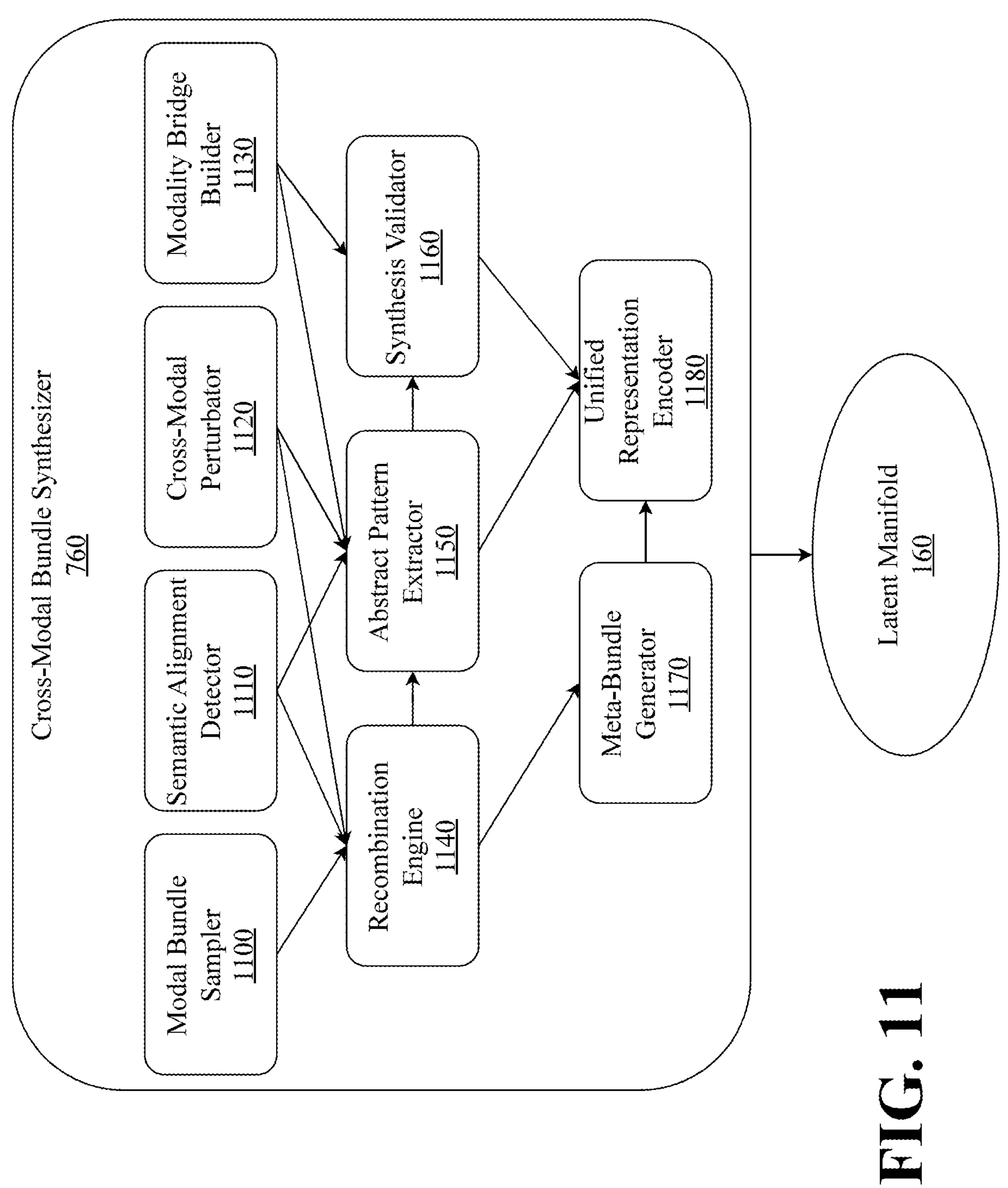
FIG. 11 is a block diagram illustrating an exemplary architecture of a component within an enhanced Persistent Cognitive Machine (PCM), a cross-modal bundle synthesizer.

FIG. 11 is a block diagram illustrating an exemplary architecture of a component within an enhanced Persistent Cognitive Machine (PCM), a cross-modal bundle synthesizer. Unlike traditional multimodal fusion techniques that simply concatenate features, this component implements geometric synthesis operations that identify deep structural similarities across modalities and create new meta-representations that capture cross-cutting patterns. By operating within the geometric framework of the latent manifold, the synthesizer can discover non-obvious relationships between different sensory experiences and create abstract bundles that enable rapid cross-modal inference and understanding.

A modal bundle sampler 1100 initiates the synthesis process by strategically selecting thought bundles from different modalities that exhibit potential for meaningful integration. This component implements intelligent sampling strategies that go beyond random selection to identify promising candidates for cross-modal synthesis. Modal bundle sampler 1100 analyzes the geometric distribution of bundles across the manifold, identifying regions where different modalities cluster near each other suggesting potential semantic overlap. It considers multiple selection criteria including recent co-activation patterns where bundles from different modalities were accessed in temporal proximity, geometric proximity in the latent manifold despite originating from different sensory channels, similar curvature characteristics indicating comparable semantic complexity, and participation in related goal-directed trajectories. For example, when sampling for synthesis, it might select visual bundles representing rhythmic motion patterns, auditory bundles containing temporal beat structures, and tactile bundles encoding vibrational patterns, recognizing their potential for unified rhythmic representation despite their disparate sensory origins.

A semantic alignment detector 1110 analyzes the sampled bundles to identify specific dimensions and features where meaningful cross-modal correspondences exist. This component goes beyond surface-level similarity to discover deep structural alignments that may not be immediately apparent. Semantic alignment detector 1110 implements comparison algorithms that examine the internal geometry of bundles, looking for invariant structures that persist across modalities. It computes alignment metrics based on topological similarity of bundle submanifolds, correspondence of principal curvature directions indicating similar semantic organization, and preservation of relative distances between key features across modalities. When analyzing speech-related bundles, for instance, it might detect alignment between the spatial trajectory of tongue movements in articulatory bundles, the spectral trajectory of formant frequencies in acoustic bundles, and the sequential structure of phonemes in linguistic bundles, revealing the deep cross-modal structure underlying speech production and perception.

A cross-modal perturbator 1120 applies controlled stochastic variations to the sampled bundles to explore the stability and extent of cross-modal relationships. Building on the perturbation principles established in the dream manager, this component specifically targets the boundaries between modalities to test which features are essential and which are modality-specific artifacts. Cross-modal perturbator 1120 implements a perturbation formula designed to probe cross-modal boundaries. The perturbations are crafted to preserve structural relationships while varying surface features, test the robustness of detected alignments under noise, and explore intermediate spaces between modalities that might reveal hidden connections. Through iterative perturbation, the component maps out the stable core of cross-modal relationships that can serve as the foundation for synthesized representations.

A modality bridge builder 1130 constructs explicit geometric connections between aligned features across different modalities, creating the structural scaffolding for unified representations. This component implements manifold surgery operations that create new pathways in the latent space without disrupting existing structures. Modality bridge builder 1130 identifies optimal connection points between modal bundles based on semantic alignment strength, constructs smooth geometric bridges using geodesic interpolation, and adjusts local metric tensors to ensure continuous traversability. These bridges are not merely abstract connections but become permanent features of the manifold, enabling future rapid cross-modal navigation. For instance, when building bridges between visual and auditory representations of motion, the component might create geometric pathways that smoothly transform visual velocity vectors into acoustic frequency modulations, establishing a permanent bi-directional connection that enriches both modalities.

A recombination engine 1140 performs the core synthesis operation, creating new unified representations from the prepared and aligned modal components. This component implements a geometric recombination formula, where the weights are determined through optimization considering semantic importance, stability under perturbation, and contribution to cross-modal coherence. Recombination engine 1140 goes beyond weighted averaging to perform structure-preserving synthesis that maintains topological relationships from source bundles, creates new geometric structures that capture emergent cross-modal patterns, and optimizes the internal geometry of synthesized bundles for efficient traversal. The engine can create various types of cross-modal syntheses including direct fusion where modalities merge into unified percepts, hierarchical integration where one modality provides context for others, and abstract extraction where only shared structural patterns are preserved.

An abstract pattern extractor 1150 identifies and isolates the high-level patterns that emerge from cross-modal synthesis, creating representations that transcend their sensory origins. This component analyzes the synthesized bundles to extract invariant structures that capture essential relationships independent of modality. Abstract pattern extractor 1150 implements dimensionality reduction techniques adapted for manifold structures, identifying the minimal geometric features that capture cross-modal relationships. It extracts patterns such as temporal synchrony that manifests across visual, auditory, and tactile modalities, spatial correspondence that links visual geometry with acoustic space and proprioceptive maps, and causal structures that appear in narrative text, video sequences, and auditory events. These abstract patterns become the building blocks for higher-level reasoning that seamlessly integrates multimodal information.

A synthesis validator 1160 evaluates the quality and utility of newly created cross-modal bundles through a series of geometric and semantic tests. This component ensures that synthesized representations are not merely mathematical artifacts but meaningful additions to the cognitive manifold. Synthesis validator 1160 performs multiple validation checks including coherence testing to ensure internal consistency of synthesized bundles, stability analysis to verify robustness under manifold evolution, and utility assessment to confirm that new bundles enable improved cross-modal inference. It implements validation through test trajectories that traverse synthesized bundles, measuring whether the new structures facilitate smoother, more efficient cross-modal reasoning. Failed syntheses are marked for dissolution, preventing the accumulation of meaningless structures, while successful syntheses are reinforced and marked for integration into the permanent manifold structure.

A meta-bundle generator 1170 creates higher-order organizational structures that group related cross-modal syntheses into coherent families. This component recognizes that individual synthesized bundles often form natural clusters representing different aspects of unified multimodal concepts. Meta-bundle generator 1170 analyzes the geometric distribution of synthesized bundles, identifying clusters that represent related cross-modal patterns. It creates encompassing meta-bundles that provide hierarchical organization, establish inheritance relationships where specific syntheses derive from general patterns, and enable efficient navigation through families of related cross-modal concepts. For example, it might create a meta-bundle for "human communication" that encompasses synthesized representations of speech-gesture coordination, facial-vocal expression alignment, and text-speech correspondence, providing a unified framework for understanding multimodal human interaction.

A unified representation encoder 1180 performs the final encoding of validated cross-modal syntheses into permanent structures within the latent manifold. This component ensures that new unified representations integrate seamlessly with existing manifold geometry while maintaining their unique cross-modal properties. Unified representation encoder 1180 implements sophisticated embedding algorithms that preserve the multi-modal nature of synthesized bundles while ensuring compatibility with single-modal representations, establish appropriate connection weights to existing thought structures, and optimize the local manifold geometry to accommodate new syntheses. The encoder creates representations that can be accessed either as unified wholes or through their constituent modal components, providing flexibility in how cross-modal knowledge is utilized. These encoded representations become permanent features of the cognitive landscape, enabling future rapid recognition and reasoning about cross-modal patterns.

These components within cross-modal bundle synthesizer 760 work together during dreaming phases to expand the PCM's representational capacity beyond individual sensory channels. Modal bundle sampler 1100 selects promising candidates, semantic alignment detector 1110 identifies deep correspondences, cross-modal perturbator 1120 explores relationship stability, modality bridge builder 1130 creates geometric connections, recombination engine 1140 synthesizes unified representations, abstract pattern extractor 1150 isolates transferable patterns, synthesis validator 1160 ensures quality, meta-bundle generator 1170 provides hierarchical organization, and unified representation encoder 1180 integrates new structures into the manifold. Through this process, the system develops increasingly cross-modal understanding, creating a rich tapestry of unified representations that enable reasoning across sensory boundaries and support the emergence of abstract concepts that transcend their perceptual origins.

DESCRIPTION OF METHOD ASPECTS

Figure 12:
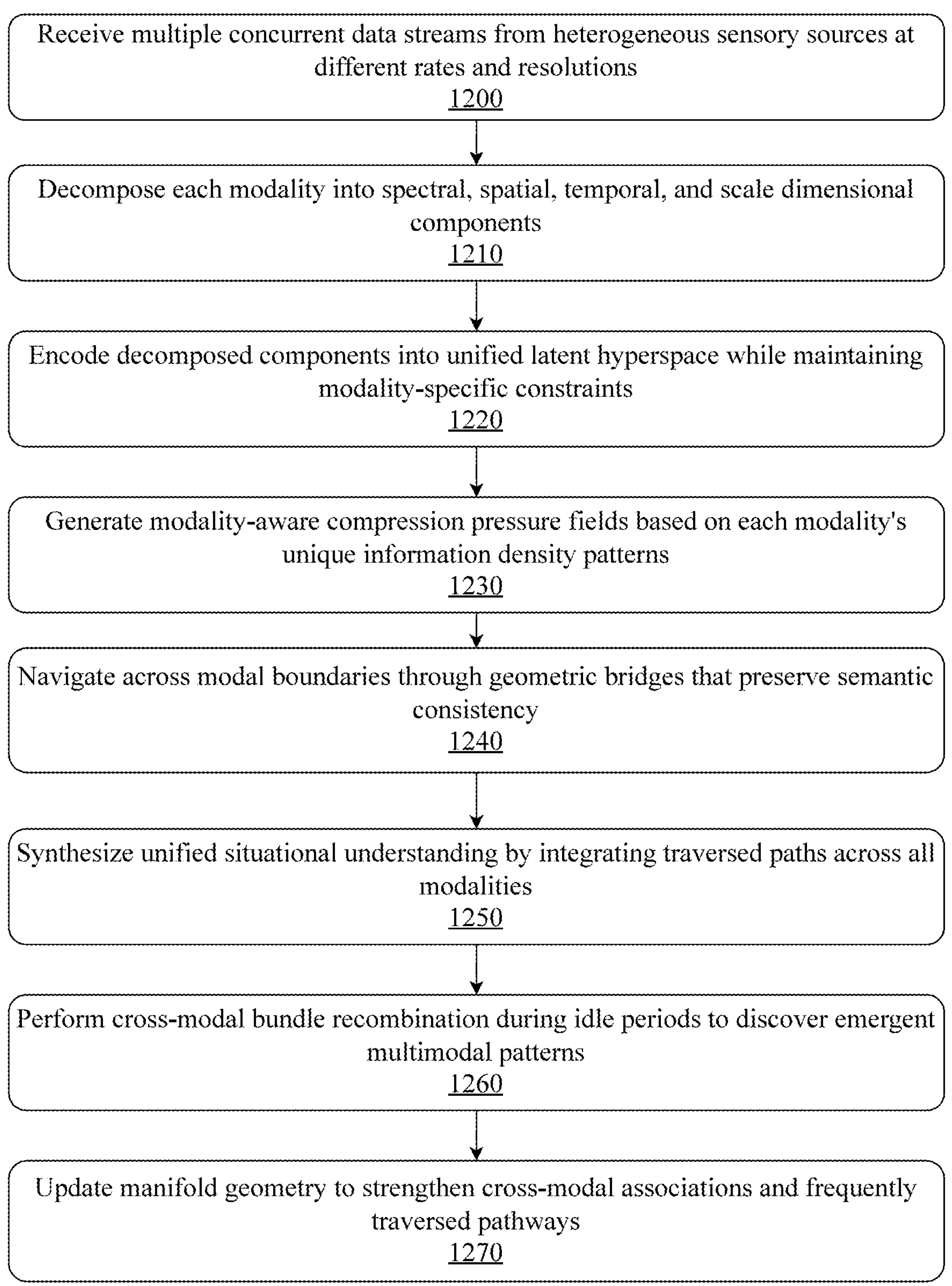
FIG. 12 is a flow diagram illustrating an exemplary method for processing and integrating heterogeneous sensory data streams within a unified geometric cognitive framework.

FIG. 12 is a flow diagram illustrating an exemplary method for processing and integrating heterogeneous sensory data streams within a unified geometric cognitive framework. In a first step 1200, receive multiple concurrent data streams from heterogeneous sensory sources at different rates and resolutions. This initial reception process accommodates the fundamental challenge of multimodal processing where different sensory channels deliver information asynchronously and in varying formats. The reception mechanism buffers and aligns these disparate streams without losing temporal relationships or introducing artificial synchronization artifacts. This involves maintaining sliding temporal windows for each modality that can accommodate their natural data rates while preserving sufficient overlap for meaningful cross-modal correlation.

In a step 1210, decompose each modality into spectral, spatial, temporal, and scale dimensional components. This decomposition transforms raw sensory data into structured representations that capture the essential characteristics of each modality while preparing them for unified processing. Spectral decomposition extracts frequency-domain information such as color spectra from images, harmonic content from audio, and oscillatory patterns from sensor data. Spatial decomposition identifies geometric structures, topological relationships, and positional information inherent in visual scenes, acoustic source locations, and distributed sensor networks. Temporal decomposition captures sequential patterns, causal relationships, and dynamic evolution within each modality. Scale decomposition creates hierarchical representations from fine-grained details to global patterns, enabling multi-resolution analysis. This four-dimensional decomposition provides a common framework for representing diverse sensory information while preserving modality-specific properties essential for accurate interpretation.

In a step 1220, encode decomposed components into unified latent hyperspace while maintaining modality-specific constraints. This encoding process maps the decomposed dimensional components into a shared geometric space where different modalities can coexist and interact meaningfully. The encoding preserves essential characteristics of each modality through structured constraints—visual data maintains spatial continuity, acoustic information preserves temporal coherence, and textual content retains symbolic relationships. Within the latent hyperspace, these constraints manifest as geometric properties: curved regions where semantic density creates natural clustering, smooth manifolds where continuous modalities flow naturally, and discrete structures where symbolic information requires categorical representation.

The encoding creates not just a shared space but a structured environment where the geometry itself encodes relationships between and within modalities.

In a step 1230, generate modality-aware compression pressure fields based on each modality's unique information density patterns. This generation process creates scalar fields throughout the latent hyperspace that reflect the varying compressibility and semantic density of different modal regions. Visual areas with repetitive textures exhibit low compression pressure allowing aggressive reduction, while regions containing faces or text maintain high pressure to preserve critical details. Acoustic regions encoding speech create pressure patterns that protect formant frequencies and temporal transitions essential for intelligibility. The compression pressure fields vary continuously across the space, creating a topography that guides efficient representation and navigation. These fields adapt dynamically based on content, with pressure increasing in semantically rich regions and decreasing in redundant or predictable areas.

In a step 1240, navigate across modal boundaries through geometric bridges that preserve semantic consistency. This navigation process enables fluid movement between different sensory representations while maintaining meaningful relationships throughout transitions. Geometric bridges emerge at regions where different modalities naturally converge, where lip movements align with speech sounds, where textual descriptions correspond to visual scenes, or where rhythmic patterns manifest across multiple senses. Navigation follows geodesic paths that minimize cognitive cost while respecting the compression pressure landscape and semantic constraints. These paths smoothly transform attention from one modal representation to another, gradually adjusting to different dimensional constraints without abrupt discontinuities that would break semantic coherence. The navigation maintains bidirectional capability, allowing return paths that preserve the ability to trace reasoning across modalities.

In a step 1250, synthesize unified situational understanding by integrating traversed paths across all modalities. This synthesis process combines the information gathered through multimodal navigation into coherent understanding that transcends individual sensory channels. Integration occurs not through simple concatenation but through geometric unification where traversed paths create a rich trajectory through the latent hyperspace. The synthesis identifies convergent patterns where multiple modalities support the same interpretation, resolves conflicts where modalities provide contradictory information through weighted geometric combination, and discovers emergent properties that only become apparent through multimodal integration. The resulting understanding maintains explicit connections to its multimodal sources, enabling traceable reasoning that can identify which modalities contributed to specific conclusions.

In a step 1260, perform cross-modal bundle recombination during idle periods to discover emergent multimodal patterns. This recombination process operates during periods of reduced activity to identify and strengthen relationships between different sensory representations. Thought bundles from different modalities that exhibit structural similarity undergo controlled perturbation and recombination where the weights reflect discovered correspondences and semantic alignment. Through iterative recombination, emergent patterns surface, rhythmic structures that span visual and auditory domains, textural qualities that bridge tactile and visual experience, or narrative patterns that connect linguistic and temporal sequences. These discovered patterns become permanent features that enable rapid future recognition of multimodal relationships.

In a step 1270, update manifold geometry to strengthen cross-modal associations and frequently traversed pathways. This updating process reshapes the latent hyperspace based on accumulated experience, making future multimodal processing more efficient. Frequently traversed paths between modalities experience metric contraction, reducing the geodesic distance and making cross-modal transitions smoother. Successful cross-modal associations increase local curvature, creating attractor basins that guide future navigation. The manifold evolution follows principles analogous to Ricci flow, where the geometry naturally evolves toward configurations that support efficient multimodal cognition. These updates create a personalized cognitive landscape that reflects learned patterns of multimodal interaction, enabling increasingly sophisticated integration of sensory information through the shaped geometry of thought.

Figure 13:
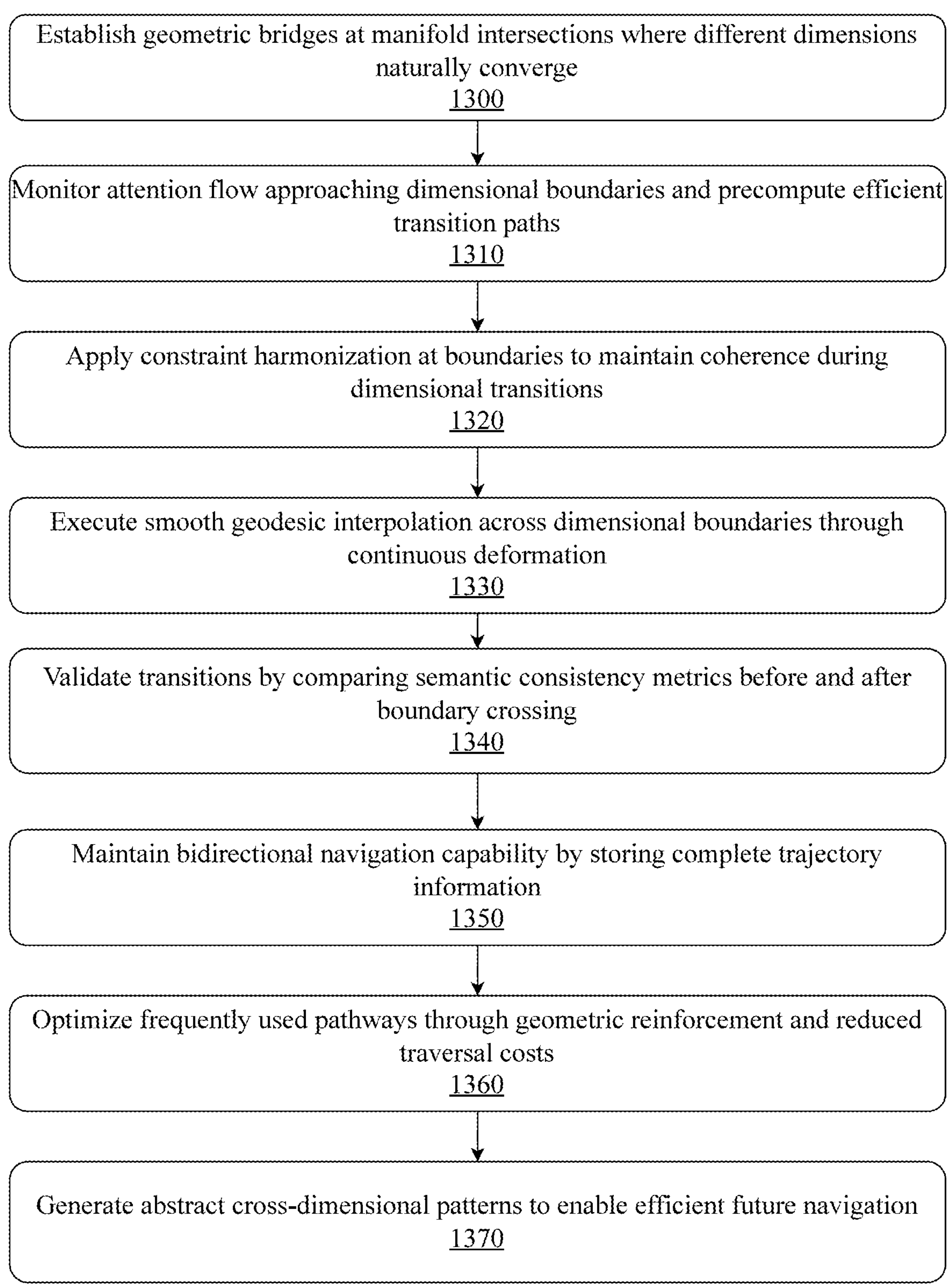
FIG. 13 is a flow diagram illustrating an exemplary method for implementing cross-dimensional navigation within a unified geometric cognitive framework.

FIG. 13 is a flow diagram illustrating an exemplary method for implementing cross-dimensional navigation within a unified geometric cognitive framework. In a first step 1300, establish geometric bridges at manifold intersections where different dimensions naturally converge. This establishment process identifies and reinforces regions within the latent manifold where distinct dimensional representations share semantic structure or functional relationships. Natural convergence points emerge where different types of information inherently relate, such as but not limited to where spatial descriptions in language align with visual geometric features, where temporal patterns in audio correspond to motion dynamics in video, or where abstract symbolic relationships map to concrete sensory experiences. These bridges are not artificially imposed but discovered through analysis of local manifold geometry, identifying regions where thought bundles from different dimensional regimes exhibit overlapping curvature patterns, shared activation trajectories, or correlated geodesic flows. Once identified, these convergence points are reinforced through metric adjustment that reduces geodesic distance between related structures, creating permanent pathways that facilitate future cross-dimensional reasoning.

In a step 1310, monitor attention flow approaching dimensional boundaries and precompute efficient transition paths. This monitoring process continuously tracks the attention vector field as it moves through the manifold, detecting when trajectories approach regions where dimensional constraints change. Precomputation involves analyzing the local geometric structure near boundaries to identify optimal crossing points where transitions incur minimal cognitive cost. Multiple candidate paths are evaluated based on factors including but not limited to geodesic length through the transition region, compression pressure along potential routes, semantic coherence preservation across the boundary, and alignment with goal potential fields. By precomputing these paths before attention reaches the boundary, smooth transitions can be executed without the discontinuities or hesitation that would occur from real-time path finding. This anticipatory computation enables fluid cognitive flow even when navigating between fundamentally different representational schemes.

In a step 1320, apply constraint harmonization at boundaries to maintain coherence during dimensional transitions. This harmonization process ensures that as attention crosses from one dimensional regime to another, the semantic meaning and structural relationships are preserved despite the change in representational constraints. Constraint harmonization involves gradually blending the geometric requirements of source and destination dimensions within a transition zone, creating smooth interpolation of metric properties, connection coefficients, and curvature characteristics. For instance, when transitioning from continuous spectral dimensions to discrete symbolic dimensions, harmonization might involve intermediate representations that gradually quantize continuous values while preserving their relational structure. This process prevents semantic distortion that could occur from abrupt constraint changes, maintaining the integrity of cognitive flow across dimensional boundaries.

In a step 1330, execute smooth geodesic interpolation across dimensional boundaries through continuous deformation. This execution implements the actual transition using geodesic paths that have been modified to account for the changing dimensional structure. The interpolation process continuously deforms the attention trajectory as it crosses the boundary, smoothly transforming from source to destination dimensional constraints. This involves solving modified geodesic equations where Christoffel symbols are interpolated between different geometric regimes, ensuring that the path remains optimal throughout the transition. The continuous deformation maintains local optimality while respecting the global structure of the manifold, creating transitions that feel natural and preserve cognitive momentum. The interpolation accounts for changes in dimensionality, metric signature, and topological structure, enabling navigation between radically different representational spaces without losing coherence.

In a step 1340, validate transitions by comparing semantic consistency metrics before and after boundary crossing. This validation process ensures that cross-dimensional navigation has preserved essential meaning and relationships despite the representational transformation. Semantic consistency metrics evaluate multiple aspects including preservation of relational structures between key concepts, maintenance of relevant distance relationships that encode similarity, conservation of topological features that represent logical dependencies, and retention of causal or temporal orderings where applicable. The validation compares these metrics from states before and after the transition, identifying any degradation or distortion introduced by the dimensional crossing. Failed validations trigger corrective measures such as alternative path selection or local manifold adjustment to improve transition quality. This validation ensures that cross-dimensional navigation enhances rather than corrupts understanding.

In a step 1350, maintain bidirectional navigation capability by storing complete trajectory information. This maintenance process ensures that any cross-dimensional navigation can be reversed, enabling return to previous states or exploration of alternative paths. Complete trajectory storage includes not just the sequence of positions but comprehensive geometric context including local metric values along the path, curvature encountered during traversal, compression pressure experienced at each point, and the specific transformations applied at dimensional boundaries. This rich trajectory information enables exact retracing of paths even as the underlying manifold evolves. Bidirectional capability supports cognitive operations such as comparison between different representational views, verification of reasoning by checking consistency across dimensions, and speculative exploration with guaranteed return paths. The stored trajectories also serve as templates for future similar navigations, accumulating a library of successful cross-dimensional transitions.

In a step 1360, optimize frequently used pathways through geometric reinforcement and reduced traversal costs. This optimization process identifies cross-dimensional routes that are repeatedly traversed and modifies the local manifold geometry to make these paths more efficient. Geometric reinforcement involves adjusting the metric tensor along successful paths to reduce geodesic length, decreasing compression pressure in frequently traversed transition zones, and strengthening connections that preserve semantic coherence. The optimization creates cognitive highways between commonly connected dimensional regions, enabling rapid transitions for well-established cross-dimensional relationships. This process is analogous to path formation in physical spaces, where repeated use creates efficient routes. The cost reduction is balanced against the need to maintain alternative paths and prevent over-specialization that could limit cognitive flexibility.

In a step 1370, generate abstract cross-dimensional patterns to enable efficient future navigation. This generation process extracts reusable navigation templates from successful cross-dimensional transitions, creating abstract patterns that can be applied to new situations. Pattern extraction identifies common structures in successful transitions such as characteristic trajectory shapes that preserve meaning across boundaries, optimal staging sequences for complex dimensional transformations, and invariant features that remain stable despite representational changes. These abstract patterns become navigational primitives that can be composed and adapted for novel cross-dimensional challenges. They encode not specific paths but general strategies for maintaining coherence while transitioning between different representational regimes. The patterns are stored as geometric templates within the manifold, creating a growing library of cross-dimensional navigation expertise that improves the efficiency and reliability of future multimodal integration.

Figure 14:
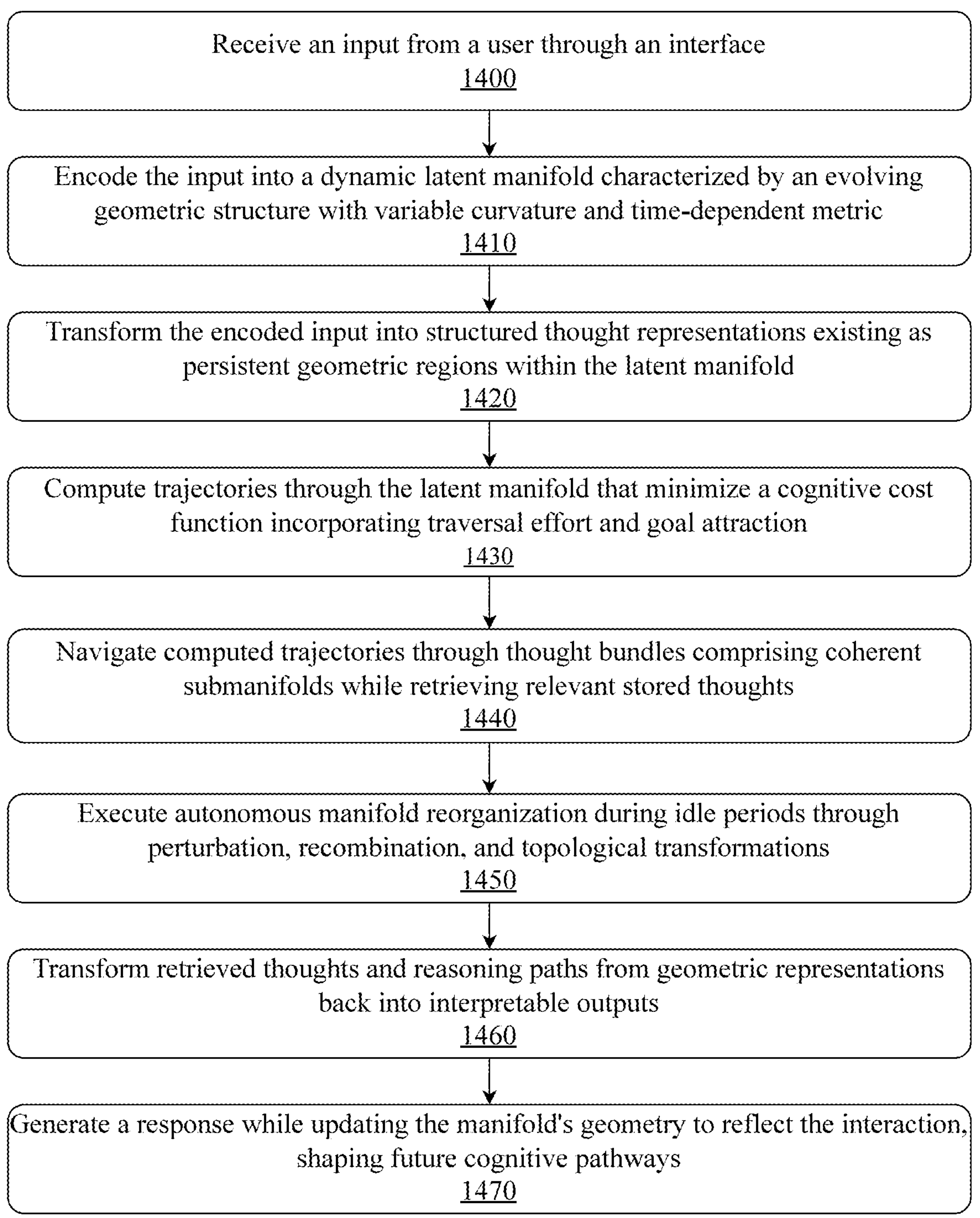
FIG. 14 is a flow diagram illustrating an exemplary method for implementing persistent cognitive computation through geometric representation and manipulation of thoughts within a dynamic latent manifold.

FIG. 14 is a flow diagram illustrating an exemplary method for implementing persistent cognitive computation through geometric representation and manipulation of thoughts within a dynamic latent manifold. In a first step 1400, receive an input from a user through an interface. This initial step establishes the entry point for external information into the cognitive process, where inputs may comprise natural language queries, multimodal data streams, commands, or any form of structured or unstructured information requiring cognitive processing. The interface serves as a bidirectional communication channel that not only receives inputs but maintains context from previous interactions, enabling coherent long-term dialogues where each new input can build upon established semantic foundations encoded within the geometric substrate.

In a step 1410, encode the input into a dynamic latent manifold characterized by an evolving geometric structure with variable curvature and time-dependent metric. This encoding process transforms raw external data into geometric representations within a high-dimensional space where semantic relationships are captured through curvature, distance, and topological features rather than static vector embeddings. The latent manifold operates as a living geometric substrate with a Riemannian or pseudo-Riemannian metric tensor that evolves based on usage patterns, wherein frequently accessed semantic regions develop distinct curvature characteristics that facilitate efficient navigation. The encoding respects existing manifold structure, placing new inputs in regions that maintain semantic coherence with previously encoded information while allowing the manifold itself to deform and adapt to accommodate novel concepts. This dynamic encoding ensures that the same input may be mapped to slightly different manifold locations at different times, reflecting the evolving understanding and context within the cognitive system.

In a step 1420, transform the encoded input into structured thought representations existing as persistent geometric regions within the latent manifold. Thoughts, as discrete units of reasoning or analysis generated during processing, are not mere points in space but extended geometric structures that may manifest as compact submanifolds, trajectories, or complex topological features. This transformation involves processing the encoded input through sophisticated algorithms that identify semantic components, establish relationships between concepts, and construct high-dimensional representations that capture not only explicit content but implicit contextual meanings and potential inferential pathways. The resulting thought structures exhibit internal geometry that reflects their semantic complexity, with simple atomic thoughts occupying relatively flat regions while complex structured thoughts may exhibit significant curvature and multi-dimensional extent. These thought representations become persistent features of the manifold, subject to future retrieval, recombination, and evolution through continued cognitive activity.

In a step 1430, compute trajectories through the latent manifold that minimize a cognitive cost function incorporating traversal effort and goal attraction. This computation implements geodesic attention, where focus or inference is achieved by computing minimal-energy paths through the manifold rather than discrete selection operations. The cognitive cost function balances multiple factors including kinetic energy that penalizes rapid shifts in attention, compression pressure derived from local semantic density that makes traversal through highly compressed regions more costly, and goal potential fields that create attractive forces toward relevant semantic areas. The trajectory computation employs variational principles to find paths that optimize this multi-factor cost function, resulting in smooth, continuous reasoning paths that respect the manifold's geometry while efficiently pursuing cognitive objectives. These trajectories may branch, merge, or exhibit complex topology depending on the interplay between manifold structure and goal requirements, enabling rich inferential patterns that go beyond linear reasoning chains.

In a step 1440, navigate computed trajectories through thought bundles comprising coherent submanifolds while retrieving relevant stored thoughts. Navigation involves traversing the computed paths while interacting with latent subspaces or thought bundles-localized, compressible regions containing structurally similar or semantically aligned thoughts. As trajectories pass through or near these bundles, relevant thoughts are activated and retrieved based on geometric proximity, semantic alignment, and contextual appropriateness. The navigation process respects bundle boundaries and internal structure, potentially following established paths within bundles that represent well-learned reasoning patterns or exploring novel connections between previously unrelated bundles. Retrieved thoughts contribute to the ongoing cognitive process, providing historical context, learned patterns, and relevant knowledge that enriches the current reasoning trajectory. This navigation implements a form of associative memory where retrieval is not based on exact matching but on geometric traversal through semantically organized space.

In a step 1450, execute autonomous manifold reorganization during idle periods through perturbation, recombination, and topological transformations. This dreaming process operates as a background mechanism for structural optimization and generalization discovery. Perturbation involves applying controlled stochastic variations to existing thought structures to test their stability and explore nearby semantic spaces. Recombination implements sophisticated interpolation and integration algorithms that synthesize new abstractions from existing thoughts, potentially discovering emergent patterns or generalizations not explicitly present in the original structures. Topological transformations may alter the fundamental connectivity of the manifold, creating new bridges between previously disconnected regions or splitting overly complex areas into more manageable components. These reorganization operations improve manifold efficiency, reduce redundancy, and enhance the system's capacity for creative inference and generalization, all while maintaining semantic coherence and preserving valuable learned structures.

In a step 1460, transform retrieved thoughts and reasoning paths from geometric representations back into interpretable outputs. This decoding process must interpret rich geometric information including positions within the manifold, traversed trajectories, local curvature contexts, and relationships between activated thought bundles. The transformation preserves not just the conclusions reached but the reasoning process itself, enabling explanatory outputs that reflect the structured path taken through semantic space. Decoding accounts for the multi-dimensional nature of thoughts, potentially generating outputs that capture nuanced relationships, conditional dependencies, and contextual qualifications that emerge from the geometric reasoning process. The decoded information maintains coherence with the original query while potentially introducing insights or connections discovered through manifold traversal that were not explicitly present in the input.

In a step 1470, generate a response while updating the manifold's geometry to reflect the interaction, shaping future cognitive pathways. Response generation synthesizes the decoded thoughts and reasoning paths into appropriate output formats while simultaneously modifying the underlying geometric substrate based on the completed cognitive cycle. Manifold updates may include but are not limited to strengthening frequently traversed paths through metric adjustment, increasing curvature around newly important semantic regions, establishing new connections between previously unrelated thoughts, and adjusting bundle boundaries to reflect evolved understanding. These geometric modifications ensure that future cognitive operations benefit from accumulated experience, with successful reasoning patterns becoming easier to traverse while maintaining flexibility for novel exploration. The bidirectional process of response generation and manifold update implements a form of continuous learning where each interaction contributes to the long-term evolution of the cognitive substrate, creating an increasingly sophisticated geometric landscape that embodies accumulated knowledge, learned patterns, and refined reasoning capabilities.

Figure 15:
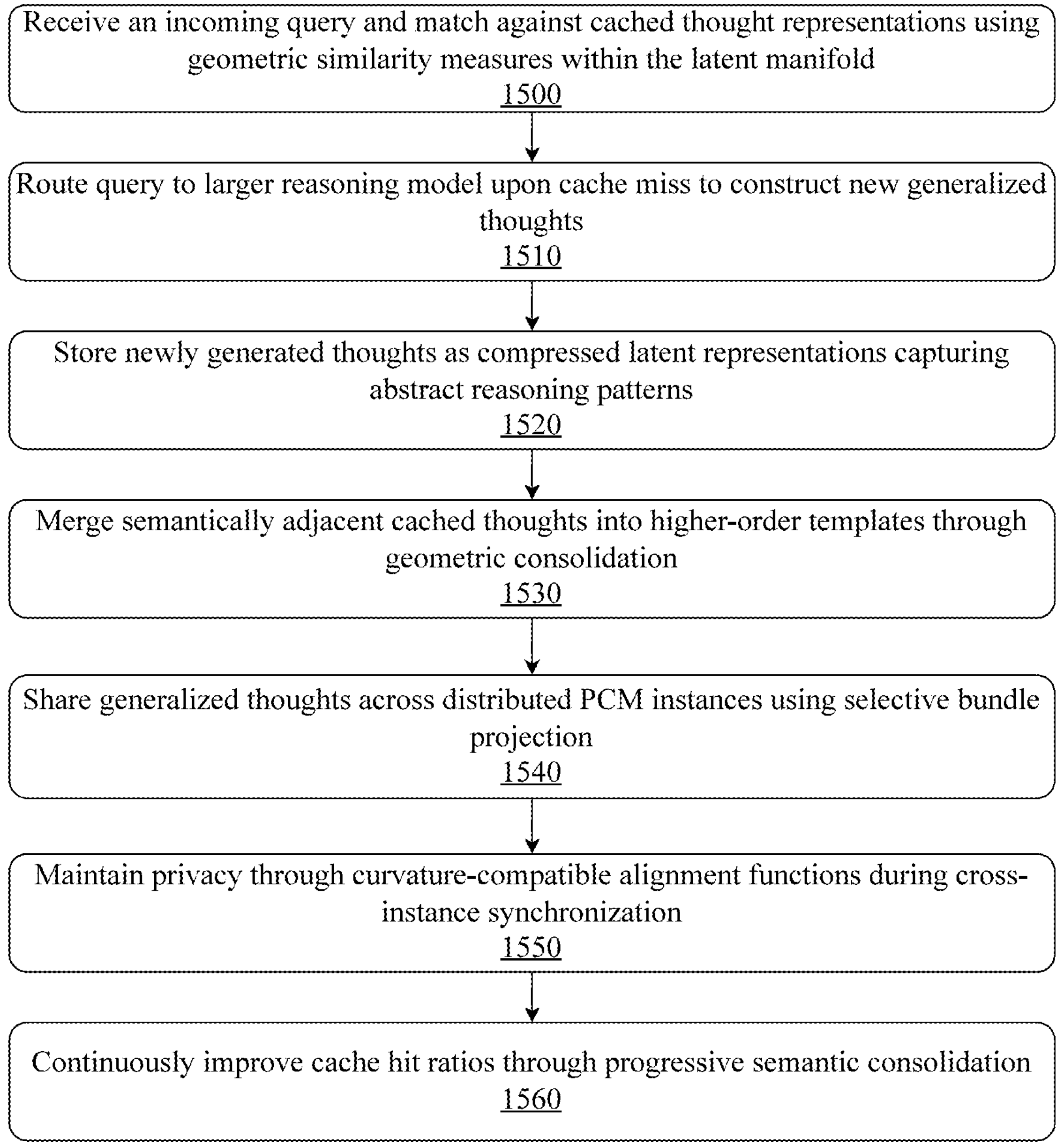
FIG. 15 is a flow diagram illustrating an exemplary method for implementing distributed thought caching with progressive generalization across multiple cognitive instances.

FIG. 15 is a flow diagram illustrating an exemplary method for implementing distributed thought caching with progressive generalization across multiple cognitive instances. In a first step 1500, receive an incoming query and match against cached thought representations using geometric similarity measures within the latent manifold. This initial matching process employs sophisticated geometric comparison techniques that go beyond simple vector similarity to evaluate semantic alignment within the curved space of the manifold. The thought cache, as a structured memory layer configured to store and retrieve thoughts based on semantic similarity, contextual alignment, or system policy, maintains indexed representations in latent space that can be accessed through multiple retrieval mechanisms. Geometric similarity measures account for manifold curvature, considering not just Euclidean distances but geodesic proximity that respects the semantic topology of the space. The matching process evaluates both direct similarity to individual cached thoughts and alignment with thought bundles or trajectories, enabling retrieval of relevant knowledge even when exact matches don't exist. This geometric matching approach allows for flexible retrieval that captures semantic relationships, analogical connections, and contextual relevance that would be missed by flat similarity metrics.

In a step 1510, route query to larger reasoning model upon cache miss to construct new generalized thoughts. When geometric matching fails to identify sufficiently relevant cached thoughts, the query triggers invocation of more comprehensive reasoning capabilities to generate new understanding. This routing decision is based on confidence thresholds that account for the quality of geometric matches, the specificity of the query, and the coverage of existing cached knowledge. The larger reasoning model processes the query with full computational resources, generating not just specific answers but generalized thoughts that capture abstract reasoning patterns suitable for future reuse. These newly constructed thoughts are designed from inception to be cacheable and generalizable, incorporating structured representations that encode not just conclusions but reasoning pathways, contextual dependencies, and semantic relationships that enable broad applicability across future queries.

In a step 1520, store newly generated thoughts as compressed latent representations capturing abstract reasoning patterns. The storage process implements sophisticated compression techniques that preserve essential semantic structure while reducing representational redundancy. Thoughts undergo geometric compression that identifies and preserves features such as key conceptual relationships, reasoning pathways that led to insights, contextual boundaries that define applicability, and connections to existing knowledge structures. The compressed representations maintain their geometric properties within the latent manifold, ensuring they can be properly integrated with existing cached thoughts and participate in future geometric operations. Compression occurs at multiple levels, from local optimization of individual thought representations to global reorganization of cache structure, ensuring efficient storage without loss of semantic fidelity or reasoning capability.

In a step 1530, merge semantically adjacent cached thoughts into higher-order templates through geometric consolidation. This merging process implements the generalization operation, synthesizing new thoughts from cached thoughts by identifying shared structure, meaning, or trajectory. The latent recombinator functionality examines geometric proximity and semantic alignment to identify candidates for consolidation, using criteria such as overlapping activation patterns, similar reasoning structures, compatible contextual constraints, and complementary knowledge domains. Geometric consolidation creates meta-thoughts that abstract common patterns while preserving distinctive features, employing manifold-aware interpolation techniques that respect curvature and maintain semantic coherence. The resulting higher-order templates serve as powerful generalizations that can match a broader range of future queries while maintaining specificity through parameterizable components that adapt to context.

In a step 1540, share generalized thoughts across distributed PCM instances using selective bundle projection. This sharing mechanism enables collaborative intelligence while respecting instance boundaries and privacy requirements. Selective bundle projection identifies portions of thought bundles suitable for sharing based on generalization level, privacy constraints, and cross-instance relevance. The projection process maps local geometric structures into a shared representational space that maintains semantic relationships while abstracting instance-specific details. Shared thoughts undergo geometric transformation that preserves their essential reasoning patterns and conceptual relationships while removing or generalizing contextual information tied to specific instances. This selective sharing enables different cognitive instances to benefit from collective learning without exposing sensitive or irrelevant local knowledge.

In a step 1550, maintain privacy through curvature-compatible alignment functions during cross-instance synchronization. Privacy preservation employs sophisticated geometric techniques that ensure knowledge sharing occurs at appropriate abstraction levels. Curvature-compatible alignment functions match geometric structures across instances while preventing reconstruction of detailed local information, using techniques such as differential privacy applied to manifold structures, homomorphic transformations that preserve reasoning capability while obscuring specific content, and selective geometric abstraction that shares patterns without revealing instances. The alignment process ensures that shared knowledge integrates properly with local manifold structures while maintaining boundaries that prevent unauthorized access to instance-specific information. This geometric approach to privacy enables rich knowledge sharing while providing mathematical guarantees about information disclosure limits.

In a step 1560, continuously improve cache hit ratios through progressive semantic consolidation. This ongoing optimization process analyzes cache performance metrics and identifies opportunities for structural improvement. Progressive consolidation examines patterns in cache hits and misses to identify frequently accessed semantic regions requiring enhanced representation, gaps in cached knowledge that lead to repeated cache misses, redundant representations that could be unified through further generalization, and emerging patterns in query streams that suggest new abstraction opportunities. The consolidation process operates continuously, making incremental improvements to cache structure through targeted operations such as merging highly correlated thoughts into unified representations, creating new intermediate abstractions that bridge frequently traversed semantic gaps, reorganizing bundle structures to improve retrieval efficiency, and pruning obsolete thoughts that no longer contribute to cache performance. This progressive refinement ensures that cache efficiency improves over time, with hit ratios increasing as the cache structure becomes better aligned with actual usage patterns and semantic requirements. The method creates a self-improving distributed knowledge system where each instance benefits from collective learning while maintaining autonomy and privacy through geometric abstraction principles.

Figure 16:
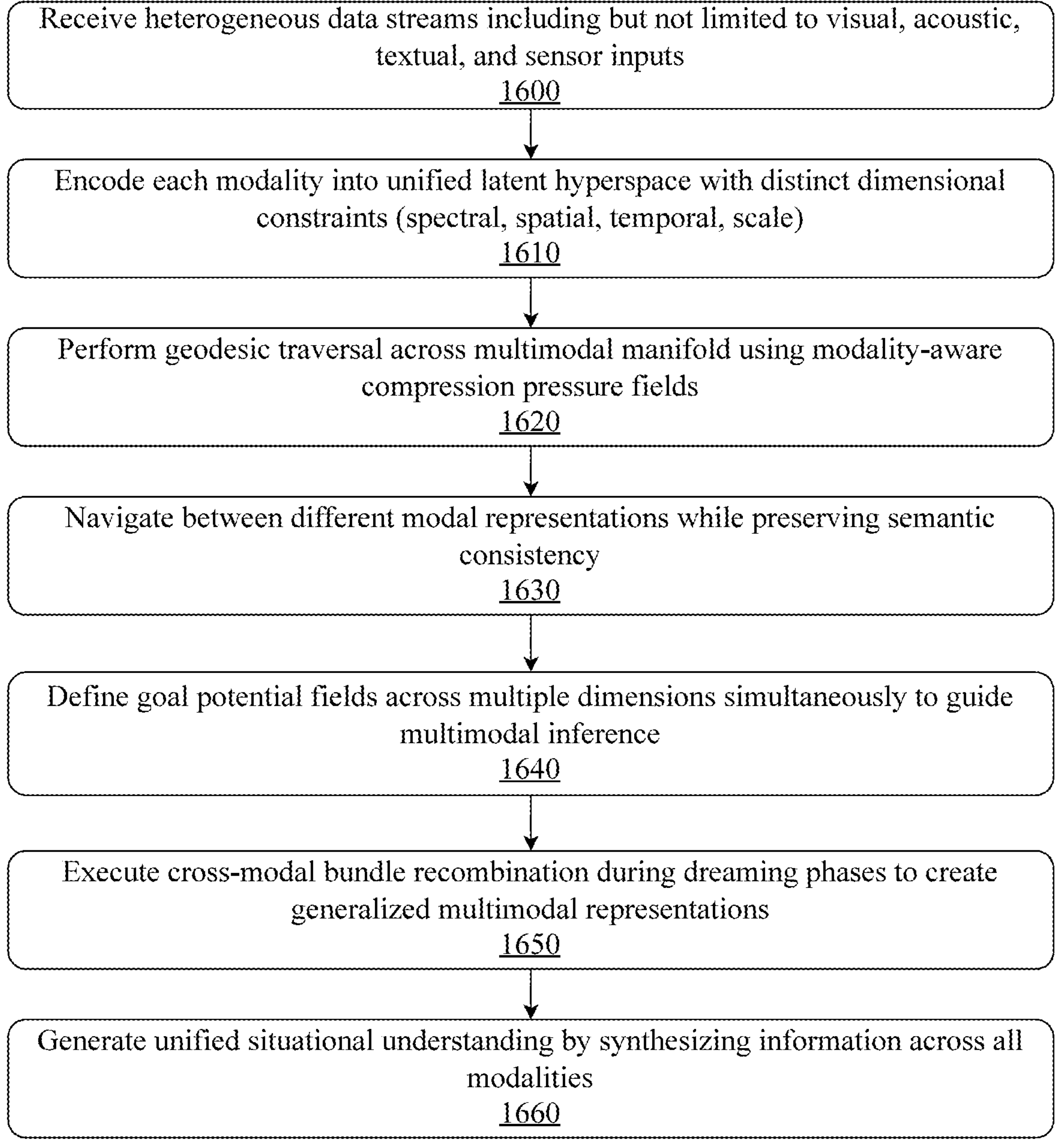
FIG. 16 is a flow diagram illustrating an exemplary method for processing and integrating heterogeneous sensory data streams within a unified geometric cognitive framework.

FIG. 16 is a flow diagram illustrating an exemplary method for processing and integrating heterogeneous sensory data streams within a unified geometric cognitive framework. In a first step 1600, receive heterogeneous data streams including but not limited to visual, acoustic, textual, and sensor inputs. This reception process accommodates diverse information sources arriving asynchronously and in varying formats, encompassing traditional sensory modalities such as visual imagery with spatial and color information, acoustic signals containing temporal patterns and frequency spectra, textual data carrying symbolic and semantic content, as well as specialized sensor inputs including thermal readings, pressure measurements, electromagnetic signatures, and chemical compositions. The data streams may arrive at different rates, resolutions, and levels of completeness, requiring robust handling of partial information, noise, and temporal misalignment. Each modality brings unique information characteristics that must be preserved during initial processing while preparing for integration into a unified representational framework.

In a step 1610, encode each modality into unified latent hyperspace with distinct dimensional constraints (spectral, spatial, temporal, scale). This encoding process transforms diverse input modalities into a shared geometric representation while maintaining modality-specific properties through structured dimensional organization. Spectral dimensions capture frequency-domain characteristics including harmonic relationships in audio, color spectra in visual data, and oscillatory patterns in sensor readings. Spatial dimensions encode geometric relationships, topological structures, and positional information relevant to visual scenes, acoustic source localization, and distributed sensor networks. Temporal dimensions represent sequential dependencies, causal flows, and dynamic evolution patterns across all modalities. Scale dimensions enable hierarchical abstraction from fine-grained local details to global patterns and high-level semantic structures. The encoding process respects the intrinsic geometry of each modality while establishing cross-modal connections through shared latent regions, creating a rich multidimensional space where different sensory inputs can interact meaningfully while preserving their distinctive characteristics.

In a step 1620, perform geodesic traversal across multimodal manifold using modality-aware compression pressure fields. This traversal implements specialized navigation that accounts for the varying information density and semantic complexity across different modal regions of the manifold. Modality-aware compression pressure fields reflect the distinct compression characteristics of each sensory domain, with visual regions exhibiting high pressure around detailed textures and edges, acoustic regions showing compression around harmonic structures and temporal patterns, textual regions displaying semantic density around conceptual clusters, and sensor regions indicating measurement precision and uncertainty bounds. The geodesic paths computed through this multimodal landscape balance traversal costs across modalities, finding optimal routes that may transition between sensory domains when such transitions offer more efficient inference paths. The traversal process maintains awareness of modal boundaries and implements smooth transitions that preserve semantic continuity even when shifting between fundamentally different representational schemes.

In a step 1630, navigate between different modal representations while preserving semantic consistency. This navigation capability enables fluid movement across sensory boundaries without losing coherent meaning or breaking inferential chains. Cross-modal navigation employs geometric bridges that connect semantically related regions across different modalities, such as linking visual representations of objects with their acoustic signatures, textual descriptions with corresponding sensory patterns, and abstract concepts with their multimodal manifestations. The navigation process maintains semantic invariants during modal transitions through preservation of relational structures, contextual embeddings, and higher-order patterns that transcend individual modalities. Consistency preservation mechanisms ensure that conclusions drawn in one modality remain valid when translated to another, enabling robust reasoning that leverages the complementary strengths of different sensory channels while avoiding contradictions or semantic drift during cross-modal inference.

In a step 1640, define goal potential fields across multiple dimensions simultaneously to guide multimodal inference. This multidimensional goal specification creates complex potential landscapes that can express objectives spanning multiple sensory domains and abstraction levels. Goal potential fields may simultaneously specify visual targets such as specific object configurations or scene compositions, acoustic objectives including sound source identification or pattern matching, textual constraints defining semantic requirements or linguistic structures, and sensor thresholds establishing measurement criteria or anomaly boundaries. The simultaneous definition across dimensions enables rich goal specifications that capture the full complexity of multimodal objectives, creating gradient fields that guide attention and inference toward regions where multiple modal constraints are satisfied. These multidimensional potentials interact with the modality-specific compression fields to create nuanced cognitive dynamics where the path to goal satisfaction may involve strategic transitions between modalities based on information availability and inference efficiency.

In a step 1650, execute cross-modal bundle recombination during dreaming phases to create generalized multimodal representations. This dreaming process operates on the accumulated multimodal experiences to discover and reinforce cross-modal patterns and abstractions. During these phases, the method identifies thought bundles from different modalities that exhibit structural similarity or semantic alignment, applying sophisticated recombination algorithms that blend modal-specific features while preserving essential relationships. The recombination process creates meta-modal representations that capture invariant patterns across sensory domains, such as motion patterns that manifest similarly in visual and acoustic data, structural regularities that appear across multiple sensor types, and abstract concepts that find expression through various sensory channels. These generalized representations enable more efficient future processing by providing unified templates that can be instantiated across modalities, reducing redundancy and enabling rapid recognition of complex multimodal patterns.

In a step 1660, generate unified situational understanding by synthesizing information across all modalities. This synthesis process integrates the multimodal traversals, cross-modal navigations, and generalized representations into a coherent understanding that transcends individual sensory channels. The synthesis employs geometric integration techniques that combine information from different modal subspaces while respecting their relative reliabilities and complementary contributions. Unified understanding emerges from the convergence of multiple inferential paths through the multimodal manifold, where conclusions are reinforced by agreement across modalities or refined by modal-specific insights. The generated understanding maintains explicit representation of its multimodal foundations, enabling traceable reasoning that can identify which modalities contributed to specific conclusions and how cross-modal interactions influenced the final synthesis. This comprehensive situational awareness provides a rich, nuanced understanding that leverages the full spectrum of available sensory information while maintaining coherent semantic structure through geometric organization in the unified latent hyperspace.

Figure 17:
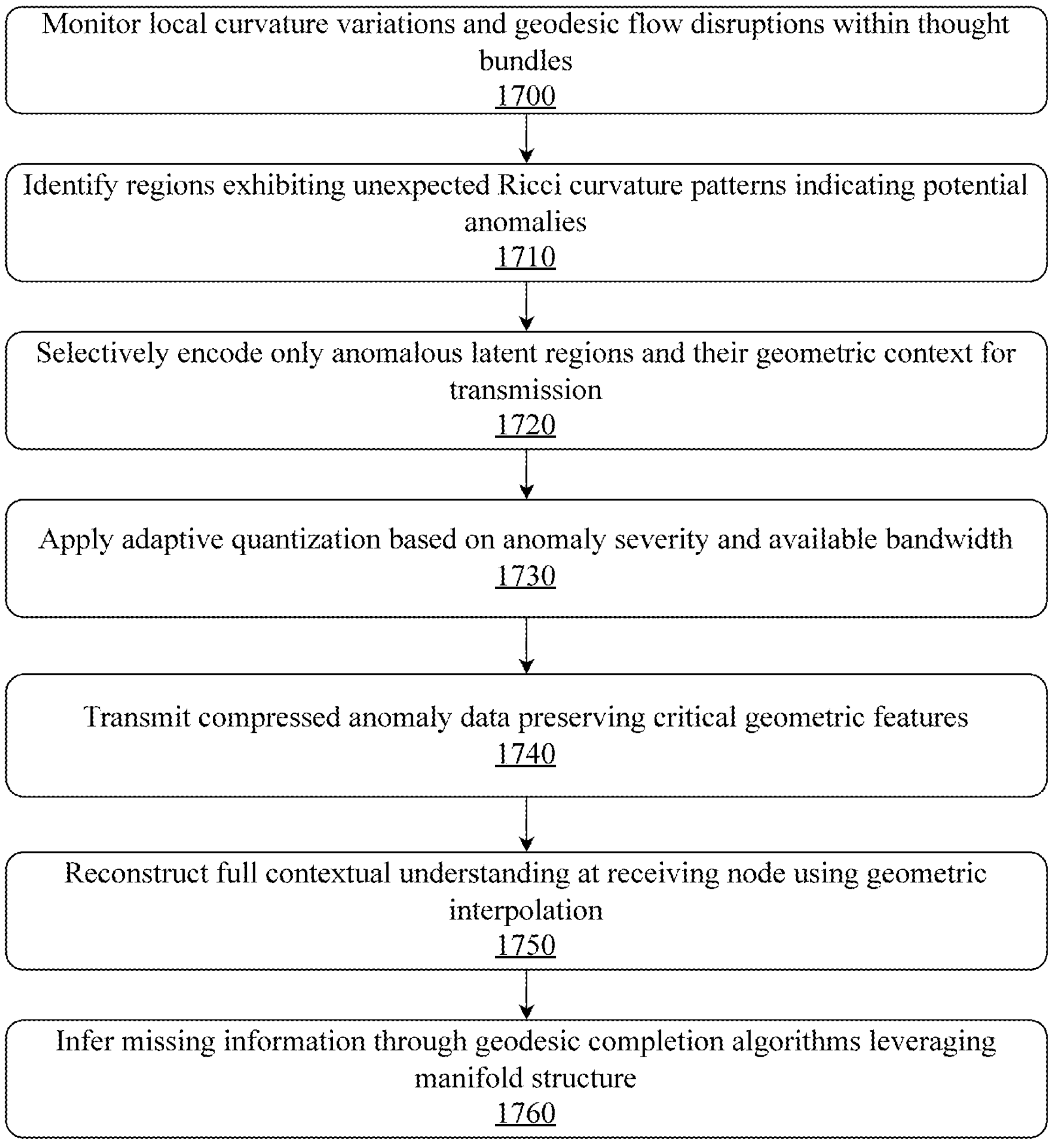
FIG. 17 is a flow diagram illustrating an exemplary method for detecting anomalies within cognitive manifolds and efficiently transmitting information through bandwidth-constrained channels using geometric compression and reconstruction techniques.

FIG. 17 is a flow diagram illustrating an exemplary method for detecting anomalies within cognitive manifolds and efficiently transmitting information through bandwidth-constrained channels using geometric compression and reconstruction techniques. In a first step 1700, monitor local curvature variations and geodesic flow disruptions within thought bundles. This monitoring process continuously tracks the geometric health of the latent manifold by observing how information flows through established cognitive structures. Thought bundles, as localized compressible regions containing structurally similar or semantically aligned thoughts, exhibit characteristic flow patterns under normal conditions where geodesic paths follow predictable trajectories through well-formed semantic spaces. The monitoring examines multiple geometric indicators including the smoothness of attention vector fields as they traverse bundle boundaries, the stability of local metric tensors within bundle interiors, the consistency of parallel transport along established reasoning paths, and the convergence or divergence rates of nearby geodesic trajectories. Disruptions in these flow patterns signal potential anomalies that warrant deeper investigation, such as unexpected turbulence in normally laminar regions, discontinuities in otherwise smooth semantic transitions, or irregular divergence patterns that break established geometric regularities.

In a step 1710, identify regions exhibiting unexpected Ricci curvature patterns indicating potential anomalies. This identification process analyzes the compression pressure field $P(x)=-R(x)$, where $R(x)$ represents the Ricci scalar curvature, to detect deviations from expected geometric patterns. Under normal conditions, thought bundles exhibit predictable curvature signatures based on their semantic content and usage patterns, with frequently accessed concepts showing higher but stable curvature, specialized knowledge domains maintaining consistent intermediate curvature, and exploratory regions displaying lower, more uniform curvature distributions. Anomalous patterns manifest as sudden spikes in curvature without corresponding semantic justification, irregular curvature oscillations within previously stable regions, inverted curvature relationships where sparse regions show unexpected compression, or curvature voids where expected semantic density disappears. These unexpected patterns often indicate underlying issues such as corrupted thought structures, emergent conceptual conflicts, novel information requiring manifold adaptation, or systemic problems affecting geometric integrity.

In a step 1720, selectively encode only anomalous latent regions and their geometric context for transmission. This selective encoding process implements intelligent data reduction by focusing transmission resources exclusively on information-rich anomalous regions while omitting normal background structure. The encoding captures not just the anomalous points themselves but sufficient geometric context to enable meaningful interpretation, including local manifold topology surrounding the anomaly, curvature gradients extending from normal to anomalous regions, geodesic paths that connect anomalies to known reference structures, and boundary conditions that delineate anomalous from normal regions. The selective encoding employs sophisticated algorithms that determine optimal context boundaries by analyzing information gradients radiating from anomaly centers, semantic dependencies that link anomalies to broader cognitive structures, and geometric continuity requirements for accurate reconstruction. This approach dramatically reduces transmission requirements while preserving the essential information needed to understand and respond to detected anomalies.

In a step 1730, apply adaptive quantization based on anomaly severity and available bandwidth. This quantization process dynamically adjusts encoding precision to optimize the trade-off between transmission efficiency and anomaly representation fidelity. Severity assessment considers multiple factors including the magnitude of curvature deviation from expected norms, the spatial extent of the anomalous region within the manifold, the rate of change in geometric parameters, and potential impact on cognitive operations. High-severity anomalies receive fine-grained quantization that preserves subtle geometric features helpful for accurate analysis, while lower-severity deviations undergo coarser quantization that captures essential patterns without excessive detail. Bandwidth-aware adaptation continuously monitors available transmission capacity and adjusts quantization parameters in real-time, implementing progressive encoding schemes that transmit core anomaly features first followed by refinement data, variable bit allocation that assigns more resources to some geometric features, and temporal multiplexing that balances multiple anomaly streams based on relative priorities. In a step 1740, transmit compressed anomaly data preserving geometric features. The transmission process employs specialized compression algorithms designed to maintain geometric integrity despite aggressive data reduction. Preserved features during compression include but are not limited to topological invariants that define anomaly structure, curvature signatures that characterize deviation patterns, geodesic connectivity that links anomalies to the broader manifold, and semantic anchors that provide interpretive context. Compression techniques leverage the inherent structure of geometric data through differential encoding that transmits changes rather than absolute values, manifold-aware transforms that exploit local geometric regularities, predictive coding based on normal manifold behavior, and entropy coding optimized for geometric data distributions. The transmission protocol may include error protection mechanisms weighted toward preserving geometric consistency, ensuring that reconstruction errors don't fundamentally alter anomaly interpretation.

In a step 1750, reconstruct full contextual understanding at receiving node using geometric interpolation. This reconstruction process rebuilds comprehensive anomaly context from the sparse transmitted data by leveraging knowledge of manifold structure and geometric principles. Geometric interpolation techniques employed include but are not limited to geodesic interpolation that fills gaps along natural manifold paths, curvature field reconstruction using partial differential equations, metric tensor completion based on smoothness constraints, and topology inference from boundary conditions. The reconstruction process is guided by prior knowledge of normal manifold behavior, enabling intelligent filling of untransmitted regions through reference to similar known structures, application of learned geometric regularities, and constraint satisfaction based on manifold consistency requirements. The reconstructed context provides sufficient detail to understand not just what anomalies occurred but their relationship to the broader cognitive landscape, enabling appropriate response strategies.

In a step 1760, infer missing information through geodesic completion algorithms leveraging manifold structure. This inference process goes beyond simple interpolation to actively reconstruct probable missing information based on deep understanding of manifold geometry and semantic relationships. Geodesic completion algorithms trace partial paths through the manifold and extend them according to learned trajectory patterns, identifying likely path continuations based on curvature flow, semantic coherence along extended paths, and convergence toward stable attractor regions. The algorithms leverage manifold structure through multiple mechanisms including bundle membership inference that assigns reconstructed regions to appropriate semantic clusters, cross-bundle connection discovery that identifies probable relationships between separated anomalous regions, and temporal evolution modeling that predicts how anomalies might develop over time. This inference capability enables the receiving node to develop actionable understanding from minimal transmitted data, supporting effective anomaly response even in severely bandwidth-constrained environments while maintaining the geometric and semantic integrity essential for meaningful cognitive processing.

Figure 18:
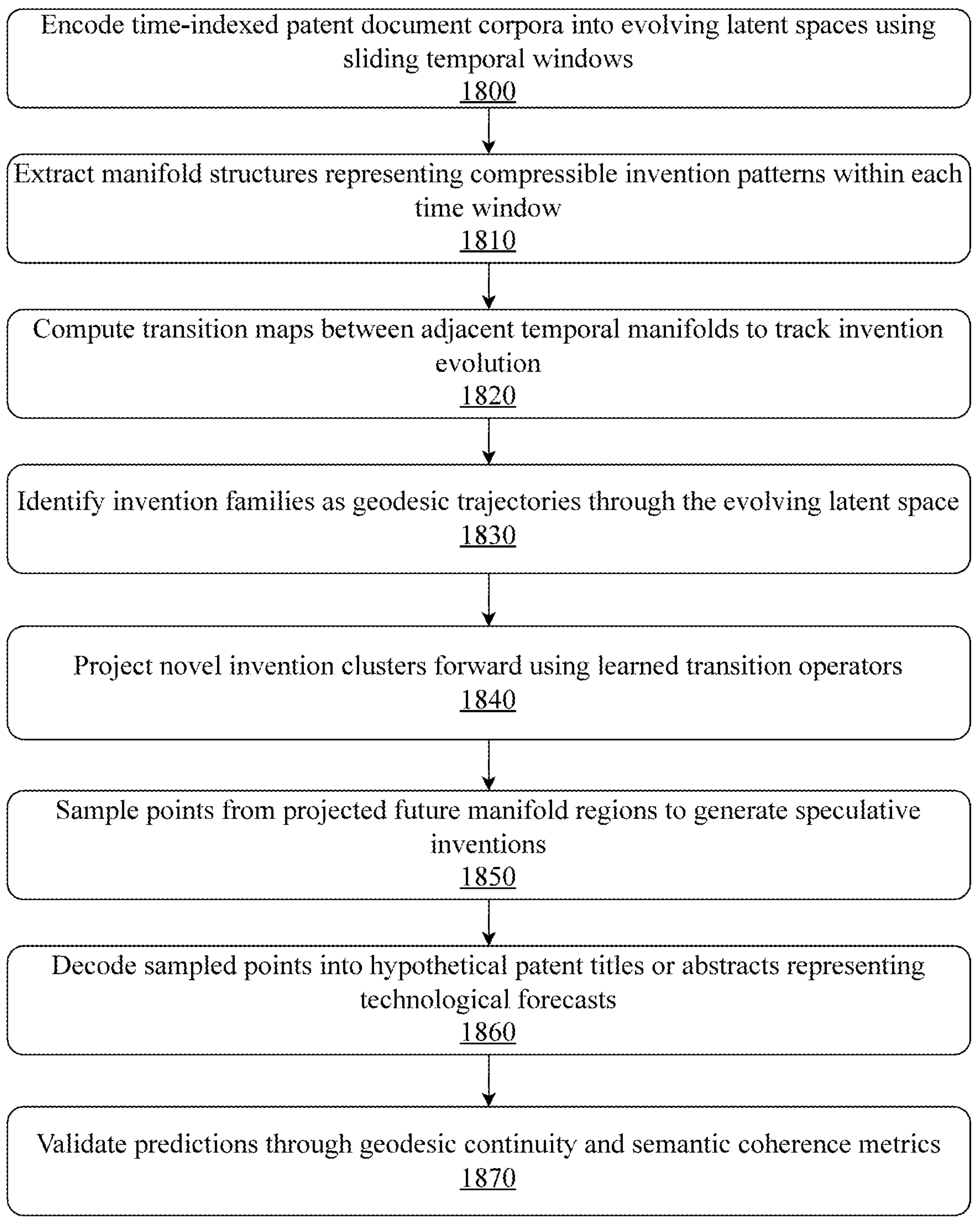
FIG. 18 is a flow diagram illustrating an exemplary method for analyzing technological evolution through patent document corpora and forecasting future inventions by tracking geodesic trajectories through time-evolving latent manifolds.

FIG. 18 is a flow diagram illustrating an exemplary method for analyzing technological evolution through patent document corpora and forecasting future inventions by tracking geodesic trajectories through time-evolving latent manifolds. In a first step 1800, encode time-indexed patent document corpora into evolving latent spaces using sliding temporal windows. This encoding process transforms collections of patent documents organized by publication time into dynamic geometric representations that capture the evolution of technological innovation. The sliding temporal windows, such as three-month periods with one-month overlap, create a sequence of overlapping document sets that enable smooth tracking of invention progression while maintaining temporal continuity. Each window's corpus undergoes encoding through sophisticated natural language processing and semantic analysis that extracts not just keywords and classifications but deeper structural patterns including technological dependencies, conceptual relationships, innovation trajectories, and cross-domain influences. The encoding process generates high-dimensional latent representations that preserve the rich semantic structure of patent information while enabling geometric analysis of how technologies evolve and interact over time.

In a step 1810, extract manifold structures representing compressible invention patterns within each time window. This extraction process identifies coherent geometric structures within each temporal latent space that correspond to meaningful technological themes and innovation clusters. The manifold extraction employs dimensionality reduction and structure discovery techniques that reveal underlying patterns in the high-dimensional patent representations, identifying regions of dense innovation activity corresponding to hot technological areas, sparse regions indicating unexplored or emerging fields, curved paths connecting related inventions across domains, and topological features revealing innovation barriers or breakthroughs. Compressible patterns emerge where multiple patents share fundamental conceptual structures despite surface differences, enabling the identification of core technological principles that drive innovation within specific periods. The extracted manifolds capture not just static snapshots but the dynamic terrain of technological possibility within each time window.

In a step 1820, compute transition maps between adjacent temporal manifolds to track invention evolution. These transition maps capture how the landscape of innovation transforms from one time period to the next, encoding both gradual evolution and disruptive changes. The computation of transition maps involves sophisticated alignment algorithms that match corresponding structures across temporal boundaries while accounting for the emergence of novel concepts, the obsolescence of outdated technologies, the transformation of existing ideas into new forms, and the migration of innovations across domain boundaries. The maps are learned through analysis of patents that appear in overlapping windows, tracking how their latent representations shift as the surrounding technological context evolves. These transition operators encode the dynamics of technological progress, capturing patterns such as convergent evolution where disparate technologies merge, divergent innovation where single concepts spawn multiple directions, and paradigm shifts where entire regions of the manifold undergo radical transformation.

In a step 1830, identify invention families as geodesic trajectories through the evolving latent space. This identification process traces the paths of related inventions as they develop over time, revealing the continuous threads of innovation that connect early concepts to their mature realizations. Invention families manifest as geodesic trajectories. These trajectories exhibit characteristic properties including consistent directionality indicating focused technological development, smooth curvature reflecting incremental innovation, and branching patterns where core technologies spawn multiple applications. The geodesic nature of these paths reflects the principle of least action in innovation, where technological development tends to follow paths of minimal resistance through the space of possibilities. By analyzing these trajectories, the method reveals how inventions build upon predecessors, how technological capabilities accumulate over time, and how breakthrough innovations create new directions for future development.

In a step 1840, project novel invention clusters forward using learned transition operators. This projection employs the composed transition maps to extrapolate current innovation patterns into future time periods. The projection process identifies clusters of recent inventions representing technological frontiers and applies learned dynamics to predict their evolution. The forward projection accounts for multiple factors including momentum of current research directions, convergence patterns between previously separate fields, saturation effects in mature technological areas, and emergence of enabling technologies that open new possibilities. The projection generates future manifold regions that represent plausible technological landscapes, maintaining geometric consistency with historical patterns while allowing for novel combinations and breakthrough possibilities that respect the learned dynamics of innovation.

In a step 1850, sample points from projected future manifold regions to generate speculative inventions. This sampling process explores the predicted future technological landscape to identify specific innovation possibilities. Sampling strategies include but are not limited to focused sampling around high-potential regions identified through projection analysis, exploratory sampling in sparse areas representing untapped opportunities, interpolative sampling between projected clusters to identify bridging technologies, and perturbative sampling that tests variations on projected trajectories. Each sampled point represents a potential future invention embedded within the projected technological context. The sampling process maintains geometric coherence, ensuring that generated points respect the manifold structure and exhibit plausible relationships to projected innovation clusters. Multiple samples capture the range of possibilities within predicted technological domains, from incremental improvements to radical innovations.

In a step 1860, decode sampled points into hypothetical patent titles or abstracts representing technological forecasts. This decoding process transforms abstract geometric representations back into human-interpretable descriptions of potential future inventions. The decoder leverages the semantic structure preserved through the encoding and projection process to generate coherent technological concepts that reflect the position and context of each sampled point. Generated titles and abstracts maintain consistency with patent language conventions while introducing novel combinations of concepts that emerge from the geometric positioning within projected manifolds. The decoding process produces outputs that capture both the specific technical features suggested by the geometric location and the broader technological context implied by surrounding manifold structure. These hypothetical patents serve as concrete illustrations of predicted technological directions, providing actionable insights for research planning, investment strategies, and innovation policy.

In a step 1870, validate predictions through geodesic continuity and semantic coherence metrics. This validation ensures that forecasted inventions represent plausible technological developments rather than arbitrary extrapolations. Geodesic continuity validation verifies that predicted inventions lie along smooth extensions of historical innovation trajectories, maintaining consistent development patterns with established technological paths, exhibiting reasonable innovation velocities based on historical rates, and preserving topological relationships with existing technology clusters. Semantic coherence metrics evaluate whether predicted inventions maintain meaningful technological content through analysis of conceptual consistency with domain knowledge, technical feasibility given projected capabilities, market and application relevance, and compatibility with emerging technological ecosystems. The validation process provides confidence measures for each prediction, enabling prioritization of forecasts most likely to represent genuine future innovations. This systematic validation ensures that the method produces actionable technological intelligence grounded in rigorous analysis of innovation dynamics rather than speculative fantasy.

Figure 19:
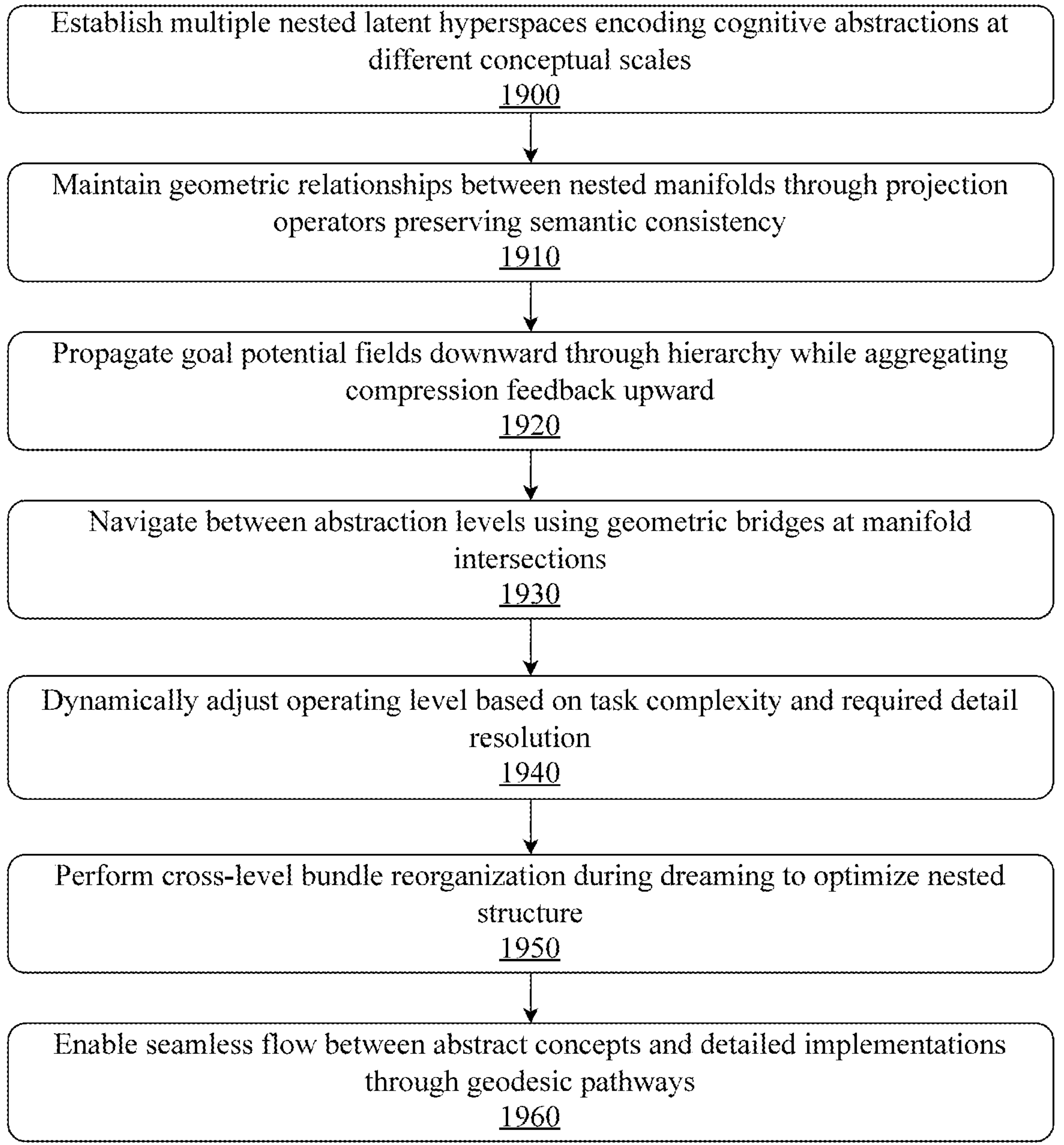
FIG. 19 is a flow diagram illustrating an exemplary method for implementing multi-level cognitive processing through hierarchically nested latent manifolds.

FIG. 19 is a flow diagram illustrating an exemplary method for implementing multi-level cognitive processing through hierarchically nested latent manifolds. In a first step 1900, establish multiple nested latent hyperspaces encoding cognitive abstractions at different conceptual scales. This establishment creates a hierarchical structure where each level represents a different granularity of cognitive representation. The highest levels encode broad abstract concepts, general principles, and overarching patterns that span multiple domains. Intermediate levels capture domain-specific knowledge, categorical relationships, and structured methodologies. Lower levels represent detailed implementations, specific instances, and concrete operational parameters. Each hyperspace maintains its own geometric structure with appropriate dimensionality for its abstraction level, where abstract spaces may have lower intrinsic dimension but higher curvature reflecting conceptual density, while detailed spaces exhibit higher dimension but flatter local geometry accommodating specific variations. The nesting relationship ensures that detailed thoughts exist within the scope of their governing abstractions, creating a natural hierarchy that mirrors how complex knowledge organizes from general principles to specific applications.

In a step 1910, maintain geometric relationships between nested manifolds through projection operators preserving semantic consistency. These projection operators map between different hierarchical levels while preserving essential semantic relationships and structural coherence. The operators implement sophisticated transformations that aggregate detailed information when projecting upward to abstract levels, capturing essential patterns while abstracting away specifics, and instantiate abstract concepts when projecting downward, generating plausible detailed realizations guided by higher-level constraints. Semantic consistency preservation ensures that meanings remain stable across levels through maintenance of relational structures between concepts, preservation of logical dependencies and constraints, and conservation of semantic distance relationships appropriately scaled for each level. The projection operators adapt dynamically as the manifolds evolve, learning from traversal patterns to improve cross-level mappings and maintaining homeomorphic relationships that prevent semantic drift during repeated projections.

In a step 1920, propagate goal potential fields downward through hierarchy while aggregating compression feedback upward. This bidirectional information flow creates a unified cognitive dynamics across all abstraction levels. Goal potential fields defined at abstract levels cascade downward through the hierarchy, becoming progressively more specific and actionable at each level. The downward propagation transforms high-level objectives into concrete subgoals, distributes potential gradients to guide detailed implementations, and maintains goal coherence while allowing level-appropriate interpretations. Simultaneously, compression pressure information aggregates upward from detailed levels, informing abstract levels about implementation complexity, resource constraints, and feasibility boundaries. This upward flow enables abstract reasoning to remain grounded in realistic constraints while providing feedback about which high-level approaches lead to tractable implementations. The bidirectional flow creates a dynamic equilibrium where abstract goals shape detailed actions while implementation realities inform strategic planning.

In a step 1930, navigate between abstraction levels using geometric bridges at manifold intersections. These bridges represent semantic connections that enable fluid movement between conceptual scales without discontinuous jumps. Navigation utilizes specialized geometric structures at level boundaries including transition zones where adjacent levels share overlapping representations, portal regions providing efficient access points between levels, and connector pathways that maintain semantic continuity during level transitions. The navigation process selects appropriate bridges based on current cognitive context, required level of detail, and semantic alignment with ongoing reasoning. Bridge traversal implements smooth interpolation between abstraction levels, gradually adjusting representational granularity, maintaining inferential coherence across transitions, and preserving relevant context while shifting focus. This enables cognitive processes to fluidly zoom in for detailed analysis or zoom out for strategic overview as needed by the task at hand.

In a step 1940, dynamically adjust operating level based on task complexity and required detail resolution. This adjustment mechanism continuously evaluates cognitive demands and selects the most appropriate hierarchical level for current processing. Task complexity assessment considers factors such as the breadth of domains involved requiring higher-level integration, the specificity of required outputs demanding detailed representation, the novelty of problems potentially requiring multiple levels, and time constraints favoring appropriate abstraction levels. The dynamic adjustment implements smooth transitions between levels rather than discrete switches, maintaining partial activation across multiple levels when tasks require integrated processing. The mechanism learns optimal level selection strategies through experience, developing heuristics for rapid level identification and maintaining statistics on task-level associations. This adaptive behavior ensures efficient cognitive resource utilization by operating at the simplest level sufficient for task requirements while enabling rapid escalation to more complex levels when needed.

In a step 1950, perform cross-level bundle reorganization during dreaming to optimize nested structure. This reorganization process operates during inactive periods to improve the hierarchical organization and cross-level connectivity. Bundle reorganization examines thought bundles across all levels to identify opportunities for better hierarchical alignment, including promoting frequently accessed detailed bundles to higher abstraction levels, decomposing overly complex abstract bundles into hierarchical components, and creating new intermediate levels when gaps in the hierarchy impede smooth navigation. The process implements sophisticated recombination algorithms that respect level-appropriate constraints while enabling creative restructuring. Cross-level optimization ensures that related concepts maintain appropriate geometric relationships across the hierarchy, frequently traversed paths between levels become more efficient, and the overall hierarchical structure evolves to match actual usage patterns. This dreaming-phase reorganization enables the hierarchical system to adapt its structure based on accumulated experience, becoming progressively more efficient at supporting the specific types of multi-level reasoning required by its task domain.

In a step 1960, enable seamless flow between abstract concepts and detailed implementations through geodesic pathways. This final step ensures that the hierarchical structure supports fluid cognitive movement across all conceptual scales. Geodesic pathways through the nested manifolds are computed to minimize traversal cost while maintaining semantic coherence, creating smooth reasoning chains that can start with high-level objectives and flow naturally to specific actions, or begin with detailed observations and ascend to general principles. These pathways leverage the optimized hierarchical structure to provide multiple routes between levels, enabling flexible reasoning strategies, redundant paths for robustness, and creative connections between previously unrelated concepts at different scales. The seamless flow supports various cognitive operations including top-down planning from strategy to tactics, bottom-up learning from examples to principles, middle-out reasoning that connects theory with practice, and lateral thinking that bridges across hierarchies. This comprehensive connectivity ensures that the hierarchical cognitive system can fluidly adapt its processing level to match task demands while maintaining the rich interconnections that enable sophisticated multi-scale reasoning.

Figure 20:
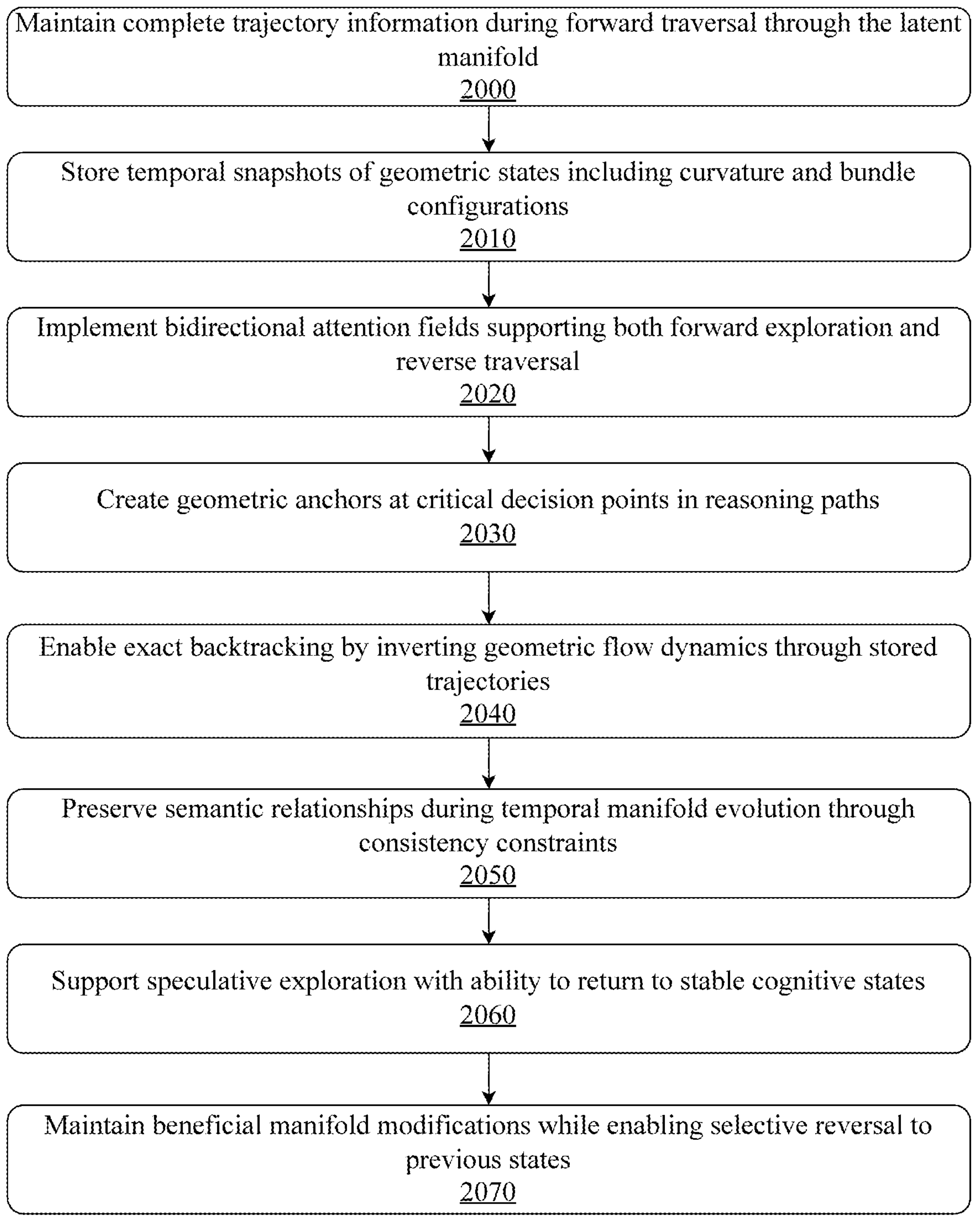
FIG. 20 is a flow diagram illustrating an exemplary method for implementing reversible navigation within dynamic latent manifolds.

FIG. 20 is a flow diagram illustrating an exemplary method for implementing reversible navigation within dynamic latent manifolds. In a first step 2000, maintain complete trajectory information during forward traversal through the latent manifold. This maintenance process creates a comprehensive record of the cognitive path taken, capturing not just the sequence of positions visited but the full geometric context of the traversal. The trajectory information includes but is not limited to the precise coordinates of each point along the path, the velocity and acceleration of attention movement, local curvature values and metric tensor components at each position, and the compression pressure and goal potential fields encountered. This detailed recording enables faithful reconstruction of the cognitive journey, preserving information about why specific paths were chosen, how attention flowed through different regions, what semantic relationships were activated, and which thought bundles were engaged during reasoning. The maintenance mechanism operates continuously during active cognition, creating a rich trace that serves as both a record of reasoning and a foundation for potential backtracking.

In a step 2010, store temporal snapshots of geometric states including curvature and bundle configurations. These snapshots capture the complete state of relevant manifold regions at specific time points, creating a temporal sequence that documents how the cognitive landscape evolves during reasoning. Each snapshot preserves local and global curvature patterns reflecting semantic density and relationships, thought bundle boundaries and internal structures, metric tensor values defining distance relationships, active attention fields and their flow patterns, and compression pressure distributions across the manifold. The storage mechanism implements efficient compression techniques that preserve essential geometric information while managing memory requirements through identification of state changes requiring full snapshots, incremental storage of modifications between snapshots, and hierarchical representation enabling multi-resolution retrieval. These temporal snapshots enable not just backtracking through a static landscape but navigation to previous manifold configurations even as the underlying structure continues to evolve.

In a step 2020, implement bidirectional attention fields supporting both forward exploration and reverse traversal. The attention vector field is enhanced to include reverse flow components that enable backward navigation along previously traversed paths. This bidirectional implementation maintains dual flow potentials at each manifold point, with forward components guided by goal attraction and exploration drives, and reverse components following stored trajectory gradients back toward previous positions. The field dynamics incorporate memory of past traversals, creating preferential flow channels along well-traveled paths while maintaining flexibility for deviation. The bidirectional nature enables smooth transitions between forward and backward navigation, supporting cognitive operations such as retracing steps to reconsider alternatives, returning to decision points for different choices, and comparing forward predictions with backward reconstructions. The implementation ensures that reverse traversal respects the evolved manifold geometry rather than simply replaying stored coordinates.

In a step 2030, create geometric anchors at various decision points in reasoning paths. These anchors mark significant locations in the cognitive journey where important choices were made, multiple paths diverged, or key insights emerged. Anchor creation identifies points through analysis of trajectory bifurcations indicating choice points, local extrema in goal potential suggesting achievement milestones, curvature anomalies marking conceptual transitions, and high compression pressure regions requiring significant cognitive effort. Each anchor stores comprehensive local state information including the complete geometric configuration, available path options and their initial directions, decision criteria and goal states active at that point, and semantic context explaining the significance of the location. These anchors serve as cognitive waypoints that enable efficient navigation to important reasoning states without requiring full trajectory replay, supporting operations like returning to reconsider major decisions or comparing outcomes from different choice branches.

In a step 2040, enable exact backtracking by inverting geometric flow dynamics through stored trajectories. This inversion process reverses the mathematical operations that generated forward motion, creating precise backward paths through the evolved manifold. The flow inversion accounts for the original geodesic equations by reversing time parameters, the influence of compression pressure and goal fields by negating their gradients, the effects of manifold evolution by applying inverse transformations, and the accumulation of path-dependent modifications. The backtracking mechanism enables exact retracing even through complex geometric regions including high-curvature zones where forward paths strongly converged, bifurcation regions where choices were made, and dynamically evolved areas where the manifold has changed. This precise reversal capability ensures that cognitive exploration can be truly reversible, enabling confident speculation knowing that return to stable states is guaranteed.

In a step 2050, preserve semantic relationships during temporal manifold evolution through consistency constraints. As the manifold evolves through use and learning, this preservation mechanism ensures that semantic meanings remain stable enough to support meaningful backtracking. Consistency constraints maintain topological relationships between thought bundles, relative distance orderings between related concepts, essential curvature patterns that define semantic regions, and geodesic connections between ideas. The preservation process implements sophisticated transformation tracking that records how manifold regions evolve over time, applies compensating adjustments during backtracking to account for evolution, and maintains semantic anchors that provide stable reference points. This enables navigation to previous cognitive states even when the underlying geometry has been modified by intervening learning and adaptation, ensuring that backtracking arrives at semantically equivalent rather than merely geometrically identical states.

In a step 2060, support speculative exploration with ability to return to stable cognitive states. This capability enables bold cognitive ventures into uncertain or potentially unstable regions while maintaining safety through guaranteed return paths. Speculative exploration is facilitated through creation of temporary manifold branches for experimental reasoning, suspension of normal stability constraints during exploration, monitoring of cognitive health metrics during speculation, and automatic triggering of return navigation if instability is detected. The return mechanism provides rapid retreat to the nearest stable anchor point, gradual unwinding of speculative modifications, and preservation of valuable discoveries while discarding unstable structures. This creates a cognitive sandbox where novel connections can be explored, unconventional reasoning paths can be tested, and creative insights can emerge, all while maintaining the security of proven stable states.

In a step 2070, maintain beneficial manifold modifications while enabling selective reversal to previous states. This final step implements intelligent preservation of positive changes discovered during exploration while still enabling return to earlier configurations. The selective reversal mechanism analyzes modifications made during forward traversal to identify beneficial changes such as new connections that improve reasoning efficiency, compressed representations that reduce cognitive load, discovered shortcuts between previously distant concepts, and refined curvature patterns that better capture semantic relationships. During reversal operations, the method preserves these beneficial modifications by maintaining them as overlays on reversed base geometry, creating parallel path options that include improvements, and marking enhanced regions for integration into the stable manifold. This selective approach ensures that the cognitive system continuously improves through exploration while maintaining the ability to recover from unsuccessful ventures, creating an optimal balance between stability and adaptability in the evolving geometric substrate of thought.

Hardware Architecture

Figure 21:
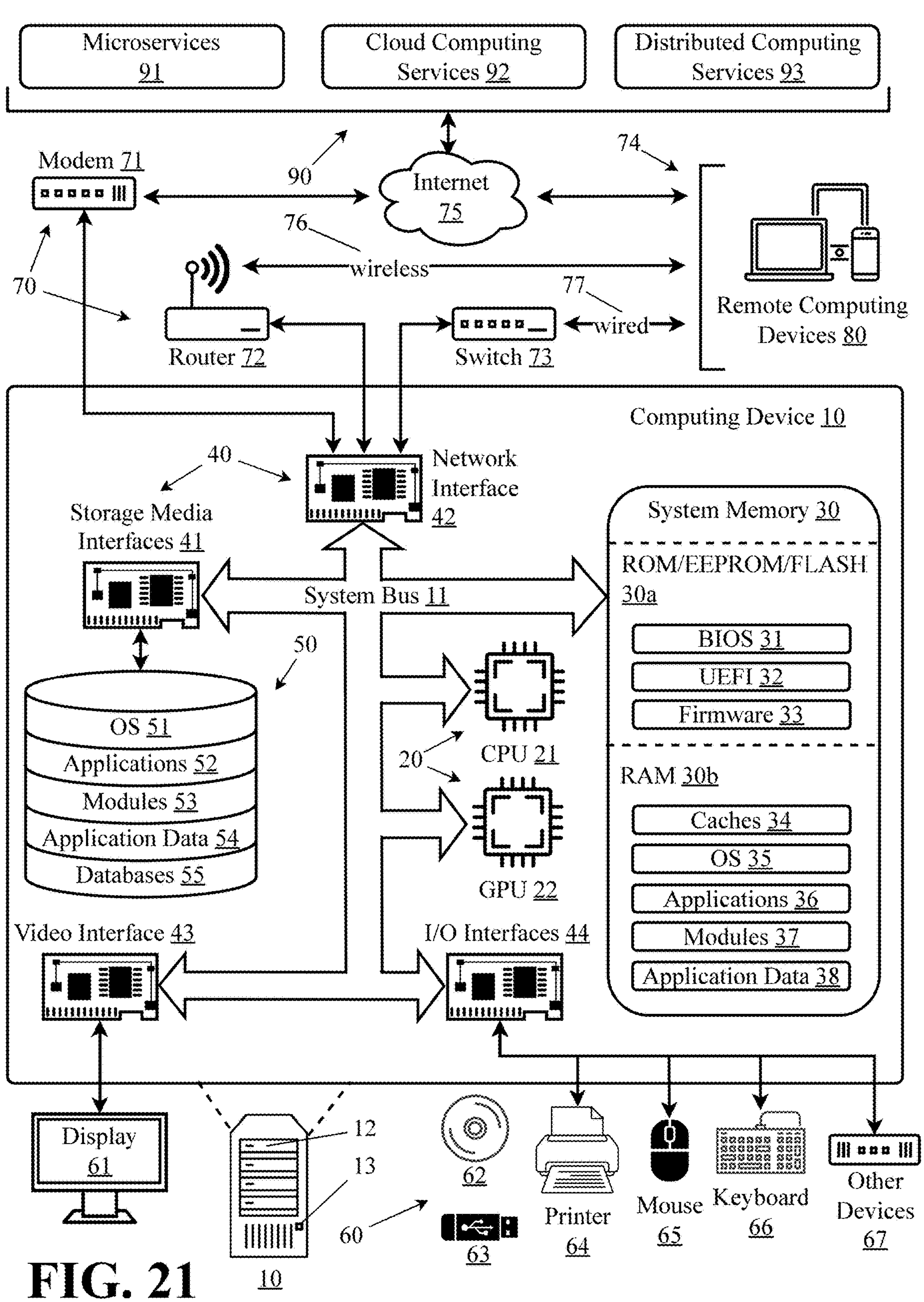
FIG. 21 illustrates an exemplary computing environment on which an embodiment described herein may be implemented.

FIG. 21 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory **30*a* is not erased when power to the memory is removed, and includes memory types such as read only memory(ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IOT) devices where processing power and data storage space is limited. Volatile memory 30*b* is erased when power to the memory is removed and is typically used for short-term storage of data for processing. Volatile memory 30*b* includes memory types such as random-access memory(RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b*** may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory(SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Container provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Federated distributed computing services 93 provide large-scale processing using multiple interconnected computers or nodes to solve computational problems or perform tasks collectively. In federated distributed computing, the processing and storage capabilities of multiple machines are leveraged to work together as a unified system, even when different tiers or tessellations may have limited or even no visibility into the resources and processing layer up or downstream. Federated distributed computing services are designed to address problems that cannot be efficiently solved by a single computer or that require large-scale computational power and require dynamism and workload distribution for economic, security or privacy reasons not well supported by canonical distributed computing resources; e.g. most commonly cloud-based computing applications, resources or analytics. Federated DCG coordinated variants of these services enable superior decentralization and further enhance parallel processing, fault tolerance, and scalability by distributing tasks across multiple tiers or tessellations while enabling computing process dependency calculation with varying degrees of visibility, assurance and privacy or security based on constituent computing system, network, workload and user or provider needs and preferences as well as practical legal and regulatory concerns to include but not limited to data localization, national data transfer restrictions, privacy and consumer protections, wiretap/telecommunications monitoring requirements, encryption and data routing and intermediate processing restrictions.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising a hardware memory, wherein the computer system is configured to execute software instructions stored on nontransitory machine-readable storage media that:

maintain a latent manifold as a geometric substrate incorporating multiple dimensional representations for heterogeneous data modalities, wherein local curvature reflects semantic density within and across modalities;

encode inputs from multiple modalities into a unified geometric space while preserving modality-specific properties through dimensional constraints;

generate compression pressure fields that account for information density patterns across different modalities;

enable navigation across modal boundaries through geometric pathways that preserve semantic relationships during dimensional transitions;

synthesize unified representations spanning multiple modalities through geometric recombination of semantically aligned structures; and update the manifold geometry to reinforce multimodal integrations and cross-modal pathways based on traversal patterns.

2. The computer system of claim 1, wherein the compression pressure fields comprise modality-specific pressure patterns.

3. The computer system of claim 1, wherein the software instructions further:

execute autonomous reorganization of the latent manifold during idle periods, including perturbation of existing structures, synthesis of new connections between disparate regions, and removal of unused or redundant structures.

4. The computer system of claim 1, wherein the software instructions further:

maintain a plurality of bidirectional attention fields within the latent manifold that support both forward exploration toward goals and reverse traversal along previously computed paths, enabling backtracking and path revision.

5. The computer system of claim 1, wherein the software instructions further:

establish a plurality of goal potential fields that create attractive forces within the latent manifold, guiding path computation toward semantically relevant regions for achieving specific objectives.

6. The computer system of claim 1, wherein the software instructions further:

implement hierarchical organization with multiple nested latent manifolds operating at different levels of abstraction, wherein paths can traverse between abstraction levels through geometric bridges.

7. A method for a persistent cognitive computation with multimodal capabilities, comprising the steps of:

maintain a latent manifold as a geometric substrate incorporating multiple dimensional representations for heterogeneous data modalities, wherein local curvature reflects semantic density within and across modalities;

encode inputs from multiple modalities into a unified geometric space while preserving modality-specific properties through dimensional constraints;

generate compression pressure fields that account for information density patterns across different modalities;

enable navigation across modal boundaries through geometric pathways that preserve semantic relationships during dimensional transitions;

synthesize unified representations spanning multiple modalities through geometric recombination of semantically aligned structures; and update the manifold geometry to reinforce multimodal integrations and cross-modal pathways based on traversal patterns.

8. The method of claim 7, further comprising the step:

computing modality-aware compression pressure fields derived from local curvature.

9. The method of 7, further comprising the step:

executing autonomous reorganization of the latent manifold during idle periods, including perturbation of existing structures, synthesis of new connections between disparate regions, and removal of unused or redundant structures.

10. The method of claim 7, further comprising the step:

maintaining a plurality of bidirectional attention fields within the latent manifold that support both forward exploration toward goals and reverse traversal along previously computed paths, enabling backtracking and path revision.

11. The method of claim 7, further comprising the step:

establishing a plurality of goal potential fields that create attractive forces within the latent manifold, guiding path computation toward semantically relevant regions for achieving specific objectives.

12. The method of claim 7, further comprising the step:

implementing hierarchical organization with multiple nested latent manifolds operating at different levels of abstraction, wherein paths can traverse between abstraction levels through geometric.

* * * * *